(12) United States Patent
De Marcken

(10) Patent No.: US 8,781,864 B2
(45) Date of Patent: *Jul. 15, 2014

(54) ANTICIPATORY PRESENTATION OF TRAVEL INFORMATION

(75) Inventor: Carl De Marcken, Seattle, WA (US)

(73) Assignee: Google Inc., Mountain View, CA (US)

( * ) Notice: Subject to any disclaimer, the term of this patent is extended or adjusted under 35 U.S.C. 154(b) by 378 days.

This patent is subject to a terminal disclaimer.

(21) Appl. No.: 12/773,390

(22) Filed: May 4, 2010

(65) Prior Publication Data

US 2010/0305983 A1    Dec. 2, 2010

Related U.S. Application Data

(63) Continuation of application No. 11/650,312, filed on Jan. 5, 2007, now Pat. No. 7,711,587.

(51) Int. Cl.
  *G06Q 10/00*  (2012.01)
(52) U.S. Cl.
  USPC .................................................. 705/5; 705/6
(58) Field of Classification Search
  USPC ............. 705/1.1, 5, 6, 7.11, 7.12, 7.13, 7.24, 705/14.1, 14.4, 14.54; 707/708, E17.108; 340/825.28, 825.29
  See application file for complete search history.

(56) References Cited

U.S. PATENT DOCUMENTS

| | | | |
|---|---|---|---|
| 5,797,127 A | 8/1998 | Walker et al. | |
| 5,948,040 A | 9/1999 | DeLorme et al. | |
| 6,085,164 A | 7/2000 | Smith et al. | |
| 6,418,413 B2 | 7/2002 | DeMarcken et al. | |
| 6,496,568 B1 | 12/2002 | Nelson | |
| 6,553,100 B1 | 4/2003 | Chen et al. | |
| 6,609,098 B1 | 8/2003 | Demarcken | |
| 6,742,042 B1 | 5/2004 | Holden et al. | |
| 7,010,494 B2 | 3/2006 | Etzioni et al. | |
| 7,050,986 B1 | 5/2006 | Vance et al. | |
| 7,062,480 B2 | 6/2006 | Fay et al. | |
| 7,069,309 B1 | 6/2006 | Dodrill et al. | |
| 7,120,928 B2 | 10/2006 | Sheth et al. | |
| 7,302,399 B1 | 11/2007 | Donovan et al. | |
| 7,346,630 B2 | 3/2008 | Eichstaedt et al. | |
| 7,415,419 B2 | 8/2008 | Widjaja et al. | |
| 7,533,032 B1 | 5/2009 | Selby | |

(Continued)

FOREIGN PATENT DOCUMENTS

| | | |
|---|---|---|
| JP | 02002133282 | 5/2002 |
| WO | WO 01/33472 A2 | 5/2001 |

OTHER PUBLICATIONS

International Search Report and the Written Opinion of the International Searching Authority for International Application No. PCT/08/50196, dated Nov. 3, 2008.

(Continued)

*Primary Examiner* — Igor Borissov
(74) *Attorney, Agent, or Firm* — Fish & Richardson P.C.

(57) ABSTRACT

Systems and techniques for presenting travel information to a user are described. A code that includes predetermined travel parameters specified by the user is included in a web page. Access to the web page by a user is detected. A travel query is populated with the predetermined travel parameters and a variable parameter based on identification information associated with the user. Cached travel options that are obtained from prior queries and that satisfy the travel query are presented to the user.

26 Claims, 36 Drawing Sheets

| Travel to the International Spelunking Society's Annual Conference, June 15th-17th in Brisbane | | | |
|---|---|---|---|
| Coming From [LON] | max stops [1] | cabin class [coach] | |
| Depart | Jun 17 | Jun 18 | Jun 19 |
| Arrive    Jun 13 | $500 | $600 | $500 |
| Jun 14 | $500 | $600 | $500 |
| Jun 15 | $700 | $600 | $700 |

462

(56) References Cited

U.S. PATENT DOCUMENTS

| | | | |
|---|---|---|---|
| 7,599,847 B2 | 10/2009 | Block et al. | |
| 7,676,546 B2 | 3/2010 | Hallam-Baker | |
| 7,693,750 B2 | 4/2010 | Christensen | |
| 2001/0051876 A1 | 12/2001 | Seigel et al. | |
| 2002/0013711 A1 | 1/2002 | Ahuja et al. | |
| 2002/0016724 A1 | 2/2002 | Yang et al. | |
| 2002/0065688 A1 | 5/2002 | Charlton et al. | |
| 2002/0133381 A1 | 9/2002 | Tso | |
| 2002/0133382 A1 | 9/2002 | DeMarcken et al. | |
| 2002/0169643 A1 | 11/2002 | Petite et al. | |
| 2002/0174205 A1 | 11/2002 | Nakashima | |
| 2003/0036930 A1 | 2/2003 | Matos et al. | |
| 2003/0120727 A1 | 6/2003 | Mentchoukov | |
| 2003/0187851 A1 | 10/2003 | Fay et al. | |
| 2004/0153348 A1 | 8/2004 | Garback | |
| 2004/0199441 A1 | 10/2004 | Mayfield | |
| 2004/0220910 A1 | 11/2004 | Zang et al. | |
| 2004/0225611 A1 | 11/2004 | Stefik et al. | |
| 2004/0249680 A1 | 12/2004 | Liew et al. | |
| 2004/0249682 A1 | 12/2004 | DeMarcken et al. | |
| 2004/0249683 A1 | 12/2004 | Demarcken et al. | |
| 2004/0249782 A1 | 12/2004 | Ricci | |
| 2004/0249798 A1 | 12/2004 | Demarcken et al. | |
| 2004/0249799 A1 | 12/2004 | Demarcken et al. | |
| 2005/0004819 A1 | 1/2005 | Etzioni et al. | |
| 2005/0021424 A1 | 1/2005 | Lewis et al. | |
| 2005/0091125 A1 | 4/2005 | Ikeda | |
| 2005/0102206 A1 | 5/2005 | Savasoglu et al. | |
| 2005/0108069 A1 | 5/2005 | Shiran et al. | |
| 2005/0114177 A1* | 5/2005 | Sweeney | 705/2 |
| 2005/0228702 A1 | 10/2005 | Fairbanks et al. | |
| 2005/0262059 A1 | 11/2005 | White | |
| 2006/0053052 A1 | 3/2006 | Baggett et al. | |
| 2006/0059024 A1 | 3/2006 | Bailey et al. | |
| 2006/0080215 A1 | 4/2006 | Warsaw et al. | |
| 2006/0106655 A1 | 5/2006 | Lettovsky et al. | |
| 2006/0149713 A1 | 7/2006 | Walker | |
| 2006/0161579 A1 | 7/2006 | Venguerov | |
| 2006/0200370 A1 | 9/2006 | Ratliff et al. | |
| 2006/0265361 A1* | 11/2006 | Chu | 707/3 |
| 2006/0271467 A1 | 11/2006 | Wasendorf, Sr. | |
| 2006/0277079 A1 | 12/2006 | Gilligan et al. | |
| 2006/0282408 A1 | 12/2006 | Wisely et al. | |
| 2006/0287897 A1 | 12/2006 | Sobalvarro et al. | |
| 2007/0061174 A1 | 3/2007 | Phillips | |
| 2007/0073562 A1 | 3/2007 | Brice et al. | |
| 2007/0192147 A1 | 8/2007 | Liew et al. | |
| 2007/0294116 A1 | 12/2007 | Stephens et al. | |
| 2008/0010099 A1 | 1/2008 | Walker et al. | |
| 2008/0027768 A1 | 1/2008 | Thurlow et al. | |
| 2008/0140581 A1 | 6/2008 | Mayer | |
| 2008/0319992 A1* | 12/2008 | Mathai et al. | 707/5 |
| 2009/0234682 A1 | 9/2009 | Baggett et al. | |
| 2009/0327062 A1 | 12/2009 | Botes | |
| 2010/0138700 A1 | 6/2010 | McLellan et al. | |
| 2010/0153143 A1 | 6/2010 | Baggett et al. | |
| 2011/0046989 A1 | 2/2011 | Crean et al. | |
| 2011/0320227 A1 | 12/2011 | Thomas et al. | |

OTHER PUBLICATIONS

International Search Report and the Written Opinion of the International Searching Authority for International Application No. PCT/US08/50184, dated Nov. 3, 2008.

International Search Report and the Written Opinion of the International Searching Authority for International Application No. PCT/US08/50186, dated Nov. 3, 2008.

International Search Report and the Written Opinion of the International Searching Authority for International Application No. PCT/US08/50188, dated Nov. 3, 2008.

International Search Report and the Written Opinion of the International Searching Authority for International Application No. PCT/US08/50190, dated Nov. 3, 2008.

International Search Report and the Written Opinion of the International Searching Authority for International Application No. PCT/US08/50191, dated Nov. 3, 2008.

International Search Report and the Written Opinion of the International Searching Authority for International Application No. PCT/US08/50192, dated Nov. 3, 2008.

International Search Report and the Written Opinion of the International Searching Authority for International Application No. PCT/US08/50193, dated Nov. 3, 2008.

International Search Report and the Written Opinion of the International Searching Authority for International Application No. PCT/US08/50199, dated Nov. 3, 2008.

International Search Report and the Written Opinion of the International Searching Authority for International Application No. PCT/US08/50203, dated Nov. 3, 2008.

Authorized officer Wolfgang Konig, Supplementary European Search Report in EP Application No. 08713520.8-2201, mailed Jan. 4, 2013, 3 pages.

http://web.archive.org/web/20060104033819/http://travelocity.com/, www.archive.org, retrieved Apr. 29, 2009.

Authorized officer Philippe Becamel, International Preliminary Report on Patentability for PCT/US2008/050196, mailed Nov. 26, 2009, 7 pages.

Authorized officer Nora Linder, International Preliminary Report on Patentability in PCT/US2008/050184, mailed Jul. 16, 2009, 5 pages.

Authorized officer Nora Linder, International Preliminary Report on Patentability in PCT/US2008/050186, mailed Nov. 26, 2009, 6 pages.

Authorized officer Nora Linder, International Preliminary Report on Patentability in PCT/US2008/050188, mailed Jul. 16, 2009, 9 pages.

Authorized officer Philippe Becamel, International Preliminary Report on Patentability in PCT/US2008/050190, mailed Nov. 26, 2009, 6 pages.

Authorized officer Philippe Becamel, International Preliminary Report on Patentability in PCT/US2008/050191, mailed Jul. 16, 2009, 5 pages.

Authorized officer Philippe Becamel, International Preliminary Report on Patentability in PCT/US2008/050192, mailed Nov. 26, 2009, 5 pages.

Authorized officer Philippe Becamel, International Preliminary Report on Patentability in PCT/US2008/050193, mailed Jul. 16, 2009, 6 pages.

Authorized officer Dorothee Mulhausen, International Preliminary Report on Patentability in PCT/US2008/050199, mailed Dec. 3, 2009, 6 pages.

Authorized officer Dorothee Mulhausen, International Preliminary Report on Patentability in PCT/US2008/050203, mailed Jul. 16, 2009, 10 pages.

* cited by examiner

| | Getaways from [Boston] | max stops [1] | num-to-show [3] | |
|---|---|---|---|---|
| This weekend | | | Next weekend | |
| St. John's | $512 (normally $800) | | St. John's | $512 (normally $800) |
| Acapulco | $335 (normally $500) | | Anchorage | $445 (normally $1000) |
| Paris | $600 (normally $1200) | | Paris | $605 (normally $900) |

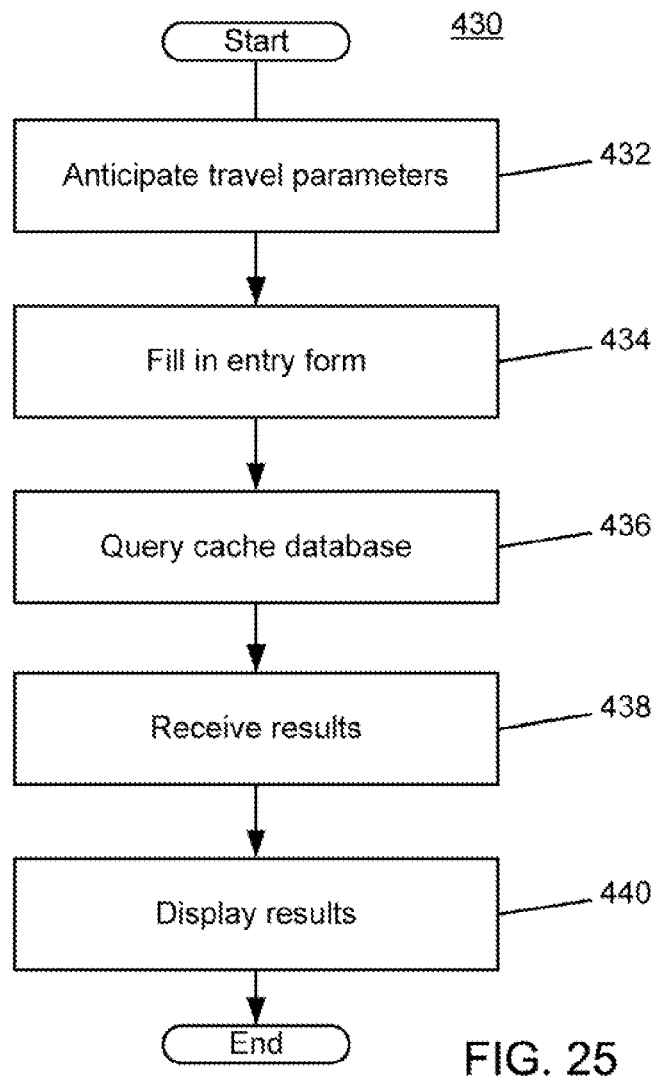

462

| Travel to the International Spelunking Society's Annual Conference, June 15th-17th in Brisbane | | | |
|---|---|---|---|
| Coming From [LON] | max stops [1] | cabin class [coach] | |
| Depart | Jun 17 | Jun 18 | Jun 19 |
| Arrive   Jun 13 | $500 | $600 | $500 |
| Jun 14 | $500 | $600 | $500 |
| Jun 15 | $700 | $600 | $700 |

| Visit the Canary Islands and stay at the Hotel Contemporaneo | | | | | | | | | | | | | | |
|---|---|---|---|---|---|---|---|---|---|---|---|---|---|---|
| Coming from [Manchester] | | | | length of stay [5 days] | | | | | | | | | | |
| <previous> | | | | November 2005 | | | | | | <next> | | | | |
| Su | | Mo | | Tu | | W | | Th | | | Fr | | Sa | |
| | | | | 1 | $100 | 2 | NF | 3 | $100 | 4 | $100 | 5 | | $100 |
| 6 | $100 | 7 | $100 | 8 | $100 | 9 | NF | 10 | $100 | 11 | $100 | 12 | | $100 |
| 13 | $100 | 14 | $100 | 15 | $100 | 16 | NF | 17 | $100 | 18 | NR | 19 | | NR |
| 20 | NR | 21 | $80 | 22 | $80 | 22 | NF | 24 | $80 | 25 | $80 | 26 | | $80 |
| 27 | $80 | 28 | $80 | 29 | $80 | 30 | NF | | | | | | | |

FIG. 29

ANTICIPATORY PRESENTATION OF TRAVEL INFORMATION

CROSS-REFERENCE TO RELATED APPLICATIONS

This application is a Continuation of and claims the benefit of priority to U.S. patent application Ser. No. 11/650,312, filed on Jan. 5, 2007, now issued as U.S. Pat. No. 7,711,587, entitled "Providing Travel Information using Cached Query Answers", the contents of which are hereby incorporated by reference.

TECHNICAL FIELD

This disclosure relates to travel scheduling and pricing, and more particularly to processing low-fare search queries for air travel planning computer systems.

BACKGROUND

Conventional travel planning systems (TPSes) are used to produce itineraries and prices by selecting suitable travel units from databases containing geographic, scheduling and pricing information. In the airline industry, for example, fundamental travel units include "flights" (sequences of regularly scheduled takeoffs and landings assigned a common identifier) and "fares" (prices published by airlines for travel between two points). The term "itinerary" refers to a sequence of flights on particular dates and the term "pricing solution" refers to a combination of fares and itineraries.

In conventional travel planning such as for air travel scheduling, flight pricing and low-fare-searching, travel queries are posed by users from travel agent systems, airline reservation agent systems, travel web sites, and airline-specific web sites. Low-fare-search (LFS) queries typically include origin and destination information, time constraints, and may include additional information such as passenger profile and travel preferences. TPSes respond to these LFS queries and typically return a list of possible travel options of a flight combination with price information.

TPSes expend considerable computational resources responding to LFS queries. It is not uncommon for a TPS to spend more than 30 seconds responding to an LFS query, even for a relatively straightforward round-trip query leaving and returning from specific airports on specific dates. This delay is undesirable for the user of the system, as it reduces interactivity.

SUMMARY

The computational cost of responding to LFS queries is burdensome to the TPS and as a consequence it is economically impractical for the TPS to respond to queries without remuneration, reducing the range of uses for which the TPS can be used. For these reasons, it is desirable to reduce the marginal cost of answering an LFS query.

The invention provides systems and methods, including computer program products, for travel planning.

In general, in one aspect, the invention features a system for presenting travel information to a user. The system includes a database storing cached travel options for travel planning, the cached travel options being obtained from prior queries; and a processor configured to include, a code in a web page, the code including predetermined travel parameters specified by the user; detect that the user has accessed the web page; populate a travel query with the predetermined travel parameters and a variable parameter based on identification information associated with the user; and present, to the user, cached travel options stored in the database that satisfy the travel query.

In general, in another aspect, the invention features a system for presenting travel information to a user. The system includes a processor configured to include in a web page, a code comprising predetermined travel parameters specified by a party that controls the web page; detect that the user has accessed the web page; populate a travel query with the predetermined travel parameters and a variable parameter based on identification information associated with the user, wherein the travel query is not solicited by the user; and present, to the user, cached travel options obtained from prior queries, in which the cached travel options satisfy the travel query.

In general, in another aspect, the invention features a method and a computer program product for presenting travel information to a user. The method includes including, a code in a web page, the code including predetermined travel parameters specified by the user; detecting that the user has accessed the web page; populating a travel query with the predetermined travel parameters and a variable parameter based on identification information associated with the user; and presenting, to the user, cached travel options obtained from prior queries, in which the cached travel options satisfy the travel query.

In general, in a further aspect, the invention features a method and a computer program product for presenting travel information to a user. The method includes including in a web page, a code comprising predetermined travel parameters specified by a party that controls the web page; detecting that the user has accessed the web page; populating a travel query with the predetermined travel parameters and a variable parameter based on identification information associated with the user, in which the travel query is not solicited by the user; and presenting, to the user, cached travel options obtained from prior queries, wherein the cached travel options satisfy the travel query.

Embodiments may include one or more of the following. The user may be provided the capability to edit the predetermined travel parameters and the variable parameter with new travel parameters. A new travel query with the new travel parameters may be populated; a cache database storing cached travel options for travel planning may be searched; and a subset of travel options from the cached travel options satisfying the new travel query may be returned to the user. The travel query may not solicited by the user.

The identification information may include location identification information (e.g., an internet protocol (IP) address) sufficient to determine a geographic location of the user. The travel query may be populated with a variable parameter including one of an outbound city, a destination city, an outbound airport, and a destination airport. One or more travel parameters may be anticipated in response to the user accessing a web page that is associated with a party. The predetermined travel parameters may include a departure date corresponding to a start of an event to be hosted by the party that is associated with the web page, a return date corresponding to an end date of the event, and a destination airport corresponding to an airport nearest to a geographic location of the event, and the variable parameter may include an origin airport corresponding to an airport nearest to a geographic location of the user. Presenting the cached travel options may include displaying an advertisement comprising the cached travel options, wherein the advertisement is affiliated with an enterprise paying the party associated with the web page for permitting the inclusion of the code. The predetermined travel parameters may include a destination airport corresponding to an airport nearest to a lodging establishment, and the variable parameter may include an origin airport corresponding to an airport nearest to a geographic location of the user.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 25 is a flowchart of a process for receiving user preferences via entry forms.

FIG. 26 is a diagram of a display for presenting travel information to a user.

FIG. 28 is a diagram of an interface for presenting travel information to an attendee from a conference home page.

FIG. 29 is a diagram of an interface for presenting travel information to a user from a web page affiliated with lodging or other services having time-varying availability or price.

DETAILED DESCRIPTION

Many types of important time-varying information are widely disseminated in electronic form on a continuous basis, such as daily stock closing prices available for free on the Internet. Typically, dissemination occurs when the information is of general interest and is not expensive to compute and distribute. However, air travel information is not usually disseminated in this manner. This is primarily because the computational cost of calculating travel prices is sufficiently high that TPSes must ration LFS queries, either by limiting the number that a travel agent or traveler may perform, or by charging for them. A second reason is that TPSes take time to compute answers to LFS queries, limiting the dissemination of such information to modalities where delays are acceptable (this, for example, prevents the inclusion of results on the home pages of web portals, as it would not be acceptable for the display of other information on such pages to be delayed).

Described below are structural and operation features of a travel planning system that includes a cache database to permit relatively low cost and low latency dissemination of travel information, including examples of business applications supported by the system.

I. Caching

Figure 1:
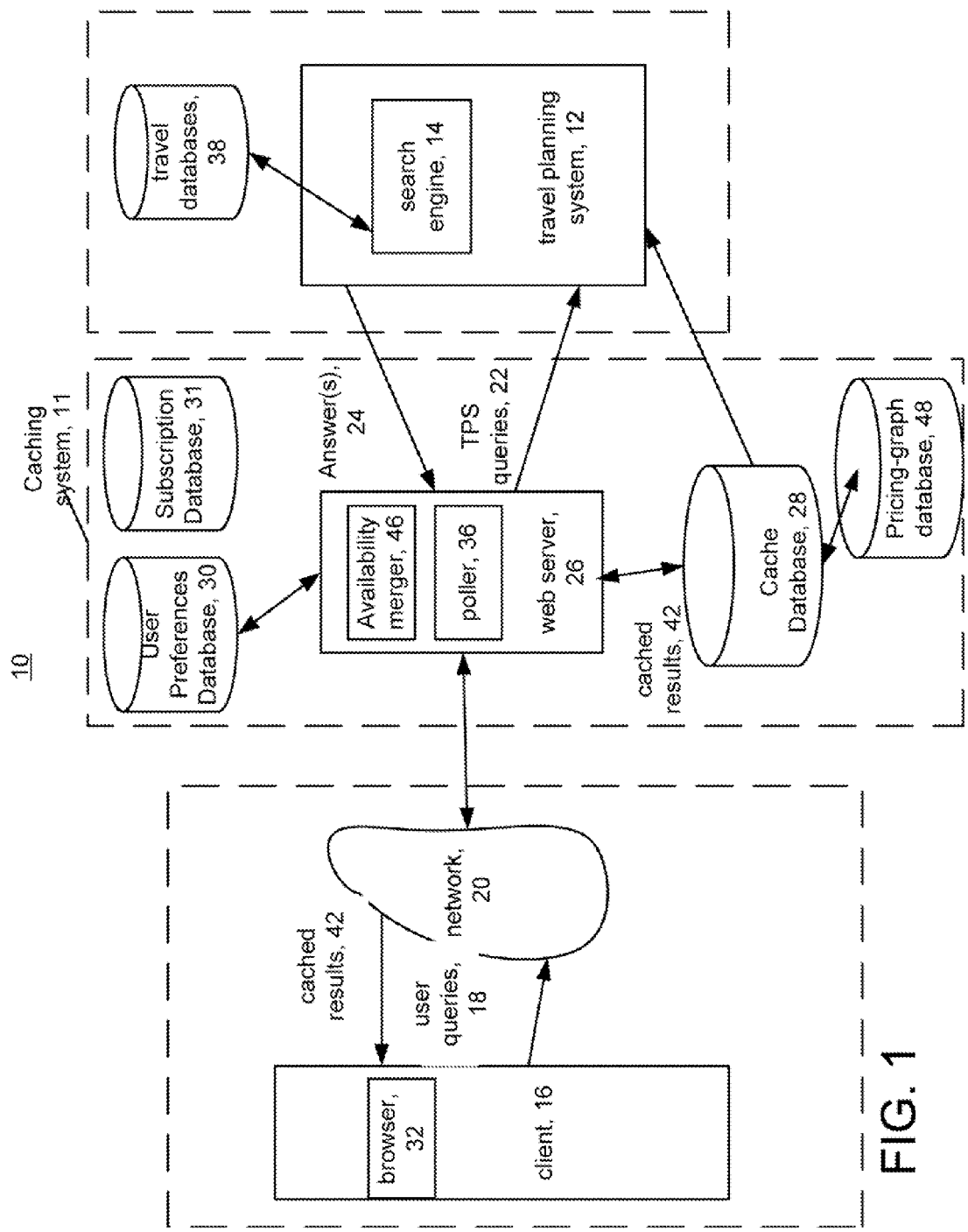
FIG. 1 is a block diagram of a travel planning system including a cache database.

Referring to FIG. 1, a cached-based travel planning system 10 includes a caching system 11 coupled to a client 16 via a network 20 (e.g., a LAN, WAN, the Internet, or a combination thereof). The caching system 11 includes a user preferences database 30, a subscription database 31, a web server 26, a cache database 28, and a pricing-graph database 48. The web server 26 includes a poller program 36 and an availability merger 46. The cache database 28 interacts with a conventional travel planning system 12 through the poller program 36 running on the web server 26. The poller program 36 preemptively poses LFS queries 22 (also referred to as TPS queries 22) to a travel planning system (TPS) 12. The LFS queries 22 are not solicited by users but rather are formulated and maintained by the poller 36. The LFS queries 22 include travel parameters such as origins, destinations, travel dates and other preference or conditions of travel (e.g., non-stop, first class, carrier, etc.).

The TPS 12 includes a search engine 14 that searches fare and flight information in travel databases 38 and constructs answers 24, which include pricing solutions (also referred to as travel options), from the flight and fare information. Those answers 24 that satisfy the LFS queries 22 are stored in the cache 28 as cached results 42. The travel databases 38 contain schedule information provided by carriers, typically in the so-called Standard Schedules Information Manual (SSIM) format, fares published by carriers and resellers, and fare rules that govern how and whether fares can be used with flights. The fare and fare rule information are typically provided through an intermediary, The Airline Tariff Publishing Company (ATPCO). The databases 38 may also contain "availability" information that is used to predict whether space is available on flights, or availability information may be obtained through communication links to external sources such as revenue management systems of airlines. In some implementations, the TPS 12 is a conventional computer reservation system (CRSs), Sabre®, Galileo®, Amadeus®, and WorldSpan®. Some availability information, e.g., flight availability, may be more accessible than other availability information, e.g., seat availability, which can change more rapidly. For example, seat availability typically changes more quickly than flight availability. In other implementations the TPS can be systems such as Orbitz, Expedia, Travelocity and other systems that typically operate over the Internet.

The travel options retrieved from the travel databases 38 are referred to as "answers" 24 and include information such as flights, (flight number, airline, etc.) and fares that can be used with the flights. The web server 26 receives the answers 24 from the TPS 12, processes the answers, and stores the answers in the cache database 28. The processed answers 24 stored in the cache database are referred to as "cached results" 42. The cached results 42 stored in the cache database 28 may include all or a portion of the answers 24 returned from the TPS 12. A cached result 42 can include a set of answers 24 or correspond to a single answer 24. The cached results 42 in the cache database 28 are obtained in response to TPS queries 22, which are either performed preemptively, e.g., by the poller 36 or in response to user supplied travel planning queries 18. The cached results 42 may include pricing solutions and/or information associated with pricing solutions (e.g., the lowest price for a particular fare). The availability merger 46 checks seat availability of an initial answer 24 returned from the TPS 12 before storing it as a cached result 42 in the cache database 28.

Independently of the poller program 36, at a web browser 32 of a client computer 16, a user specifies travel parameters of trip of interest in a travel query 18. Examples of one or more travel parameters of the travel query 18 include origins, destination, travel dates and other preferences or conditions of travel requested by the user, e.g., nonstop, first class, etc. The client 16 sends the query 18 to the web server 26, via the network 20. After receiving the query 18, the web server 26 searches the cache database 28 for cached query results 42 that satisfy the travel parameters of the query 18. The cached results 42 that satisfy the user's query 18 may be referred to as "qualifying cached results 42." The qualifying cached results 42 are returned to the client 16, at which they are presented to the user through the web browser 32. In this manner, a qualifying cached result 42 is substituted for an actual answer 24 that would be received directly from the TPS 12 had the TPS 12 actually processed the query 18 immediately after the query 18 had been posed. By answering queries 18 with qualifying query results 42 selected from the cached query results 42 stored in the cache database 28, the travel planning system 10 reduces marginal costs and latency involved with directly querying the conventional TPS 12.

The cache database 28 may be used for a variety of applications including responding to specific questions posed by users at a travel agent or airline web site, performing historical price analysis, triggering notifications to users of trips of interest, alerting airlines of prices below expected market thresholds, and so forth. The system 10 shown in FIG. 1 could be implemented in the context of a variety of business applications in which revenue is derived from various parties.

To conserve memory and computational resources, the answers 24 retrieved from the TPS 12 may be represented as a pricing graph (i.e., a compact representation including nodes corresponding to flights and fares that can produce travel itineraries of the answers 24 and stored in the pricing graph database 48.

The preferences database 30 stores travel parameters and preferences, editable by users, that include travel preferences such as preferred origin airports, destination airports or locations or location types (e.g., "ski resorts"), or favorite trips with or without dates. The subscription database 31 stores account information of users who subscribe to various services supported by the caching system 11.

A. Poller Program

The poller 36 maintains a list of TPS queries 22 over markets and dates of interest and regularly populates the cache database 28 with answers 24 supplied by TPS 12 in accordance with the TPS queries 22. The poller 36 continually cycles, sending (in sequence or concurrently or some mix) the set of TPS queries 22 to the TPS 12. A search engine 14 at the TPS 12 that may include multiple search engines at multiple computers responds to individual TPS queries 22 and returns answers 24 satisfying the queries. In some embodiments, the answers 24 include pricing solutions (for example, the single cheapest solution for each market and date combination) or summary information of pricing solutions (for example, the price of the single cheapest solution for each market and date combination). In other embodiments, described below, the answers 24 include a pricing graph from which pricing solutions are enumerated. The poller 36 processes the answers 24 returned by the TPS and stores the answers 24 in the cache database 28 as cached results 42.

In some embodiments, the poller 36 poses certain TPS queries 22 at a higher frequency than other TPS queries 22. For example, the poller 36 poses queries 22 that include markets of high popularity or dates near to the present at higher frequencies than other queries 22. The poller 36 varies the polling frequency to reduce staleness of entries of high importance or of data that is expected to change at a more frequent rate. The poller 36 may also vary the polling frequency based on knowledge of data changes. For example, the poller 36 may give priority to international queries immediately after receipt of international fare updates and give priority to domestic queries after receipt of domestic fare updates.

1. Population of the Cache Database Using Pricing Solutions

Figure 2:
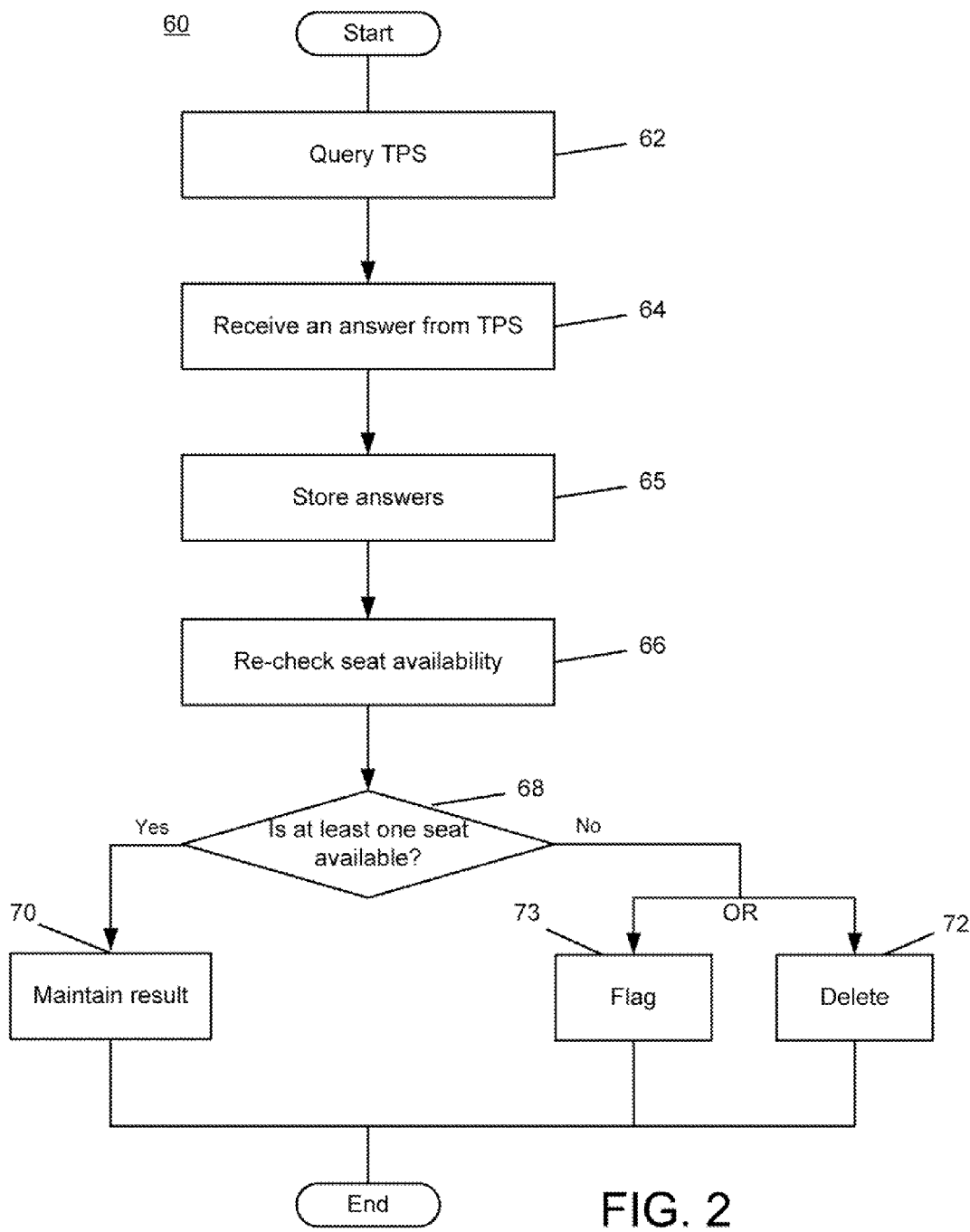
FIG. 2 is a flowchart of a process for populating the cache database.

Referring to FIG. 2, the poller 36 and availability merger 46 (of FIG. 1) implement a process 60 that checks seat availability of an initial answer 24 returned from the TPS 12 before storing an answer in the cache database 28. The poller 36 preemptively queries (62) the travel planning system 12 with a TPS query 22 specifying parameters of trips. The poller 36 receives (64) one or more answers 24 to the TPS query 22 from the TPS 12, the answers 24 being in the form of pricing solutions. In providing answers 24 to the poller 36, the TPS 12 calculates the pricing solutions that satisfy the TPS query 12 and determines whether those pricing solutions include available seats. Only those pricing solutions for which seats are available are returned to the poller 36 as answers 24. The poller 36 stores (65) the answers 24 as results 42 in the cache database 28, the results 42 being in the form of pricing solutions or as summaries of pricing solutions. Thus, at the time of caching, the results 42 include available seats. At one or more subsequent times, the process 60 re-checks (66) seat availability of the cached results 42. In some embodiments, the process 60 re-checks (66) seat availability by querying the TPS 12 to determine seat availability of the cached results 42. In other embodiments, the process 60 re-checks (66) seat availability, without the use of TPS 12, by predicting whether at least one seat is available on each of the flights in the itinerary information of the answer. Techniques for predicting availability are described in U.S. Pat. No. 6,418,413 and assigned to the assignee of the present application and incorporated herein by reference. The process 60 may re-check the seat availability of a result 42 at regular time intervals and/or at a time immediately before the result 42 is returned to a user.

If the availability merger 46 determines (68) that there are one or more available seats on flights associated with a cached result 42, the poller 36 maintains (70) the result 42 in the cache database 28. If, on the other hand, the availability merger 46 determines (68) that at least one of the flights associated with the result 42 has no seats available, the poller 36 deletes (72) the result 42 from the cache database 28 or flags (73) the result 42 as unavailable to prevent the caching system 11 from returning the result 42 to a user. In some embodiments, process 60 does not re-check seat availability (steps 66, 68, 70 and (72 or 73)) of the cached results 42.

The process 60 ensures that unavailable answers 24 are not initially stored in the cache database 28 as cached results 42. The process 60 has the disadvantage that process 60 cannot make the unavailable answers 24 available if subsequent availability checks indicate that the unavailable answers are now available because it initially did not store those answers in the cache database 28. However, the process 60 provides an advantage that the initial filtering of pricing-solutions is guided by seat availability, so fewer pricing-solutions need to be stored in the cache database 28 because it is more likely that the pricing solutions that are stored are more likely to be available.

2. Population of the Cache Database Using Pricing Graphs

In some embodiments, the availability merger 46 can avoid checking availability during an initial query of the TPS 12 and return a set of answers 24 that are regularly checked for availability in a separate availability merging process. As the number of returned answers 24 increases, the amount of memory needed to store the answers 24 and the demand on computational resources to perform seat availability checks on the answers concomitantly increases. To conserve memory and computational resources, the poller 36 represents the answers 24 retrieved from the TPS 12 as a pricing graph (i.e., a compact representation including nodes corresponding to flights and fares that can produce travel itineraries of the answers 24).

Figure 3:
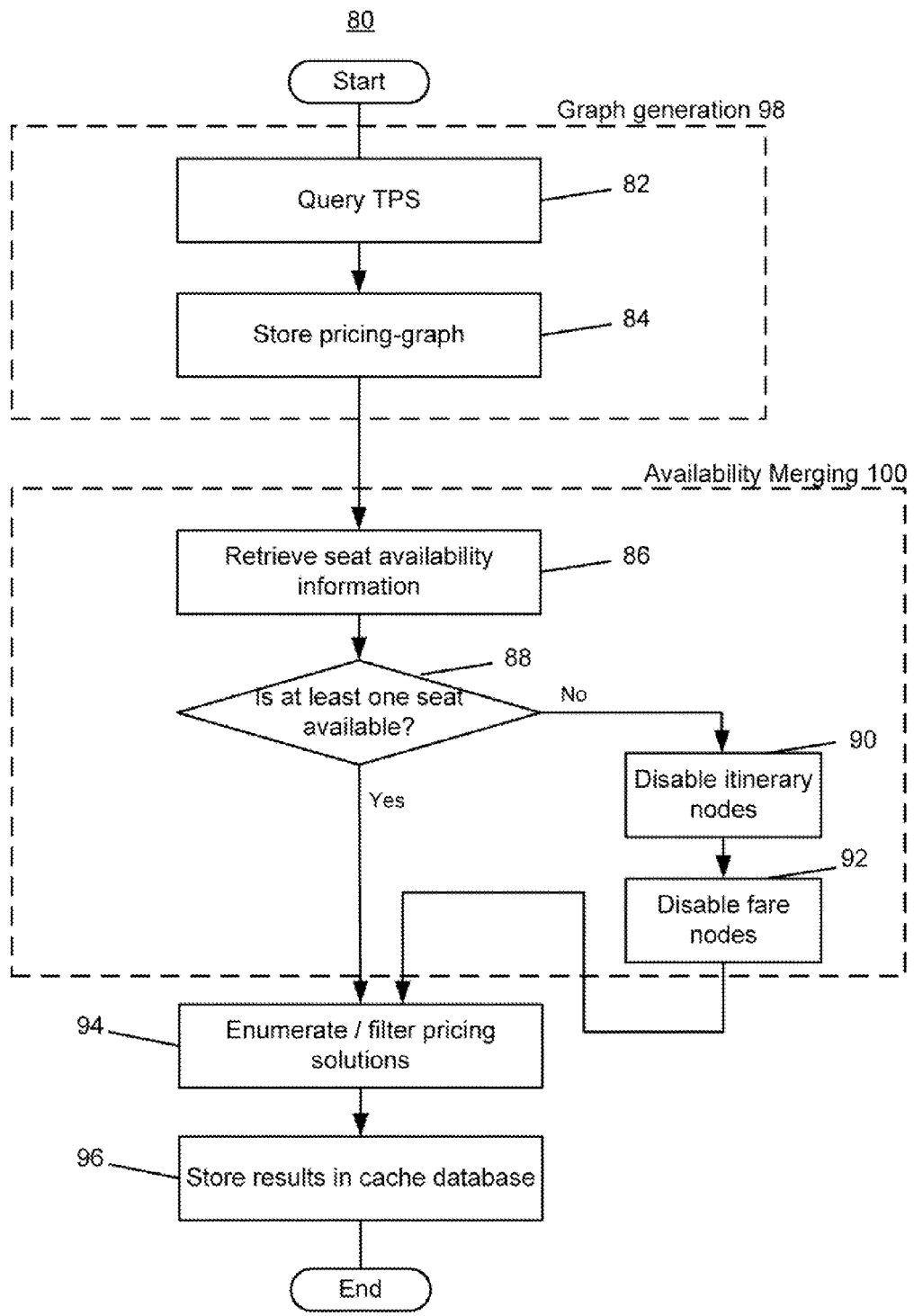
FIG. 3 is a flowchart of an alternative process for populating the cache database.

Referring to FIG. 3, the poller 36 (see FIG. 1) and availability merger 46 implement a process 80 that checks seat availability of itineraries encoded in a pricing graph returned from the TPS 12. The poller 36 regularly sends (82) queries 22 to the TPS that disable seat availability checks and request answers 24 in the form of a pricing-graph. The TPS 12 generates a pricing-graph that encodes all possible pricing-solutions for a set of itinerary combinations, including many for which no seats are available. The generation of a full-availability pricing-graph can be computationally more efficient than one filtered by seat availability, because while there are more pricing-solutions represented in the pricing-graph, the pricing-solution set may factor better, resulting in a smaller pricing-graph. For example, if each of 10 itineraries may be combined with each of 10 fares, a compact representation such as the pricing-graph may represent the set of 100 combinations using a "factored" structure of size 20, rather than 100. However seat availability as determined by airline revenue management systems may eliminate an irregular subset of the 100 combinations in a manner that does not permit simple factorization of the resulting set. Thus, if a TPS constructs a representation of all available answers, that representation may be substantially larger than the set of all answers, regardless of seat availability.

The poller 36 stores (84) the pricing graph, which may include multiple pricing graphs, in a pricing-graph database 48 indexed by appropriate key information such as airports or dates (i.e., whatever information is particular to the query that generated the pricing-graph). The pricing-graph database 48 may be a separate database or may be a portion of the cache database 28. The querying and storing processes (82, 84) are collectively referred to as the graph generation process 98.

In some embodiments, during or after storing 84, the poller 36 translates booking-code restrictions of each fare within the pricing graph into a form that can be efficiently evaluated against itinerary, seat availability, such as by pre-recording the set of booking-codes for which if the booking-code were available on each flight of the fare-component, the fare's booking-code restrictions would pass.

The availability merger 46 regularly cycles over pricing graphs stored in the pricing-graph database 48, retrieving each of the pricing-graphs from the database 42. For a retrieved pricing graph, the availability merger retrieves (86) seat availability information for the travel itineraries represented in the pricing graph. This may be done using a number of techniques including posing itinerary or flight availability questions to an availability server within the TPS 12 or to an availability predicting system for those flights or itineraries in the pricing graph. These and other techniques for determining availability of an itinerary are further described below.

In some implementations, seat availability information is retrieved (86) for all itineraries that appear in the pricing-graph. For each itinerary, the availability merger 46 determines (88) if at least one seat is available.

The pricing graph is a compact representation of a larger set of itinerary and fare combinations. In many instances, several itineraries may combine in all possible ways with several fares. In such circumstances, the pricing-graph optimally compresses the set of combinations into a (AND (OR itin1 itin2 . . . ) (OR fare1 fare2 . . . ) structure. Airlines seat availability on a combination of flights and a property of a fare called the "booking code." Seat availability checks may rule out essentially arbitrary combinations of fares with itineraries. Thus, if without considering seat availability a set of valid combinations is

|       | fare1 | fare2 | fare3 |
|-------|-------|-------|-------|
| itin1 | yes   | yes   | yes   |
| itin2 | yes   | yes   | yes   |
| itin3 | yes   | yes   | yes.  |

After checking seat availability the combinations may be

|      | fare1 | fare2 | fare3 |
|------|-------|-------|-------|
| itin1 | yes  | yes   | no    |
| itin2 | no   | yes   | no    |
| itin3 | no   | yes   | no.   |

The pricing-graph representation stores pricing solutions that may or may not have an available seat. The process extracts an explicit list of pricing solutions and filters those pricing solutions by seat availability. One way to do this is to alter the "enumeration" algorithm described in U.S. Pat. No. 6,275,808 by Carl G. de Marcken and assigned to the assignee of the present invention and incorporated herein by reference. In this alteration, to extract pricing solutions from the pricing graph, the enumeration algorithm includes an explicit filtering process that checks fare and itinerary combinations against a table of seat availability retrieved by querying an availability server. However, that approach may be somewhat inefficient, as the algorithm may generate many answers that turn out to be unavailable. There are optimizations to alleviate this problem.

One such optimization that is described by "disable itinerary nodes" and "disable fare nodes", disables itineraries if in the seat availability table the itinerary's row has no "yes" entries (that is, no fares are compatible with it), and disables fares if in the seat availability table the fare's column has no "yes" entries (that is, no itineraries are compatible with it).

The availability merger 46 disables (90) nodes in the pricing graph corresponding to a subset of the travel itineraries for which no seats are available, and disables (92) nodes in the pricing graph corresponding to a subset of the fares for which no travel itineraries are available.

In other implementations, for each fare in the pricing graph that can potentially be combined with an itinerary (the fare covers the same slice as the itinerary and appears under a common AND node), the fare's booking code restrictions are evaluated against the seat availability information for that itinerary, to produce a table of fare and itinerary combinations that are permitted by seat availability. If a fare or itinerary fails to appear in any entry in this table, it can be disabled using the mechanisms described in U.S. Pat. No. 6,275,808 and assigned to the assignee of the present application and incorporated herein by reference. The retrieving, determining, and disabling processes (86, 88, 90, and 92) are collectively referred to as the availability merging process 100.

After nodes of the pricing graph have been disabled (90, 92) based on seat availability constraints, the poller 36 enumerates (94) pricing-solutions from the pricing-graph. During enumeration (94), the poller 36 compares fares and itineraries of the pricing solutions to the seat availability tables determined in step 86 and filters those pricing solutions having fare/itinerary combinations for which no seats are available.

In some embodiments, during enumeration (94), the poller 36 extracts pricing-solutions from the pricing-graph and that filters itinerary and fare combinations found in partial solutions against the itinerary and fare validity table. The filtering can include an explicit filtering test. When an itinerary and fare are combined in a partial pricing-solution, the table is checked; if the fare and itinerary combinations is not in the table, the partial pricing-solution is discarded. Examples of enumeration algorithms for use by poller 36 are described in U.S. Pat. No. 6,275,808 by Carl G. de Marcken and assigned to the assignee of the present invention and incorporated herein by reference.

The process 80 stores (96) the remaining pricing-solutions as results 42 in the cache database 28.

The seat availability check (88), the disabling procedures (90, 92) and the enumeration process (94) can be integrated. For example, in some embodiments, during the enumeration process 94, when an itinerary and fare are combined in a partial pricing-solution, the table of fare and itinerary combinations that are permitted by seat availability is checked. If the fare and itinerary combinations are not in the table, the partial pricing-solution is discarded. Other more efficient methods for taking seat availability constraints into account when extracting pricing-solutions or summary information from the pricing-graph may be possible.

The volume of data generated by the TPS 12 in response to the queries 22 is typically quite large and storage of the data in the cache database 28 requires significant memory resources. For example, if for an ordinary single market and date pair query, the TPS 12 returns 100 answers 24 (potential tickets), then for the 10,000 market/5000 date-pair example, the TPS 12 returns 5,000,000,000 answers. Storing on the order of a billion answers 24 in the cache database 28 may or may not be practical. It is possible to represent a complete pricing solution in, e.g., 100 to 1000 bytes or less if suitable compression schemes are used, resulting in database sizes on the order of terabytes.

As the number of answers 24 grows, the computational resources necessary to generate pricing solutions within an acceptable time frame (e.g., 100 solutions for each of 5,000 date pairs in a 100-second timeframe) for the answers 24 grows exceedingly fast and may become prohibitively expensive. Although the travel planning system 100 may be able to efficiently generate a pricing graph representation of the set of answers 24 from the TPS 12, the cost of enumerating individual pricing-solutions from the pricing-graph grows linearly with the number of answers to be enumerated.

Many applications do not require the complete set of answers to be generated and stored. For example, typically travelers go through a high-level exploratory phase before they consider itinerary details. In such a phase, the primary concerns are coarse features such as origin, destination, price, airline, and number of stops, features highlighted in user interfaces presented to the user by the browser 32. Similarly, the display of price calendars showing a range of dates over which a particular price (e.g., a cheapest price) applied does not require detailed flight information, or a broad diversity of answers. Since such high-level explorations may be performed far more often than investigations of details, methods for reducing the cost of accessing high-level summary information may be of value even if substantial computation is expended to extract the details necessary for purchase of a ticket.

To reduce the potential for answer generation or database storage to become a bottleneck, summary information that summarizes the answers 24 to TPS queries 22, rather than the actual answers 24 themselves, is stored in the cache database 28 as cached results 42. The summary information, for example, may include the lowest available price (or corresponding pricing solution) for each combination of origin, destination, and travel dates. Summary information can characterize a group of pricing solutions belonging to one or more super categories. For example, summary information may include a range of prices for pricing solutions that include any US city as an origin and any European city as a destination. A result 42 in the form of summary information describes a group of pricing solutions in broad terms and generally includes less information than a result 42 in the form of a complete pricing solution for a trip. Storing summary information of pricing solutions as results 42, rather than the pricing solutions themselves, reduces the number of answers 24 that need to be enumerated by the TPS 12 and the memory required to store them in the cache database 28.

The summary information can be selected on the basis of the applications to be supported. For example, to support the display of itineraries and fares in the form of a pricing matrix that groups the itineraries by airline and cheapest price, it may be necessary for the TPS to return the cheapest price per airline and per airline/number-of-stops combination. An example of a pricing matrix is disclosed in U.S. Pat. No. 6,801,226 assigned to the assignee of the present invention and incorporated herein by reference. It may also be desirable to differentiate by price, cabin class, or fare product category (e.g., refundable vs. non-refundable fares). Diversity techniques such as that presented in patent application entitled METHOD FOR GENERATING A DIVERSE SET OF TRAVEL OPTIONS, Ser. No. 09/431,365, filed on Nov. 1, 1999 by Carl de Marcken, pending and assigned to the assignee of the present application and incorporated herein by reference, can be used to extract a small number of answers with sufficient diversity to satisfy many users' preferences.

C. Updating the Cache Database

The correctness of a cached result for a particular query depends on whether the flights, fares, and seats that affect the results have changed. Although the results 42 are initially available when the poller 36 stores them in the cache database 28, over time, one or more of a fare, flight, and seat associated with the results 42 may become unavailable, or indeed changes to the underlying flight and fare data may make one or more of the results invalid. To reduce the likelihood that an unavailable result 42 is returned to a user, the availability merger 46 checks the availability of the results 42 and updates the results 42 accordingly.

Furthermore, because availability information typically changes more rapidly than other data, such as flights and fares and fare rules, it is often desirable to recheck seat availability of pricing-solutions at a higher rate of evaluation than rechecking fares and flights (to see if the results are still valid). This may be accomplished by separating the processes involved in evaluating seat availability from those involved in evaluating flights and fares and fare rules, as will be discussed below in FIGS. 5A and 5B.

Figure 4:
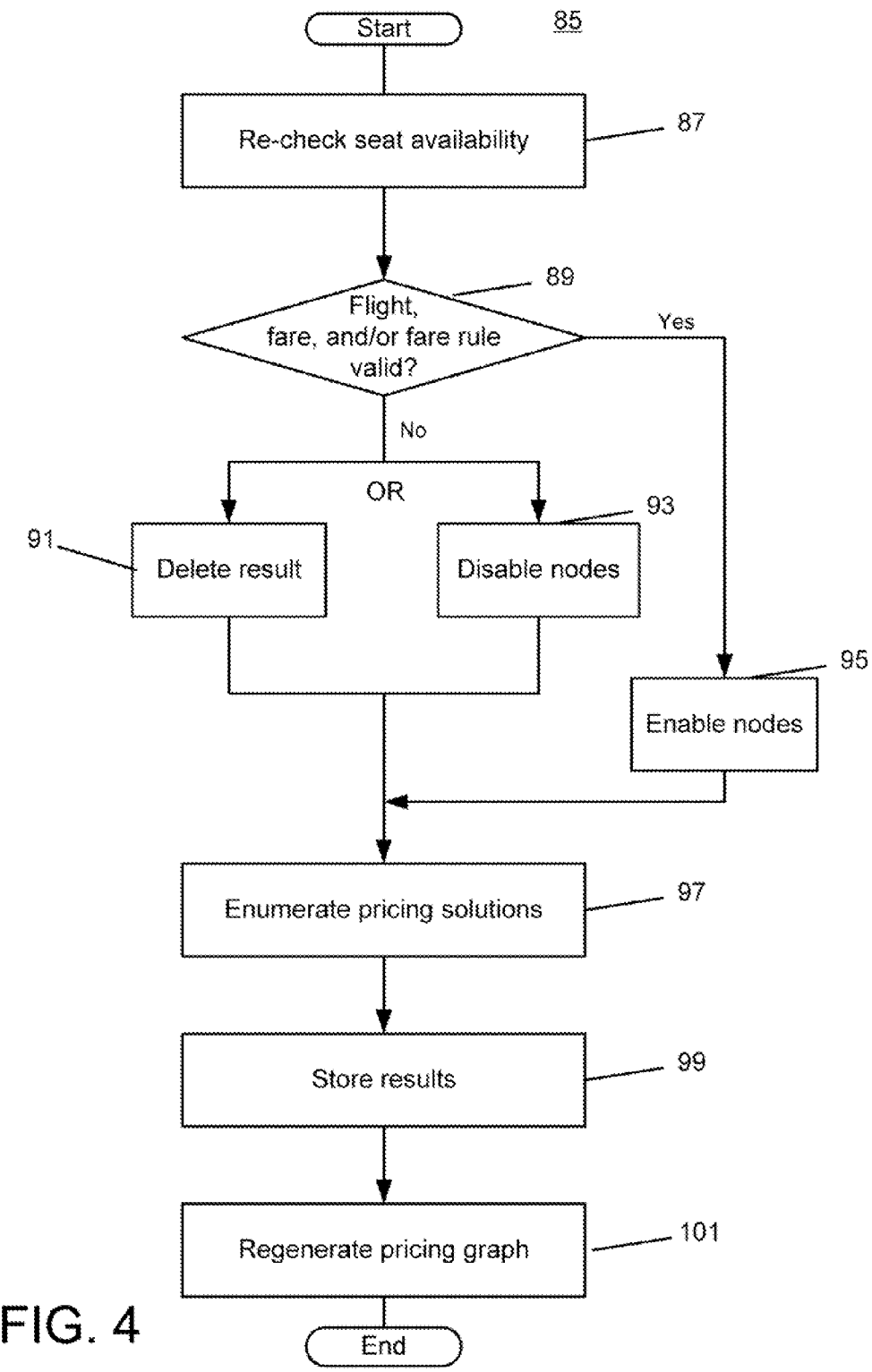
FIG. 4 is a flowchart of a process for updating the cache database.

Referring to FIG. 4, a process 85 for updating results 42 stored in the cache database 28 by regularly re-checking availability of results derived 42 from the pricing graphs is described. The idea is that the TPS 12 is queried for a pricing-graph (computed with or without seat availability checks, preferably without) and then at regular intervals a separate process extracts results and filters them for seat availability. The availability merger 46 rechecks (87) seat availability of flights associated with a cached result and determines (89) whether one or more of a flight, fare, and fare rule associated with the cached result are still available. As particular itineraries and fares become unavailable, the availability merger 46 deletes (91) the result from the cache database 28. Alternatively, the availability merger 46 disables (93) the nodes corresponding to the unavailable itineraries or fares in the pricing graph (stored in pricing-graph database 48) from which the results 42 were derived. Likewise, as various itineraries and fares that were previously unavailable become available, the availability merger 46 enables (95) the corresponding nodes in the pricing graph that were previously disabled. The availability merger 46 may perform the availability rechecking and the enabling/disabling of nodes in accordance with the availability merging process 100 described above in connection with FIG. 3.

After the pricing graph has been updated by way of the foregoing procedures of the process 85, the poller 36 enumerates (97) pricing solutions from the updated pricing graph and stores (99) these solutions as results 42 in the cache database 28. At a certain point in time or at regular time intervals, the poller 36 regenerates (101) the pricing graph from scratch via the graph generation process 98. The process 85 generally regenerates (110) the pricing graph less frequently than it performs the previous processes described above.

For a particular query or set of queries 22, the graph generation process 98 and the availability merging process 100 may each be executed multiple times at various time intervals and in various orders relative to each other. In some embodiments, the availability merging process 100 is a lower-latency (and lower computation) operation than the graph generation process 98. Thus for a given query 22, the availability merger 46 updates the cache database 28 many times for each pricing-graph answer 24 returned by the TPS 12. It may be advantageous for the availability merger 46 to use the same computational resources as the poller 36 uses to perform the graph generation process 98.

Figure 5A:
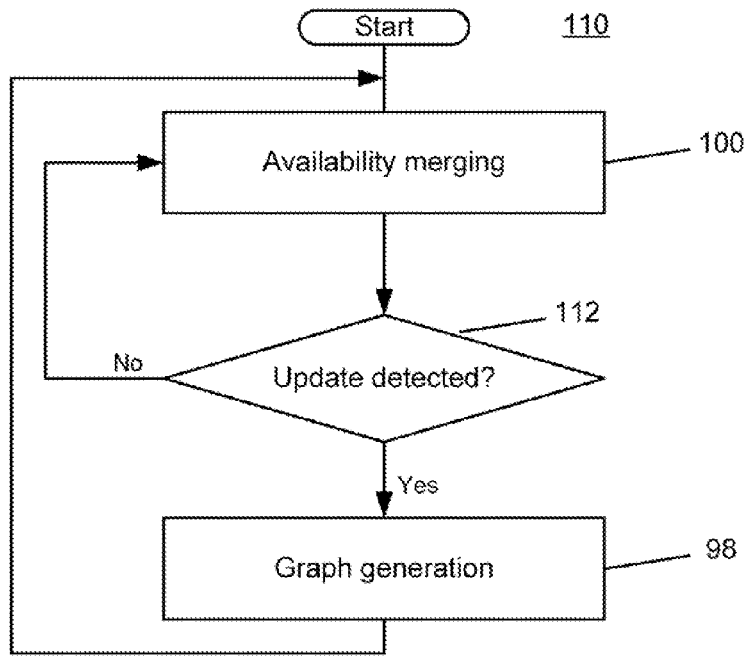
FIGS. 5A-5B are flowcharts of processes for updating the cache database.

Referring to FIG. 5A, an update process 110 to regenerate a pricing graph in response to an external event, such as the receipt of a fare or flight or rule update is shown. Update process 110 has the availability merger 46 regularly execute the availability merging process 100 on a pricing graph generated in process 80 (FIG. 3) until the poller 36 detects (112) the occurrence of a fare or flight or rule update. The detection of such an update triggers the poller 36 to re-generate the pricing-graph via the graph generation process 98. In the update process 110, pricing-graphs are computed once per flight/fare/rule update and then regularly merged with current seat availability.

Figure 5B:
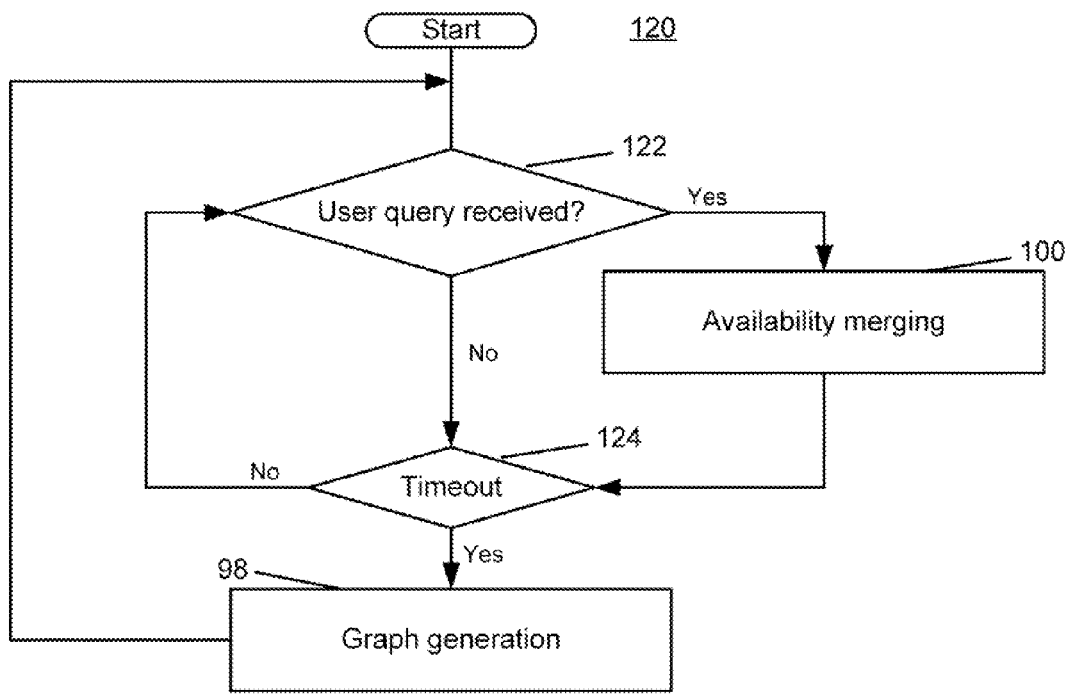

Referring to FIG. 5B, another update process 120 rechecks seat availability of pricing solutions derived from the pricing graph at the time a user query comes in—the pricing-graph is retrieved from the cache database and the enumeration & seat availability checks are done "on demand", with only the calculation of the pricing-graph done in advance. In process 120, the seat availability of a pricing graph is checked only in response to receiving a query 18 (see FIG. 1) from a user. The availability merger 46 performs the availability merging process 100 on a pricing graph generated in process 80 (FIG. 3) only when a query 18 is received (122) from a user for either complete pricing-solutions or summary information. Compared to the update process 110 (FIG. 5A), the update process 120 is likely to have a higher latency, and thus may be less suitable for such uses as presenting summary information on web home pages. However, it is well suited to extracting a list of pricing-solutions for a specific query 18 posed on an airline or travel agent web site or a CRS terminal, especially if the query 18 contains out-of-the-ordinary constraints or parameters, such as a desire for a particular route or travel time or carrier or fare product or cabin class that can be enforced by disabling particular graph nodes or enumerating answers in an order determined by a biased value function. A "value function" is the name for a "utility" or "preference" or "ranking" function used to assign a numerical value to a pricing-solution, that when used in algorithms that extract pricing-solutions from the pricing-graph, determine which solutions come out in which order, as described in U.S. Pat. No. 6,275,808 mentioned above.

The pricing-graph, containing a large space of answers, can support such queries, and while significantly greater latency and computational load is incurred answering such queries by extracting information from a pricing-graph than using methods where fully-checked answers have been pre-computed, the latency and load may still be significantly lower than if the pricing-graph had not been pre-computed.

D. Determining Seat, Fare, and Flight Availability

To keep up with changes in seat availability, the availability merger 46 poses a high rate of seat availability queries compared to the rate at which travel queries are posed for schedules and prices since flight and fare data change at a lower rate than seat availability. Typically, the seat availability queries are made to seat availability predictors or in some circumstances to airline revenue management systems. These seat availability queries are used to determine whether a seat will be made available for a flight or a set of flights, generally coupled with a fare usable with the flight or sets of flights. While, a TPS, such as TPS 12, can determine a set of flights useable with a fare, generally a ticket cannot be booked unless an airline's revenue management system or seat availability system makes a seat available.

That is, each fare has associated rules that restrict what flights the fare can be used with. However those rules are not the only consideration. The airline revenue management/seat availability system indicates that inventory will be made available for the combination. Generally fare rules do not change nearly as rapidly as responses from an airline's revenue management/seat availability system. Additionally, fare rule evaluations are more computationally intensive than seat availability checks, so in some circumstances it is desirable to have a TPS to construct fare/flight combinations ignoring seat availability and determine seat availability in a subsequent process.

Airlines' computer and network infrastructure may not be capable of responding to a very high rate of seat availability queries. However, the travel planning systems can mitigate this problem by maintaining highly scalable seat availability predictors, as described in U.S. Pat. No. 6,418,413 and assigned to the assignee of the present application and incorporated herein by reference.

Other techniques that enable the cache database 28 to be updated at sufficiently high frequency such that the likelihood of stale results being accessed is low include using a large farm of computers to answer LFS queries and posing broad queries to a TPS that shares work across dates and airports to maximize computational efficiency.

In addition to frequently updating cached results 42 to reflect changes in the TPS 12, several techniques are available to eliminate errors due to staleness, and beyond those that serve to increase the rate the database is populated. One is so-called direct tests described in patent application entitled QUERY CACHING FOR TRAVEL PLANNING SYSTEMS, Ser. No. 10/456,997, filed on Jun. 6, 2003 by Carl de Marcken et al., (pending) and assigned to the assignee of the present application and incorporated herein by reference. Direct tests re-check the flight, fare, fare rule and seat availability information that are components of cached pricing-solutions for presence in the current flight, fare, fare rule and seat availability databases prior to the pricing-solutions being returned to the user. Such a technique is particularly effective if the cache database 28 is populated at a high enough frequency so that errors are rare. It is especially appropriate when the cache database 28 contains pricing-solutions indexed by one or more sets of indexing features (i.e., cheapest price, origin, destination, etc.), referred to as "keys," and can be enhanced by raising the number of pricing-solutions stored for a given key (e.g., airports and dates) from one to several, so that if one fails, the price from the others is likely to remain valid.

As described in the pending patent application entitled QUERY CACHING FOR TRAVEL PLANNING SYSTEMS, Ser. No. 10/456,997, filed on Jun. 6, 2003 by Carl de Marcken et al., the direct tests can be performed either "online" (when results are extracted from the cache database 28) or "offline" (regularly, or on data changes). If performed offline, if a pricing-solution stored in the cache database 28 is determined to be unavailable it can either be removed from the database 28 or simply marked as invalid (with the possibility that it becomes valid again in the future if in the future direct tests succeed again, as would be particularly likely in the case of seat availability changes). In the case where direct tests are testing seat availability, it may be possible to trigger offline direct tests of pricing-solutions stored in the result database by indexing solutions by flights or itineraries and testing solutions when a notification is received of seat availability changes for those flights or itineraries. Such a notification may be in the form of AVS (avionics system) or NAVS (navigation system) seat availability messages sent from the TPS 12. In some embodiments, the notification may be sent from a system that predicts seat availability, such as those described in U.S. Pat. No. 6,275,808, or from a system that received updates to bid-prices or market-prices used to compute seat availability in "married" or revenue management schemes.

There are different varieties of revenue management systems that can be used. One type of seat availability systems essentially replicates airline revenue management (RM) systems. Some of those revenue management (RM) systems rely on various databases that assign properties to flights and fares (such as the approximate profit revenue represented by a fare—the "market price"—and the approximate lost-opportunity cost of selling a seat on a flight—the "bid price"). Airlines for which duplicated revenue management (RM) systems are used would send to the process changes to these databases as the changes are made. As these databases, used by revenue management (RM) algorithms, determine seat availability, receipt of change information can be used to trigger re-checks of seat availability for cached solutions. Other availability prediction techniques could be used. Other techniques include processing updates to flight, fare, fare rule and seat availability in batches so that updates are processed automatically on some regular interval I, e.g., every 10 minutes, every half hour, every hour, or every day. These methods may be referred to as "batch processes."

Figure 6:
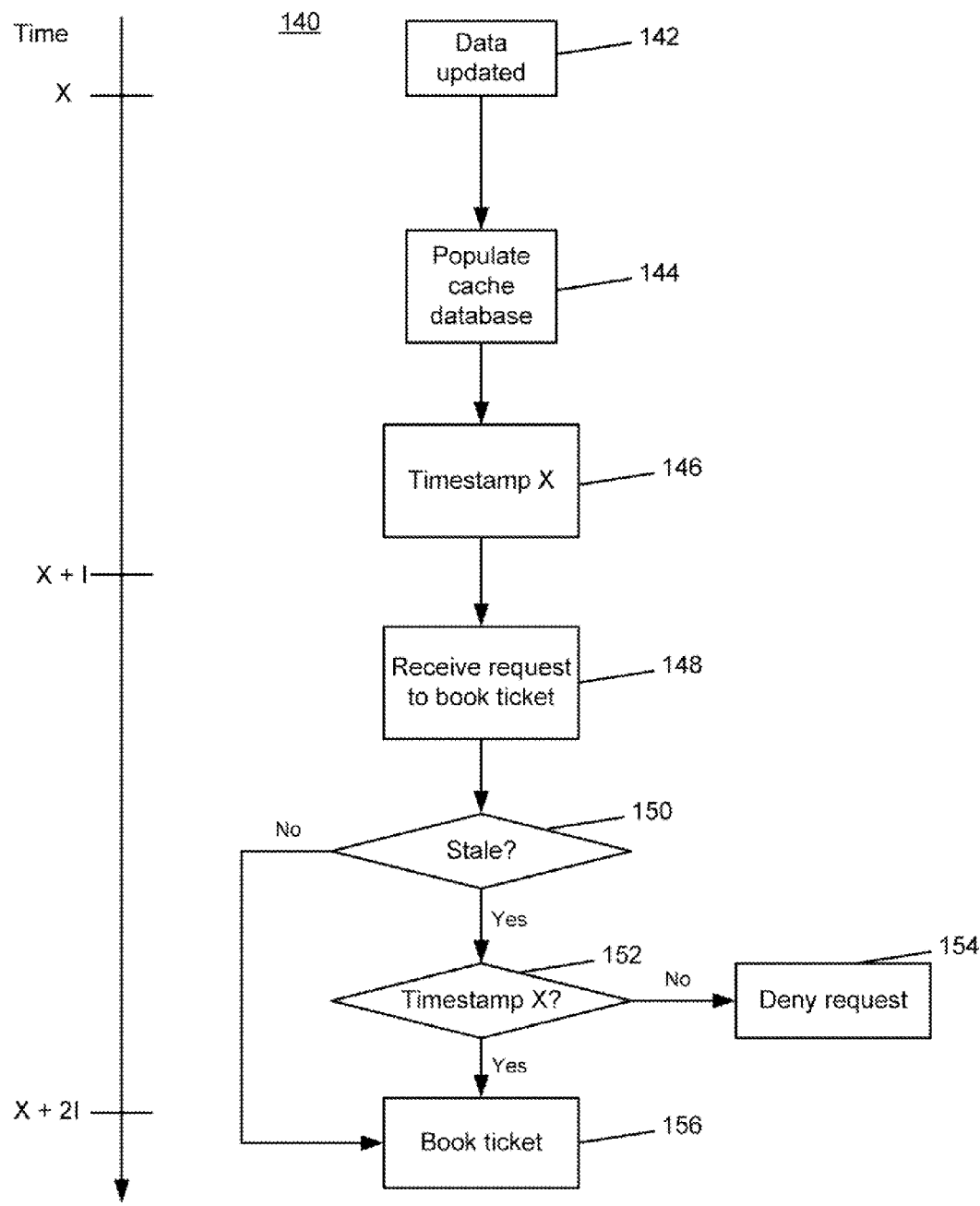
FIG. 6 is a flowchart of a process for determining availability of cached results.

Referring to FIG. 6, an exemplary batch process 140 for determining availability is depicted using an exemplary timeline. An agreement between providers (e.g., airlines, not shown in FIG. 6) and a party (not shown) providing the cached-based travel planning system 10 (see FIG. 1) guarantees the data sent by the providers (e.g., flights, fares, and possibly but not necessarily seat availability). The airline agrees that the fares in existence at time X may be used at some time after X even though the airline has updated the fares in the intervening period. Another way, the airline agrees that updates need not be processed immediately and institutionalizes the delay between transmission and usage.

Thus, at time X, the fares in existence may be used to book tickets based on the batch during the period [X+I, X+2I]. At time X, the data in the TPS 12 is updated (142) and answers 24 to pre-emptive TPS queries 22 based on the updated data are received at the web server 26. During the period from X to X+I, the poller 36 populates (144) the cache database 28 with results 42 based on data at time X, and associates (146) the timestamp X with every entry in the cache database 28 that has been computed in the interval X to X+I. In the time period from time X+I to X+2I, entries from the result database are retrieved only if they are marked with timestamp X (during the period from X to X+I, retrievals are done using timestamp X−I). The provider agrees that although some results are always stale by a duration between X+I and X+2I, if I is sufficiently small (e.g., below a predefined threshold) the provider will accept stale answers (i.e., the provider will book a ticket corresponding to a stale answer).

When the booking system of a provider receives (148) a request to book a ticket in time period X+I to X+2I, it determines (150) whether the one or more of a seat, fare, or rule is stale. Upon determining (150) that a proposed ticket is not stale, the TPS books the ticket (156). Upon determining (150) that a proposed ticket is stale, however, the TPS determines (152) whether the request is associated with the timestamp X. If the request is associated the timestamp X, the TPS allows (156) the ticket to be booked although it includes stale information. Otherwise, if the request is not associated with the timestamp X, the TPS denies (154) the request to book the ticket. Some of the benefits derived from the processing updates using batch processing are that queries are fast and inexpensive, while the results are consistent, that is, there is no ambiguity about what source data was used to compute pricing-solutions.

E. Data Loading Delay

In the airline industry it is standard practice for flights, fares and fare rules to be transmitted from providers of transportation, e.g., flight and train and bus service, to a TPS 12 (typically through intermediaries such as ATPCO and OAG (Official Airlines Guide)) some time prior to the moment when the TPS 12 actually uses the data to produce answers to queries (the moment when the data is "loaded"). The delay between the time at which the TPS 12 loads new data from the travel databases 38 and the time at which the TPS 12 is available to answer queries 22 using the new data is referred to as "load delay." The load delay depends in part on the data processing requirements of the TPS 12, for example, data format conversion and quality assurance tests of the new data may be performed before the new data is available for use by the TPS 12. In some embodiments, a first TPS delays the use of new data until such time as a second TPS is processing the new data, so as to maintain consistency between the two systems. This is especially common when a first TPS (used by an agency) is used for search and a second TPS (used by a provider) is used for verification prior to reservation and ticketing: the first TPS delays answering queries based on new data until the new data is loaded and available for use by the second TPS. This ensures that the second TPS will not prematurely reject any pricing-solutions that use the new data.

When the load delay of a typical TPS used by a provider or carrier for verification prior to reservation is greater than the combined load delay of the TPS 12 and the travel planning system 10, the travel planning system 10 can use the difference in load delays to its advantage.

Figure 7:
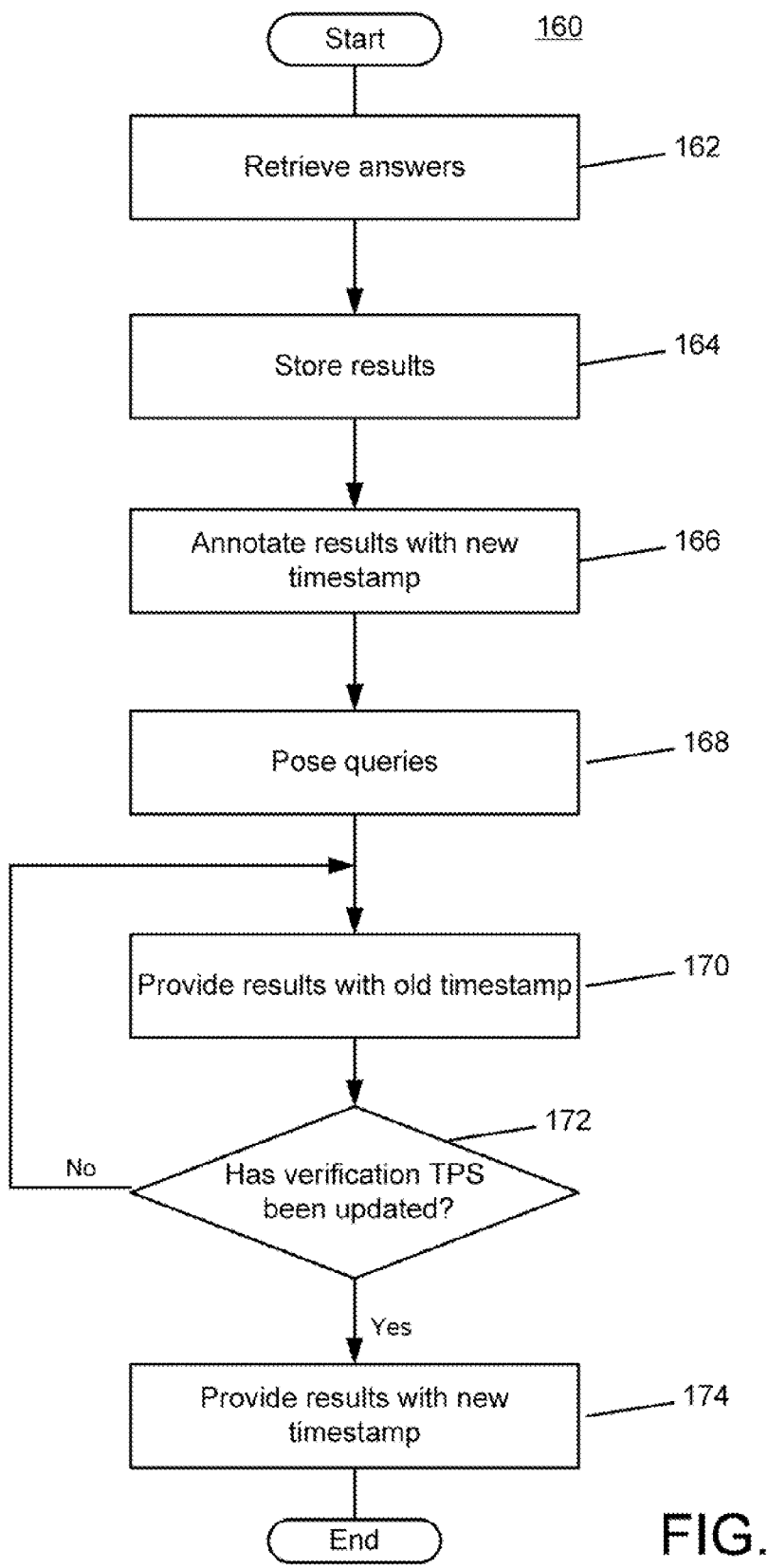
FIG. 7 is a flowchart of a process for loading data in to the cache database.

Referring to FIG. 7 an exemplary process 160 for loading data into the cache database 28 and that accounts for load delays incurred by conventional TPSes is shown. One or more TPSes are used to calculate answers for caching, each TPS running on a particular set of data (fare and flight database, e.g.). Providers update data and transmit to different TPSes.

After the caching system 11 retrieves (162) answers 24 from the TPSes the system 11 immediately stores (164) the answers as new results 42 in the cache database 28 and marks (166) the answers with a data-specific timestamp reflecting the version of data used by a TPS to generate the answer. A separate "verification" or "booking" TPS may update its data in response to provider transmissions at a different rate than cacheTPSes (e.g. TPS 12) used by the caching system 11 to populate the cache database 28 with results 42.

At some time, a cache TPS loaded with old data d2 is updated with new data d1, and the verification TPS has not been updated and still has old data d2 in effect. At this time, the caching system 11 annotates (166) pricing solutions received from the cache TPS with timestamp d1 and stores these pricing solutions in the cache database 28.

In the period after the transmission of data updates to the verification TPS, but (soon) before the verification TPS has put the new data in effect, the caching system 11 poses queries (168) to TPSes loaded with both the (new) d1 and (old) d2 timestamps. When retrieving pricing solutions from the database 28, the caching system 11 provides (170) only those solutions marked with the old timestamp d2 to the verification TPS, which has not yet been updated, to ensure that the solutions returned by the cache system 11 are compatible with the verification TPS.

By posing queries to a TPS loaded with the old d2 data, the answers that are currently being returned from the TPS have d2 timestamps that are compatible with the verification TPS (which is still loaded with the old d2 data). By also posing queries to a TPS loaded with the new d1 data, the caching system 11 is primed for when the verification TPS switches to the new d1 data. After the verification TPS has been updated with the new d1 data, the answers marked with the d1 timestamps are compatible with verification TPS.

At an appropriate time determined (172) by the caching system 11 (e.g., at a time when the carrier's TPS 12 has loaded the new d1 data), the caching system 11 provides results having the new d1 timestamp (174) to the verification TPS.

Figure 8:
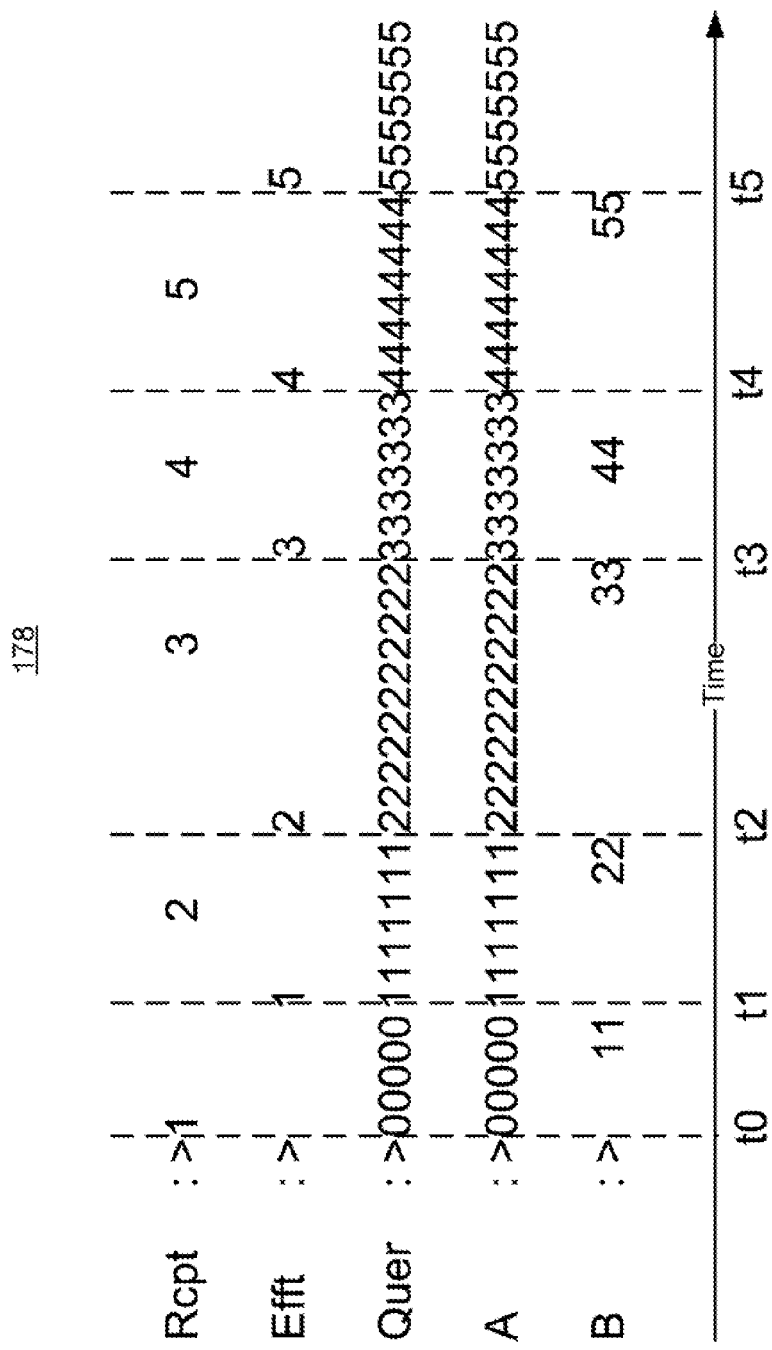
FIG. 8 is a diagram depicting data loading.

Referring to FIG. 8, a diagram depicting data loading includes a timeline 178 of interaction between pollers 36 and corresponding travel planning systems. In FIG. 8, numbers in the row represented by the symbol "Rcpt" correspond to events in which new data is received by the caching system 11. The value of the number represents the timestamp index associated with the data. For example, the number "1" located in the Rcpt row at time t0 represents the receipt of new data marked with a timestamp index equal to "1." Numbers in the row represented by the symbol "Efft" correspond to events in which the received new data of an indicated timestamp is effective (i.e., results based on the new data can be supplied to a user) by the caching system 11. In some embodiments, the time at which the data is effective corresponds to the time at which a verification TPS maintained by a provider or carrier has finished loading and processing the new data. Numbers in the row represented by the symbol "Quer" correspond to the timestamp index used for selecting results 42 from the cache database 28. Numbers in the row represented by the symbol "A" correspond to events in which a first poller A and a first TPS A supply results 42 to preemptive queries 22 and the timestamp index associated with the results 42. Likewise, numbers in the row represented by the symbol "B" correspond to events in which a second poller B and a second TPS B supply results 42 to preemptive queries 22 and the timestamp index associated with the results 42.

As shown in FIG. 8, the TPS B, during a time prior to the switch (e.g., at time t1) to the next data set, preemptively calculates results (e.g., two results represented by "11") for that timestamp, so that there is no delay in switching. Although two pollers and two TPSes are shown in FIG. 8, one poller and one TPS could perform the functions of both pollers A and B and both TPSes A and B. For example, TPSes A and B could be replaced by a TPS that is capable of loading and processing multiple data sets simultaneously.

For example, a TPS may be capable of working on multiple sets of data in one query, annotating answers with what data sets they are compatible with. As typically few fares change in an update, the TPS can determine whether a particular fare was valid before the update and/or after the update. The TPS considers all fares valid either before or after an update, but annotates solutions with timestamp information that is required for the solution to be valid. That may be more efficient than posing two separate queries to two TPSes with different data sets loaded, as those TPSes would duplicate work for fares that were not affected by the update.

The loading process shown in FIG. 8 minimizes staleness due to flights, fares and fare result, although not for seat availability. Thus, it is particularly appropriate for an update process to subsequently re-check seat availability at a more rapid rate (that is, numerous times between flight and fare and fare rule updates), such as the update process 110 in FIG. 5A.

As discussed in the patent application entitled QUERY CACHING FOR TRAVEL PLANNING SYSTEMS, Ser. No. 10/456,997, filed on Jun. 6, 2003 by Carl de Marcken et al., one issue for travel caching systems is that pricing-solutions may be dependent on purchase or reservation time assumptions. As it is common in air travel for such dependence to be coarse, i.e., to depend only on the reservation date (local to the travel agent), cached results may be stored in the result database with a field indicating the reservation date assumption for which the results are valid. If after a date change the result database is rapidly refreshed, the period of potential error is small. Alternatively, before the date actually changes the result database may be pre-populated with results calculated for the next day and stored with the next day key; so that close to the end of a day the result database contains results both for the current day and for the next day, with database queries containing a reservation date so as to ensure the results with the proper date are retrieved.

If the error rate due to staleness is small enough, then providers may be willing to commit to accept any remaining errors, effectively eliminating them by agreement. That is, providers may be willing to commit that any prices returned by the caching system will be accepted by the provider, even if they were computed from now-stale data.

Of the databases relevant for air travel pricing, seat availability changes at the highest rate, followed by fare amounts, followed by fare structure (range of fare types in different markets) and rules and flights. Thus, after seat availability, to prevent result staleness, the next most important factor to deal with in preventing staleness is changes to fare amounts (which may occur independently and at a higher rate than other changes to fares, such as fare rules). While posing TPS queries at a high rate, especially after any transmission of fare updates, mitigates this problem, as with the techniques described for handling seat availability changes, other techniques can be used to update cache database 28 after fare amount changes with less computational effort than posing full TPS queries.

If the cache database 28 contains complete pricing-solutions described at a level of detail that includes an itemization of the fares involved in solutions, then after the receipt of fare updates, solutions that include fares for which amounts have changed can be found in the cache database 28. The prices for those solutions are re-computed and any summary information are updated accordingly. There is a risk, however, that summaries may not be the best pricing solutions, because the pricing-solutions in the result-database after the amount changes.

Alternatively, in embodiments in which a pricing-graph database maintains pricing-graphs or other compact representations of pricing-solutions based on fares, after changes to fares amounts are received, the availability merger 46 updates the elements of the representations (e.g., pricing-graph nodes) corresponding to the fares. The poller 36 then updates the cache database 28 with pricing solutions that are re-extracted from the representations.

F. Constructing Answers from Multiple Database Entries

Certain forms of LFS queries 18 are substantially more common than others, such as round-trip queries in which the user requests travel back and forth between two specific airports or cities. If answers to such queries are pre-computed, expanding the query to include multiple airport pairs (that is, the user allows that they might take a round-trip between any one of several airport pairs) does not alter the caching architecture described here, because the answer for the broader query can be constructed by simply merging database entries for narrower queries (returning a choice between multiple entries, or for a price summary, minimizing over multiple entries).

However, difficulties could arise if the search space does not naturally align with the manner in which pricing-solutions are computed. As an example, cached results 42 for round-trip queries between particular airports may not be used to answer one-way or circle-trip or open-jaw queries. So, if a user requests answers for a trip from Boston to Los Angeles and returning to Providence, then a result database populated using round-trip queries is in general insufficient to answer such queries.

Queries for which answers have not been pre-computed may require that searches be done live. This deficiency can be partially alleviated by pre-populating a broader range of queries, such as open-jaw queries and one-way queries, or using query-widening techniques described in the patent application entitled QUERY CACHING FOR TRAVEL PLANNING SYSTEMS, Ser. No. 10/456,997, filed on Jun. 6, 2003 by Carl de Marcken et al., to expand the set of airports for each slice origin and destination to include nearby neighbors and to store the results in a pricing-graph format. However, at some point, the space of queries may exceed the space that can be pre-computed using an economically practical computing facility.

In some implementations, the poller 36 constructs answers to queries (i.e., user queries 18 and pre-emptive queries 22) directly from the results 42 for previous queries 22. For example, some airlines restrict their fare structure to one-way fares. For such airlines, the space of solutions for round-trip, circle-trip, and open jaw queries can be expressed as the cross-product of answers to a sequence of one-way queries, with some caveats.

Figure 9:
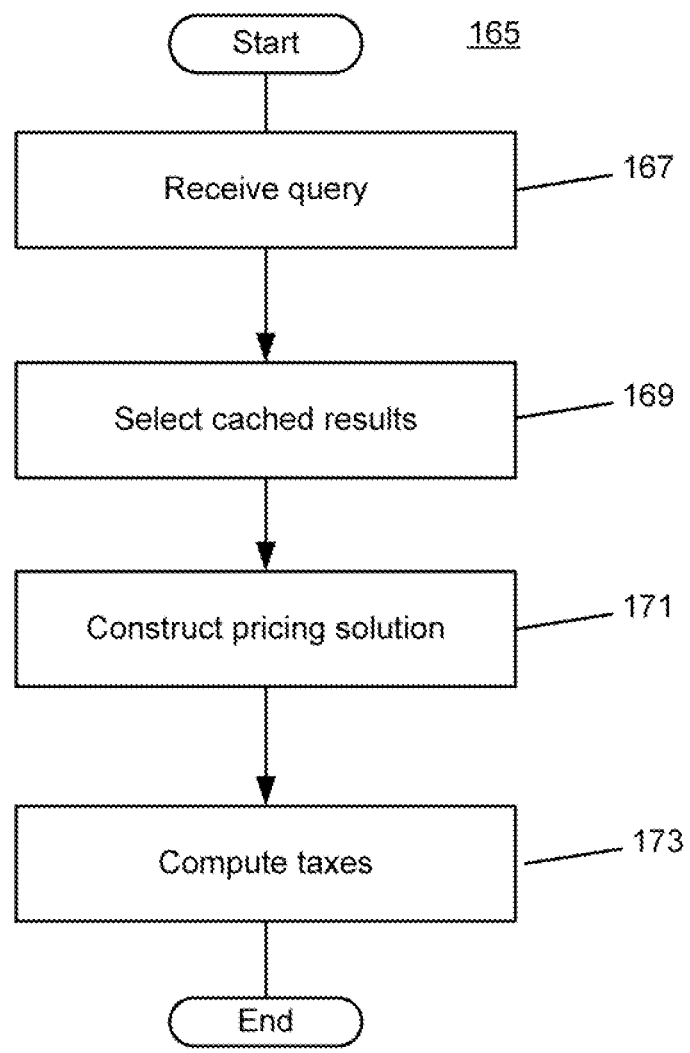
FIG. 9 is a flowchart of a process for constructing answers to queries using a combination of cached results stored in the cache database.

Referring to FIG. 9, a process 165 that constructs answers to TPS queries 22 (see FIG. 1) and/or user queries 18 using different cached results 42 previously stored in the cache database 28 is shown. The web server 26 receives (167) a query (e.g., a user query 12 or a TPS query 22) that includes two or more slices (i.e., a user-requested trip portion, such as the "outbound" of a round-trip query).

Another type of trip that includes two or more slices is an open jaw trip. Open jaw trips include flight itineraries where the departure city is different on the outbound portion than the destination city of the return portion. Or alternatively, the destination city that a passenger arrives in is different than the one that is departed from on the return portion of a flight itinerary. An example would be a traveler starting at Boston's Logan Airport flying into San Francisco International, and then returning to Washington Dulles airport instead of Boston.

For the trip specified in the query, the poller 36 selects (169) the cached results 42 that can satisfy portions of the specified trip. For example, for a Boston-Los Angeles-Providence open jaw, the poller 36 selects cached results 42 for a Boston-Los Angeles one-way trip and cached results for a Los Angeles-Providence one-way trip. From the selected cached results 42, the poller 36 constructs (171) a pricing solution for the desired trip. For example, the poller 36 computes the cheapest price for a Boston-Los Angeles-Providence open jaw from the sum of the cheapest price for a Boston-Los Angeles one-way and the cheapest price for a Los Angeles-Providence one-way. Thus, if the caching system 11 (see FIG. 1) retrieves answers 24 to pre-emptive one-way queries 22, the poller 36 can construct answers to more complicated queries from answers 24 to pre-emptive one-way queries 22. In some cases this process is not guaranteed to produce the best answer (for example, if the best answer involves a stopover fare that crosses slices), or may produce slightly incorrect answers (for example, if taxes do not factor across slices) that may need to be corrected.

The taxes applied to the component cached results 42 may be different than those that apply to the pricing solution constructed from the component cached results 42. As a result, the poller 36 computes (173) the appropriate taxes applicable to the pricing solution. As taxes typically do not substantially alter the price-order of results, it may be sufficient for summarization purposes to re-compute taxes for the single pricing-solution on which the summary is based. For example, if the goal is to present the single cheapest price for a round-trip query on particular dates, the cheapest outbound solution and cheapest return solution are selected, and taxes are re-computed on the combined solution to compute the final price.

For airlines with a one-way fare structure, it may be more economical to pre-compute only one-way queries and construct round-trip or open-jaw or circle-trip answers from the answers to the one way queries, rather than to pre-compute round-trip queries. More sophisticated techniques as presented in the patent application entitled PRICING TICKETS BASED ON CONSTRUCTING TABLES OF PRICING UNITS FOR SUB-PORTIONS OF A TICKET, Ser. No. 11/184,743, filed on Jul. 19, 2005 by Carl de Marcken, pending and assigned to the assignee of the present application and incorporated herein by reference, can also be used to construct more complicated solutions from cached solutions to simpler queries.

It is desired to pre-compute answers for a wide range of queries, to support as many applications as possible. However, if the query space is expanded much beyond an origin, destination, and date pair, the number of possible queries can grow too large to be practically cached. Some techniques discussed so far to solve this problem include: posing a broad range of dates or markets at once to a TPS for which this results in computational savings; storing the results 42 pricing-graphs (or other compressed representations) in the database rather than as pricing-solutions; extracting pricing solutions on demand from the pricing-graph since a greater space of solutions can be practically represented; and constructing pricing-solutions for complicated queries out of pre-computed pricing solutions to simpler queries (such as one-way queries).

Other techniques that can be used to expand the query space that can be practically processed include the query widening techniques presented in patent application entitled QUERY CACHING FOR TRAVEL PLANNING SYSTEMS, Ser. No. 10/456,997, filed on Jun. 6, 2003 by Carl de Marcken et al., for computing the answers for particular combinations of passenger types from the results for individual passengers, and the methods described there for dealing with reservation and ticketing time restrictions.

G. Configuring the Cache Database

The results 42 in the cache database 28 may be organized and categorized in a variety of different ways to best suit a variety of travel applications that use the results 42. If multiple travel applications with different requirements are supported, it may be beneficial to store results in multiple table structures within the cache database 28, with each of the multiple table structures optimized for particular uses. For example, to support some applications, the cache database 28 may store a set of complete pricing-solutions for answers 24 received from the TPS 12 or a representative selection of the complete set of pricing pricing-solutions (such as the cheapest, or the most convenient, or a diverse selection). In some embodiments, the table structures are stored in separate cache databases that collectively form the cache database 28.

Figure 10:
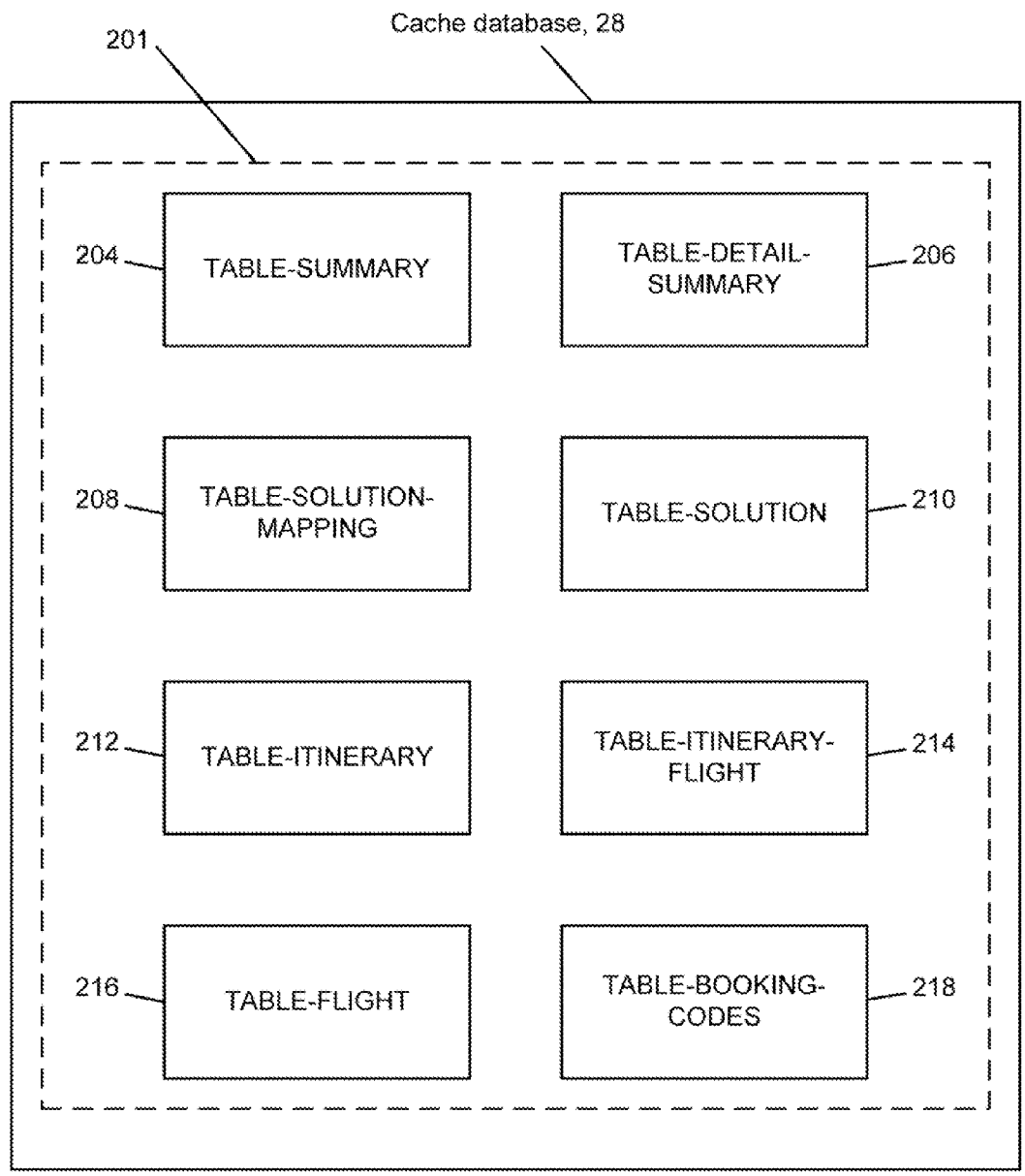
FIG. 10 is a block diagram of an exemplary cache database.

Referring to FIG. 10, a conceptual structure of the cache database 28 includes multiple data structures 201: a TABLE-SUMMARY data structure 204, a TABLE-DETAIL-SUMMARY data structure 206, a TABLE-SOLUTION-MAPPING data structure 208, a TABLE-SOLUTION data structure 210, a TABLE-ITINERARY data structure 212, a TABLE-ITINERARY-FLIGHT data structure 214, a TABLE-FLIGHT data structure 216, and a TABLE-BOOKING-CODES data structure 218. To minimize the computation and communication necessary to extract information of relevance to a travel planning application from the cache database 28, the data structures 201 organize information associated with the cached results 42 in a form that requires little transformation prior to use or display (e.g., to a user at client 16) and reduce the number of database entries needed to be accessed when responding to a users' queries 18. In the implementation shown in FIG. 10, the data structures 201 are in the form of tables and are sometimes referred to as "tables 201". In addition to tables, the data structures 201 could be represented as tree structures, array structures, and other types of data structures. Each of the data structures 201 are described in further detail below.

Figure 11A:
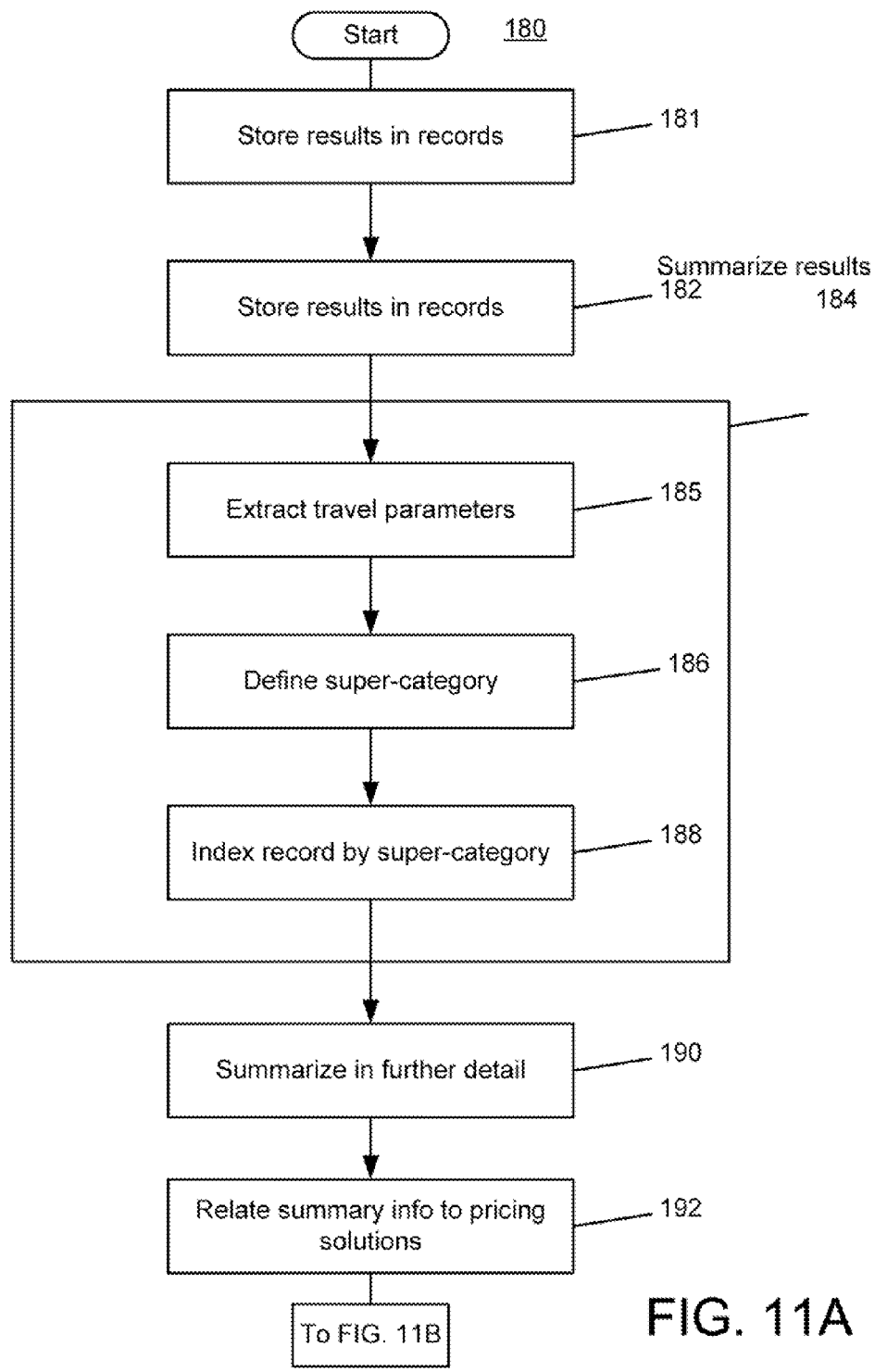
FIGS. 11A-11B is a flowchart of a process for configuring data stored in the cache database.
Figure 11B:
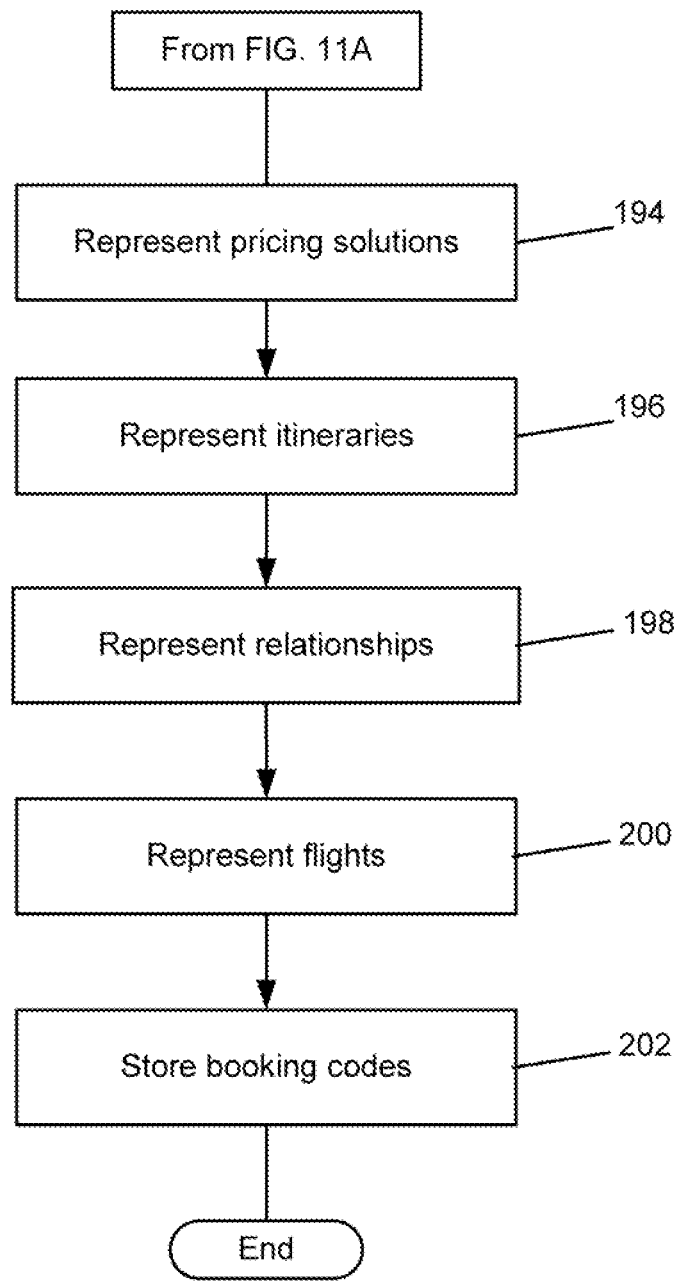

Referring to FIGS. 11A-11B, a process 180 for configuring data stored in the cache database 28 (see FIG. 1) using table structures is shown. The poller 36 sends (181) the TPS 12 flexible travel queries 22 that include travel parameters (e.g., one-way, round-trip, and open jaw) for every airport pair of origin and destination airports, with very broad date ranges on outbound and return. Such a flexible travel query includes a specification that solutions with a particular feature (e.g., the cheapest pricing solution (if any)) are returned for every combination of outbound date and return date. A flexible travel query 22 may include a multi-feature specification of the answers to return. Examples of features included in a query 22 may include Other queries 22 include the cheapest pricing solution whose flights are provided by only one airline is returned for every date combination and for every airline that provides service; the cheapest pricing solution for every date combination in business class or better and in first class or better is returned; and a cheapest pricing solution for non-stop flights on each carrier is returned for every date combination. Other combinations of features may be requested in a single query. In particular, the poller 36 may request a large diversity of answers for each date, to support applications in which many solutions are available for each date. Further examples of flexible travel queries are as disclosed in U.S.

patent application Ser. No. 09/431,365, entitled "Method for Generating A Diverse Set of Travel Options" by Carl de Marcken and U.S. patent application Ser. No. 09/431,699, entitled "Method for Generating A Diverse Set of Travel Options" by Carl de Marcken, both of which are assigned to the assignee of the present invention.

For each query 22 sent to the TPS 12 by the poller 36, the poller 36 receives a set of answers 24. The poller processes these answers 24 to populate the cache database 28 with results 42. The results 42 can be in the form of pricing solutions or in the form of summary information. The results 42 are initially stored (182) in records including fields corresponding to predefined categories of the schedule and fare information. The information is expressed in these records database 28 at a fine grain, for example indexed by travel dates and airports. For example, a record that includes the following fields: origin apt, destination apt, out date, return date, and cheapest price, can be indexed by the first four fields. Using the record, the web server 26 can process a query 18 for the cheapest price for a trip from Boston to Europe in January by retrieving from the record all entries whose (1) origin airport is located in Boston, (2) outbound and return dates occur in January, and (3) destination airport is one of the hundreds of airports in Europe. After retrieving the entries, the web server 26 can include a program that sorts the pricing solutions and determines, e.g., the cheapest travel option by minimizing the price over all of the retrieved entries.

To support flexible queries, rather than constructing coarser summaries by extracting multiple entries from the records in the cache database 28, it is preferable to index the results 42 stored in the cache database 28 by broader categories such as by month, country, or class of location (e.g. tropical island or ski resort).

The poller 36 translates the results 42 into representations suitable for storage in one or more of the tables 201 of the cache database 28. The pricing solutions are summarized (184) according to categories that include aggregated travel parameters that are typically broader than the travel parameters of the results 42. Examples of aggregated travel parameters include more general trip-segment endpoint locations (such as countries or location classes such as "tropical islands" or "ski resorts") and departure/return times (dates or months or seasons).

During summarization procedure (184), one or more sets of travel parameters are extracted (185) for each pricing solution. A first exemplary set includes: origin-airport, destination-airport, outbound-date, and return-date. A second exemplary set includes origin-airport, destination-airport, and outbound-month. A third exemplary set includes: origin-airport, destination-airport, outbound-month, and length of stay. A fourth exemplary set includes: origin-airport, destination-country, outbound-date, and length of stay.

These travel parameters extracted from the pricing solutions are used to populate the TABLE-SUMMARY data structure 204 having entries that provide high-level summary of the pricing solutions. Table 1 shows an exemplary TABLE-SUMMARY data structure 204 in which the best price over all pricing-solutions with a given set of features is stored in an entry keyed by the set of features. In summarizing (184) the results in the TABLE-SUMMARY data structure 204, a super-category of travel parameters (i.e., an aggregate travel parameter) of at least two of the predefined categories of travel parameters is defined (186) and the fields within the TABLE-SUMMARY data structure 204 are indexed (188) by the super-category. The super-category includes at least a portion of schedule and fare information from the at least two of the predefined categories. The fields where the type is enclosed in < > are "key" fields by which the entries may be indexed. Multiple prices are stored, such as the best price for each of various passenger combinations. Some pricing solutions may be involved in the calculation of the prices of multiple summary entries. To indicate that a search was conducted but no options were found for the particular set of search criteria, summaries for features sets for the search criteria with no matching pricing solutions may be represented by storing "nil" or no entry in price fields.

TABLE 1

| TABLE -SUMMARY | |
| --- | --- |
| summary-id | (unique key) |
| data-timestamp | <time or integer> |
| outbound-time | <date or month> |
| return-time | <date or month or nil> |
| length-of-stay | <number-of-days or nil> |
| origin-location | <airport, city, country or location- |
| destin-location | <airport, city, country or location- |
| best-price-1adt | (price or nil) |
| best-price-2adt | (price or nil) |
| best-price-1snr | (price or nil) |
| best-price-2snr | (price or nil) |
| best-price-1adt1chi | (price or nil) |
| best-price-2adt1chi | (price or nil) |
| best-price-2adt2chi | (price or nil) |

More detailed sets of features are calculated (190) by extending the coarse feature sets with more features, such as the carrier (for solutions that are supported by a single carrier), the cabin class, and the maximum number of stops. Other index information can include other travel parameters such as a number of passengers or a passenger type. For many applications, the referenced information of primary importance is existence (whether a trip is possible), price, and trip duration or number of stops or other measures of convenience. Entries are provided in a TABLE-DETAIL-SUMMARY data structure 206 indexed by the summary-id and the more detailed features. Table 2 shows an exemplary TABLE-SUMMARY data structure 206. The TABLE-DETAIL-SUMMARY data structure 206 of Table 2 is similar to the TABLE-SUMMARY data structure data structure 204 shown in Table 1 but includes more detail by adding several more index fields to permit summaries itemized by or restricted to a carrier, a class and a maximum number of stops.

TABLE 2

| TABLE-DETAIL-SUMMARY | |
| --- | --- |
| detail-summary-id | (unique key) |
| summary-id | <key> |
| carrier | <carrier code or nil> |
| max-stops | <integer or nil> |
| cabin-class | <cabin-class identifier or nil> |
| best-price-1adt | (price or nil) |
| best-price-2adt | (price or nil) |
| best-price-1snr | (price or nil) |
| best-price-2snr | (price or nil) |
| best-price-1adt1chi | (price or nil) |
| best-price-2adt1chi | (price or nil) |
| best-price-2adt2chi | (price or nil) |

An "atomic" summary is a summary where key elements such as origin, destination and date ranges are populated with indivisible units like individual airports and dates. By contrast, a "non-atomic" summary is a summary where the fields are populated by aggregated units like countries or months. Atomic summaries can be updated based on a single response from a TPS whereas non-atomic summaries may be summaries of multiple TPS queries (e.g., a non-atomic summary of Boston-Europe may include data from TPS queries Boston-London, Boston-Paris, etc.). In embodiments where a non-atomic summary is based on data that comes from multiple queries posed to the TPS, for example a summary over markets where each market is posed to the TPS in a separate query, it may not be possible to compute summaries without scanning multiple "atomic" records (e.g., summary records for individual markets). In such cases, relevant non-atomic summaries may either be updated after each atomic summary update, or at some regular interval. The cache database 28 relates (192) the summary information to the pricing solutions over which they are aggregated using a TABLE-SOLUTION-MAPPING data structure 208. Table 3 shows an exemplary TABLE-SOLUTION-MAPPING data structure 208.

TABLE 3

| TABLE-SOLUTION-MAPPING | |
|---|---|
| summary-id | <key> |
| detail-summary-id | <key> |
| best-solution? | <boolean> |
| solution-id | |

The TABLE-SOLUTION-MAPPING data structure 208 shows relationships between information summaries and pricing-solutions. Each solution is identified with a unique identifier present in the "solution-id" field. For a solution identified in the "solution-id" field, the field "best-solution?" is marked "true" if that pricing solution is the cheapest price for the summary. The TABLE-SOLUTION-MAPPING data structure 208 enables efficient retrieval of either a representative solution, or all the solutions that meet summary criteria, such as all the solutions between two airports on particular dates.

The cache database 28 represents the pricing solutions (194 in FIG. 11B) in a TABLE-SOLUTION data structure 210. Table 4 shows an exemplary TABLE-SOLUTION data structure 210 that represents pricing-solution; indexed by "solution-id" and "data-timestamp." The TABLE-SOLUTION data structure 210 includes price and identifiers of outbound and return itineraries associated with a pricing solution; and passenger assumptions and fare product and cabin-class summary. The fields labeled "out-itin-id" and "ret-itin-id" reference shared itineraries. By sharing itineraries and indexing itineraries on both itinerary-id and origin and destination and departure date, memory resources are conserved. The TABLE-SOLUTION data structure 210 enables the poller 36 to efficiently extract itinerary options independently of pricing-solutions as well as extract pricing-solutions for particular itineraries or itinerary combinations.

TABLE 4

| TABLE-SOLUTION | |
|---|---|
| solution-id | <unique key> |
| data-timestamp | <time or integer> |
| out-itin-id | (itinerary-id) |
| ret-itin-id | (itinerary-id or nil for one-way) |
| Price | |
| passenger type and count | |
| cabin class information | |
| fare product information | |
| booking code signature (for direct | |

The cache database 28 represents (196 in FIG. 11B) an itinerary for a trip in a TABLE-ITINERARY data structure 212. Table 5 shows an exemplary TABLE-ITINERARY data structure 212 in which itineraries that are shared across pricing solutions and each identified by a unique key in the "itinerary-id" field, are indexed by either an itinerary-id or combination of origin, destination, and departure-date.

TABLE 5

| TABLE-ITINERARY | |
|---|---|
| itinerary-id | <unique key> |
| data-timestamp | <time or integer> |
| departure-date | <date> |
| origin | <airport> |
| destination | <airport> |

The cache database 28 represents (198) relationships between itineraries and flights using a TABLE-ITINERARY-FLIGHT data structure 214. Table 6 shows an exemplary TABLE-ITINERARY-FLIGHT data structure 214 in which multiple flights per itinerary may be represented.

TABLE 6

| TABLE-ITINERARY-FLIGHT | |
|---|---|
| itinerary-id | <key> |
| flight-id | <key> |

The cache database 28 represents (200) flights in a TABLE-FLIGHT data structure 216. Table 7 shows an exemplary TABLE-FLIGHT data structure 216 of flight instances shared across pricing solutions.

TABLE 7

| TABLE-FLIGHT | |
|---|---|
| flight-id | <unique key> |
| carrier | |
| flight-number | |
| departure-time | |
| arrival-time | |
| aircraft-type | |

The cache database 28 stores (202) the booking codes of flights belonging to a pricing solution in a TABLE-BOOKING-CODES data structure 218. Table 8 shows an exemplary TABLE-BOOKING-CODES data structure 218.

TABLE 8

| TABLE-BOOKING-CODES | |
|---|---|
| solution-id | <key> |
| itinerary-id | <key> |
| flight-id | <key> |
| booking-code | (booking-code) |

After the foregoing data structures of the cache database 28 have been populated, the poller 36 extracts information from one or more of the data structures to support various travel applications.

For example, in order to extract the "best price" for an adult one-way or round-trip query between particular airports on particular dates, a best price procedure is used with the TABLE-SUMMARY data structure 204 shown in Table 1. Such a best price procedure is shown by the following pseudo code:

```
SELECT best-price-1aft IN TABLE_SUMMARY WHERE
    origin-location = <origin airport> AND
    destin-location = <destination airport> AND
    outbound-time = <outbound date> AND
    return-time = <return date for RT, nil for OW>.
```

Figure 12:
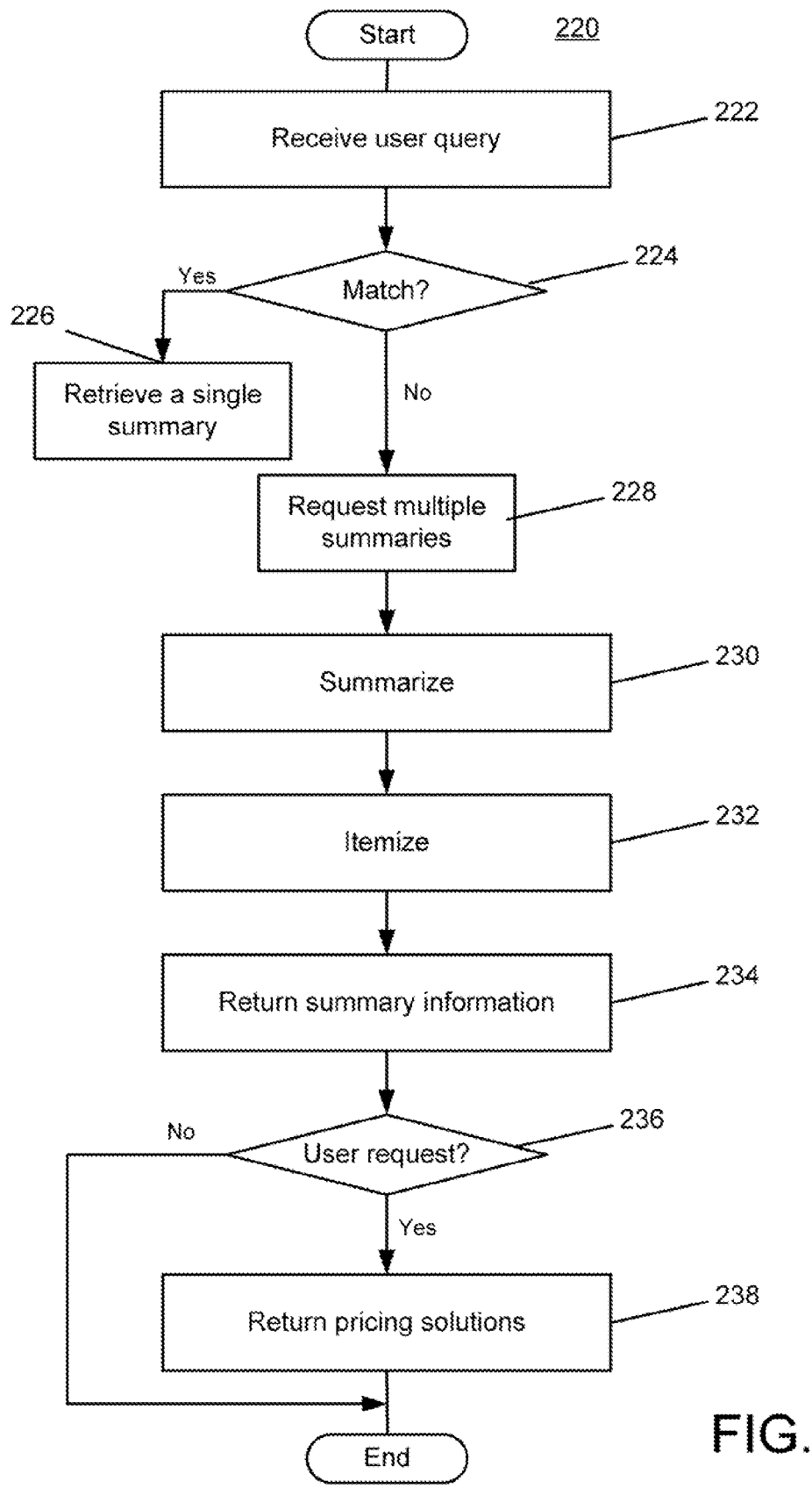
FIG. 12 is a flowchart of a process for extracting information from the cache database.

Referring to FIG. 12, a process 220 for extracting data from the cache database 28 in response to queries for aggregated travel parameters (e.g., departure dates occurring within a specified month) is shown. After the caching system 11 receives (222) a query 18 from a user requesting pricing information for itineraries that are grouped over location or time, such as "from Boston to France" or "from Boston to a ski resort" or "departing January," the poller 36 determines (224) whether a feature by which the itineraries were grouped, matches up with one of the pre-computed groupings in the TABLE-SUMMARY data structure 204, such as by a "country" or by a "month." If a match exists, the results are returned (226) directly from the TABLE-SUMMARY data structure 204 in the same manner, as described above, for an original (i.e., non-grouped) feature. An exemplary technique is shown by the following pseudo code:

```
SELECT best-price-1aft IN TABLE_SUMMARY WHERE
    origin-location = <origin airport> AND
    destin-location = <destination country> AND
    outbound-time = <month> AND
    return-time = <month for RT, nil for none>.
```

However, if the grouped feature requested in the query 18 does not match up, the poller 36 sends (228) a request to the cache to retrieve multiple summaries of results that collectively match the grouped feature. This procedure is shown by the following pseudo code:

```
SELECT best-price-1aft IN TABLE_SUMMARY WHERE
    origin-location = <origin airport> AND
    destin-location IN SET <list of destination airports> AND
    outbound-time >= <start-date> AND
    outbound-time <= <start-date> AND
    length-of-stay >= 3 AND
    length-of-stay <= 5.
```

The poller 36 summarizes (230) the multiple returned results 42 before sending (234) the results 42 to the client 16. For example, the poller 36 may sort all matching entries using price, and return those results 42 with the cheapest price. In some embodiments, the requesting application may summarize the returned results.

In some embodiments, the poller 36 may also itemize (232) prices or other features by summary key before sending (234) the results to the user. For example, the poller 36 may present prices for each day in a calendar of dates, or for each of many destinations. In some embodiments, the poller itemizes summaries by posing multiple database queries with different selection criteria (for example, different outbound dates in turn), or by eliminating selection criteria. An example in which summaries are itemized by an airport is shown by the following pseudo code:

```
SELECT best-price-1aft, destin_location IN TABLE_SUMMARY
WHERE
    origin-location = <origin airport> AND
    outbound-time = <outbound date> AND
    length-of-stay >= 3 AND
    length-of-stay <= 5 AND
    TYPE-OF (destin-location) = 'airport'
        or
SELECT best-price-1aft, destin_location IN TABLE_SUMMARY
WHERE
    origin-location = <origin airport> AND
    outbound-time = <outbound date> AND
    length-of-stay >= 3 AND
    length-of-stay <= 5 AND
    destin-location IN SET <locations of interest>
```

The poller 36 may also itemize prices or other features by detail summary key. It is frequently desirable to itemize summaries by carrier, number of stops, cabin class, and other features at a finer level of detail than merely dates and airports. For example, the poller 36 presents itemized summaries in a price matrix (e.g., a carrier-by-number-of-stops price matrix for a given pair of airports and dates). Alternatively, applications may be configured to support user-specified filters on such features.

If a request for more detailed information regarding a summary is received (236) from a user, the poller 36 uses the TABLE-SOLUTION-MAPPING data structure 208 to access to one or more pricing-solutions with features matching the summary and returns (238) those pricing solutions to the user. If such a request is not made by the user, then process 220 goes directly to the end Many additions or modifications may be made to the structure of the cache database 28 described above. For example, the structure of the cache database 28 can be modified to use different indexing systems, to summarize different features than those described above, to exclude summaries, to exclude pricing-solutions, to represent pricing-solutions at different levels of detail, and to represent trip types other than one-way trips and round-trips.

Rather than, or in addition to, including price or pricing-solution or other "contentful" representations of information in the result database, for efficiency it may be desirable to store "processed forms" of information. Examples of processed forms include a summary, as discussed above, highlights of particular information (such as booking codes and so forth) of such data, information that requires less translation prior to presentation, such as binary display representations, as hypertext markup language (html) or portable document files (pdf) or graphical bitmaps corresponding to printed tables, charts and so forth.

2. Timestamps

It is advantageous, in some embodiments, to associate entries in the cache database 28 with an indicator of when the entry was calculated or an indicator of the effective time of the flight, fare and seat-availability data associated with the entry. Furthermore, it may be advantageous to retain in the database not only the entries associated with the most recent query to the TPS 12 but also one or more previous ("historical") entries.

In some embodiments, for every non-overlapping set of queries 22 that the poller 36 regularly sends to the TPS 12, the poller 36 maintains an index of how many times each of the queries 22 has been sent. That is, if the poller 36 cycles through markets and sends the TPS 12 one query per market every cycle, the index would be the cycle number. The poller 36 stores the index in the cache database 28 with every summary and pricing-solution resulting from the query 22. For example, the poller 36 stores the index value in the field named "data-timestamp" in the exemplary TABLE-SUM- MARY, TABLE-SOLUTION, and TABLE-ITINERARY database structures 204, 210, and 212 (see FIG. 10) of Table 1, Table 4, and Table 5.

A data-time stamp can be used by the poller 36 to detect changes in the results 42 stored in cache database 28 (e.g., to detect the lowering of the best price available in a market on particular dates). In the cache database 28, the poller 36 compares results 42 with a timestamp index to corresponding results 42 marked with an earlier timestamp. If the price or other properties of interest have changed, applications can be notified of such changes.

Various applications demand the tracking of historical price behavior. The poller 36 can track the behavior of summaries over time using timestamps of older entries existing in either the cache database 28 or a secondary database to which they were copied. To minimize database size, entries may be assigned first and last timestamps such that when a new entry having the same price and other information as an earlier entry is received, instead of saving the new entry (as a duplicate entry), the last timestamp of the earlier entry may be updated to reflect the time that the new entry had been received.

Timestamps can be used to detect missing entries. For example, if at some period all potential pricing solutions for a market cease to be available and the TPS returns no answers 24, one method for recording such information is to produce summary entries with a price, of "nil" or no entry for price to indicate that the summary is not available or to delete existing entries with the relevant key features. A second method is to make no edits to the cache database 28 and retrieve only those entries having the most recent timestamp.

As will be described later in further detail, the poller 36 may pre-populate the cache database 28 with results 42 that are known in advance to be appropriate for some later query time. When pre-populating the cache database 28, the poller uses timestamps to mark the time when the results 42 are produced and the time when the results 42 are valid. If the result database contains results 42 reflecting anticipated "future" behavior, those results 42 would be distinguished from the results 42 that are appropriate at present. Distinguishing of the results can be accomplished by labeling of annotating summary or pricing-solution entries with the time or time ranges for which they are valid, and including the current time in the selection criteria used to select the results 42.

II. Applications

The travel planning system 10 enables users' queries 18 to be answered very rapidly and with very low marginal cost, at the expense of substantial pre-computation. The combination of low latency and low marginal cost opens up a wide variety of business models for distributing and using travel information that have not been previously contemplated or commercially feasible.

A. Interactive Responses

The latency associated with some conventional TPSes in responding to LFS queries poses an obstacle to providing interactive responses to queries. For example, popular travel planning web sites such as Orbitz®, Expedia® and Travelocity® provide online forms in which users enter LFS query parameters and then indicate they are complete by clicking on a submission button. As the query is sent to a conventional TPS for processing, the user is presented with a "please wait" indicator and made to idle for a lengthy period of time (e.g., on the order of minutes) while the TPS computes answers to the query. If the user wants to make any changes to the query, the user must resubmit the query with the changes and wait further while the TPS computes answers.

In contrast to many conventional TPSes, the travel planning system 10 responds to queries using results 42 with less delay and in some cases without the need for informing the user that there will be a delay. This is because the latency associated with accessing pre-computed results 42 from the cache database 28 is much lower than the latency associated with querying conventional TPSes. Even if the cache database 28 contains a pricing-graph or other representation from which pricing-solutions must be extracted using availability merging and/or enumeration, the latency may be sufficiently low (e.g., less than 1 second) that to the user the interaction will be fluid.

For example, if the number of entries in the travel planning system 10 is large (100 origin, 1000 destinations, 100 out days, 30 layover lengths implies 300,000,000 entries), by current standards, to process this many combinations in an acceptable refresh time period of 1000 sec (about 16 minutes), would require approximately 3,000,000 CPUs, which can be costly. Thus, reducing the latency reduces cost. In some embodiments, the travel planning system 10 is capable of reducing the latencies to less than 1 second, while providing higher level services that are more data intensive. In comparison, the latencies of conventional TPSes are higher for less than comparable level of services (fewer options available, older data used, etc.).

Figure 13A:
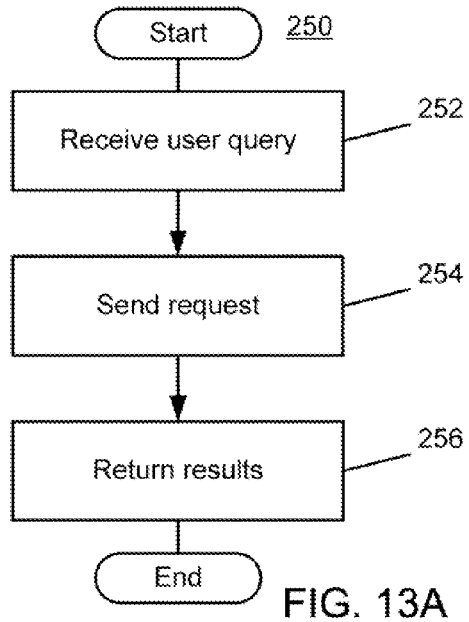
FIGS. 13A-C are flowcharts of processes for supplying travel information to a user.
Figure 13C:
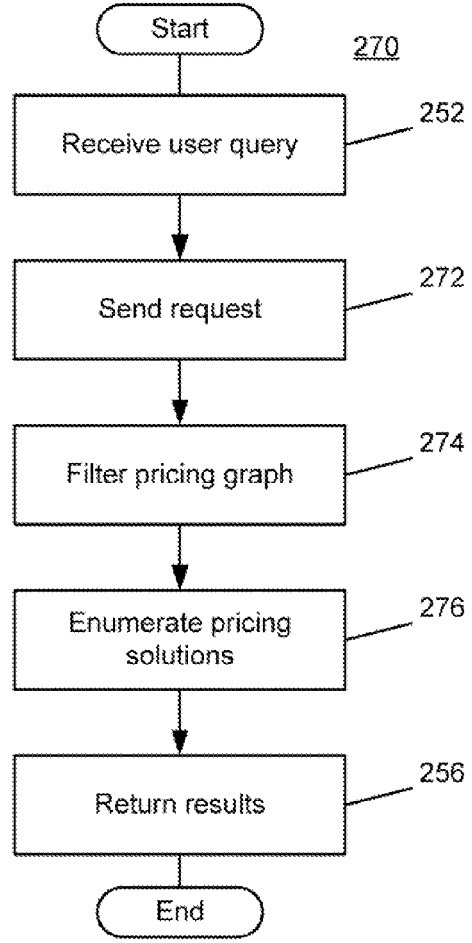
Figure 13B:
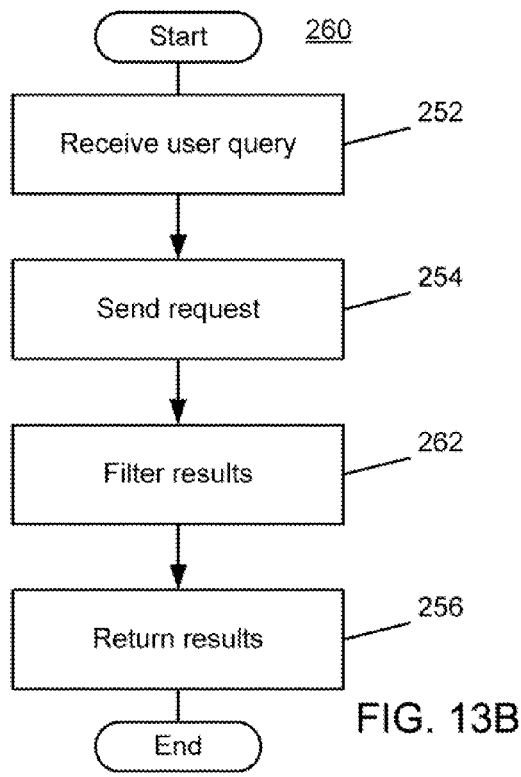

FIGS. 13A-13C depict exemplary processes 250, 260, and 270, respectively, by which the travel planning system 10 supplies travel information in the form of cached results 42 to a user at the client system 16 (client 16).

Referring to FIG. 13A, process 250 receives a query 18 from a user (252) via web server 26. To enter the query 18, the user may visit a web page using the browser 32, enter query parameters into a console displayed by the browser 32, and click a "submit" button within the console. After the query 18 is received (252), the web server 26 sends (254) a request to cache database 28 for results 42 that satisfy (and in some cases partially satisfy) the parameters of the query 12. The selected results 42 are returned (256) to the user in the form of pricing solutions or summary information and displayed to the user via the browser 32.

Referring to FIG. 13B, process 260, in which direct tests are performed to determine whether selected results 42 are available before returning them to the user, is shown. After the query 18 is received (252) and a request is sent (254), the availability merger 46 filters (262) the results 42 returned by the cache database 28 using one or more direct tests of seat availability, flights, and fares. Only those results that pass the direct tests are returned (256) to the user.

Referring to FIG. 13C, process 270, in which results 42 to a query 18 are extracted from a pricing graph, is shown. After the query 18 is received (252), the web server 26 sends (272) a request including the query parameters to the pricing-graph database 48 (which, in some embodiments, is the same as the cache database 28). At this point, the web server 26 filters (274) the pricing-graph according to the parameters included in the request. For examples, during the filtering step (274) nodes corresponding to unavailable flights and fares may be disabled. Pricing solutions are enumerated (276) from the pricing graph of solutions and returned (256) to the user.

B. Flexible Travel Planning

The high computational cost and high latency that traditional TPSes incur answering flexible travel queries such as queries over very broad date ranges or very broad sets of airports ("I'd like to go skiing in February") have to a large extent made it impractical to provide answers to flexible queries. Some forms of flexible queries have been implemented and deployed at substantial computational expense, but they are typically high-latency queries with a low degree of interactivity. Some other implementations support flexible queries using methods that do not involve generating availability checked pricing solutions, and are hence of limited usefulness. Examples of such implementations include systems that answer such queries using fare databases or using cached solutions from single-day, single-airport queries that were posed to other interfaces in the recent past without pre-emptive cache filling and without efforts to ensure correctness such as direct tests or even guarantee that queries are identical (e.g., that numbers and types of passengers are the same). Results that have not been checked for availability in terms of their seat availability or fare availability often include highly misleading prices, or only support popular sets of dates or airports (for which ordinary queries have been recently received); and are therefore of very limited usefulness and popularity.

Because the cache database 28 of the travel planning system 10 of FIG. 1 contains comprehensive and correct information, the travel planning system 10 produces reliable and accurate answers to flexible queries. Furthermore, unlike many conventional systems, the travel planning system 10 returns, to the user, answers to flexible queries that are immediately available for purchase by the user.

Figure 14:
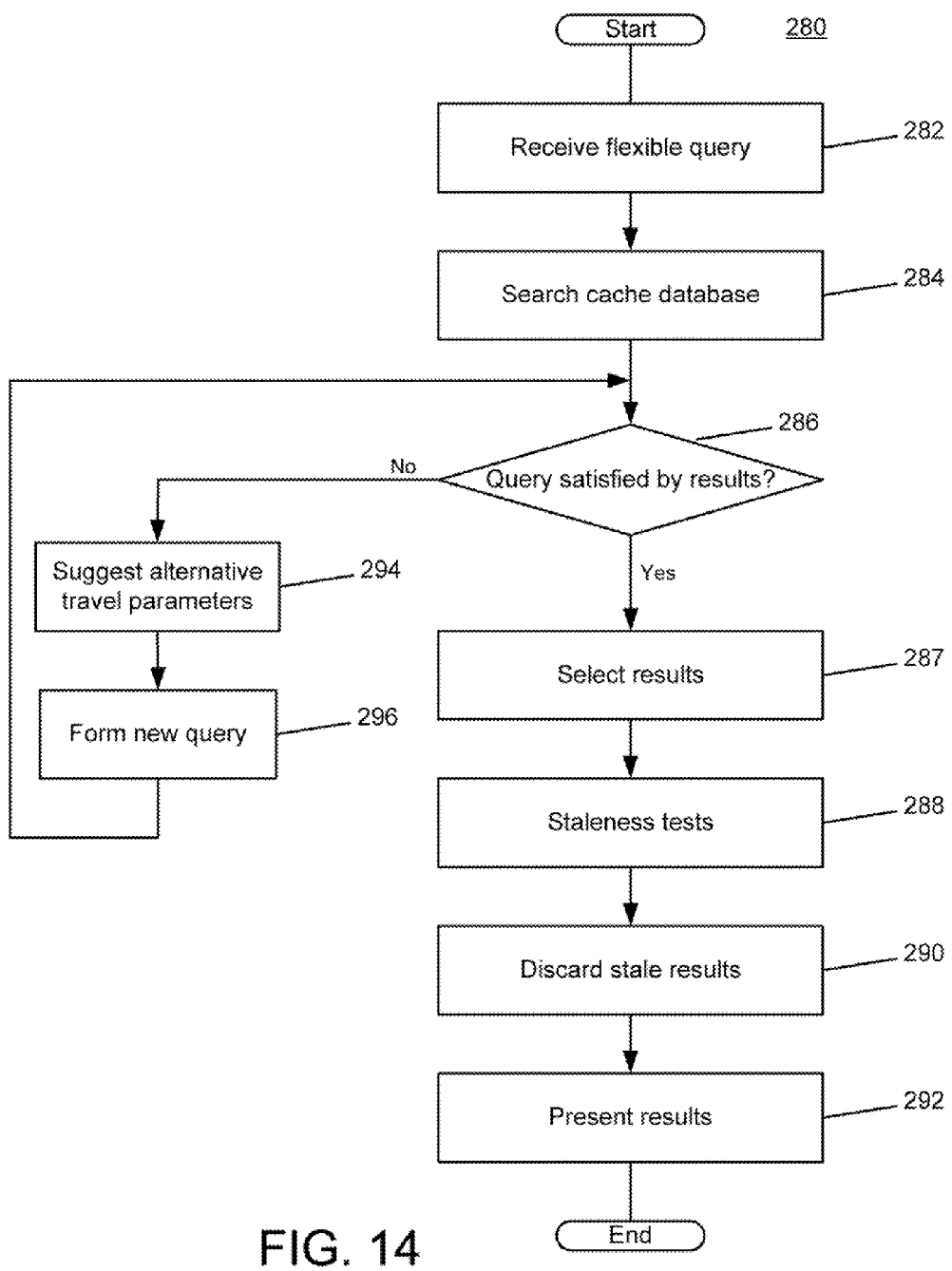
FIG. 14 is flowchart of a process for answering a flexible query.

Referring to FIG. 14, a process 280 for answering a flexible date query using the travel planning system 10 (FIG. 1) is shown. At the web server 26, process 280 receives (282) a flexible travel query 12 specifying a range of one or more parameter of a desired trip for a user. For example, the query 12 may specify one or more of a range of departure dates, a range of return dates, and a range of airports. The process 280 searches (284) the cache database 28 for results 42 (i.e., summary information or pricing solutions) that satisfy travel parameters of the query 12. The results 42 include answers from previous queries (either preemptive queries 22, user queries 12, or a combination thereof). If the process 280 determines (286) that a result 42 satisfies the query 12, the process 280 selects (287) the result 42. The selected results 42 are tested (288) for staleness using one or more of the techniques described above (e.g., availability merging process 100 described in FIG. 3) for determining whether a seat for given fare and set of flight(s) is available. Those results 42 that are determined to be stale (e.g., have no seats available) are discarded (290), while the remaining results 42 are presented (292) to the user. All of the results 42 returned to the user represent pricing solutions that are available for purchase at the time of presentation.

If however, there are no results 42 that satisfy the query 12 (286), the process 280 suggests (294) alternate travel parameters in place of one or more of the travel parameters of the original query 12. For example, the process 280 may suggest alternative airports (e.g., nearby airports or airports with similar properties), alternative destinations (e.g., popular European destinations or other popular Caribbean islands), and/or alternative travel dates. The process 280 forms (296) a new query that includes the alternate travel parameters and the remaining travel parameters of the original query. The process 280 selects (296) the results 42 that satisfy the new query, checks for staleness (288), discards any stale results 42 (290), and returns (292) the remaining results 42 to the user.

C. Anticipatory Presentation

Traditional travel planning interfaces such as those of travel agency and airline web sites require the entry of travel parameters (such as airports and dates and numbers of passengers) prior to the dispatch of LFS queries 12 to TPSes. Rather than waiting for a user to provide travel parameters in a query 12, the caching system 11 anticipates one or more travel parameters of a user's query 12, and searches the cache database 28 for cached results 42 that satisfy the anticipated travel parameters and presents any qualifying results 42 to the user prior to receiving any travel queries 12 from the user. Anticipating travel parameters of interest to a user minimizes the data entry tasks the user must perform and presents travel results 42 immediately after the user accesses the web site. In general, presenting results 42 that anticipate users' travel interests is economically and/or computationally impractical using conventional TPS technology. By reducing the time and cost associated with answering travel queries 18, the caching system 10 makes it practical to anticipate queries and present travel information to users that have not explicitly requested such travel information.

Figure 15:
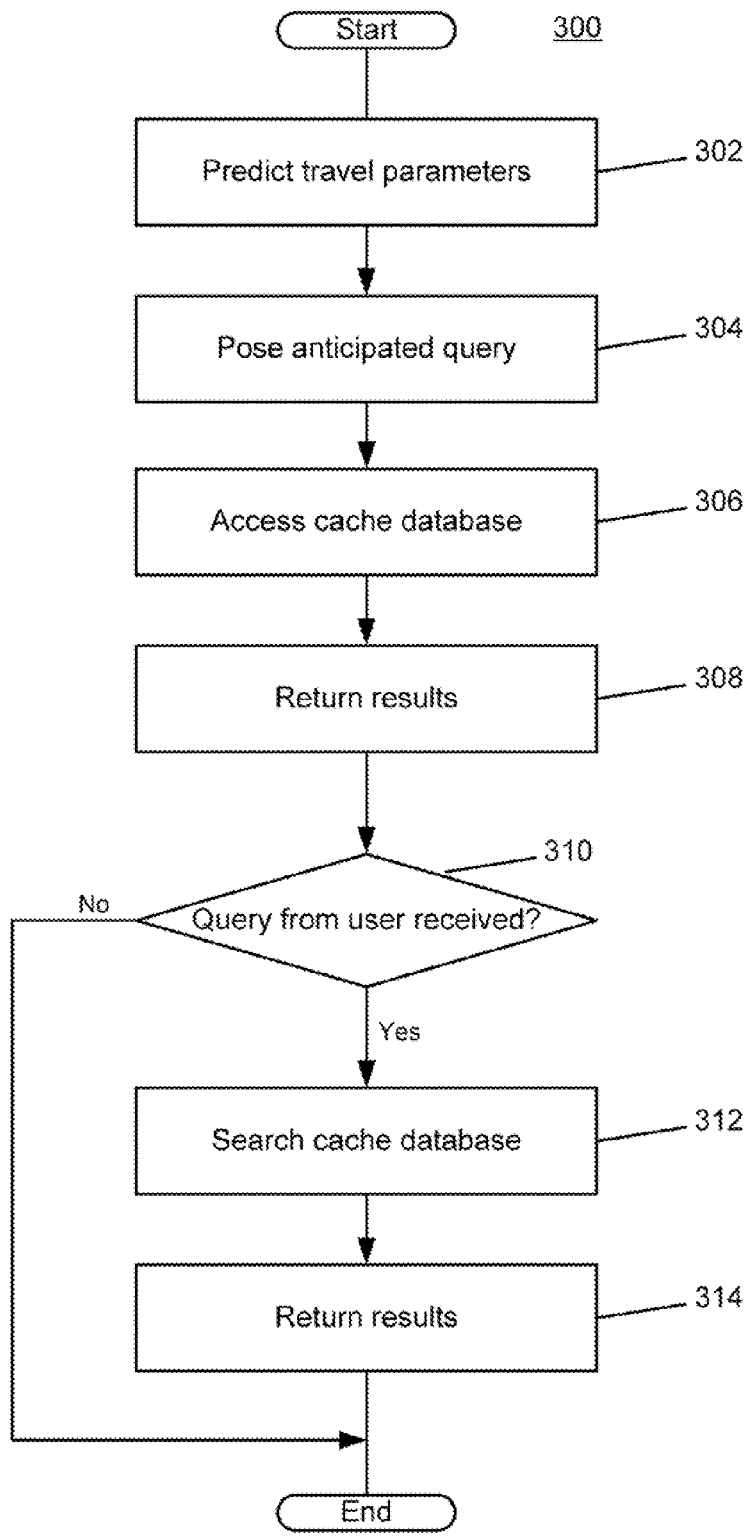
FIG. 15 is a flowchart of a process for presenting travel information to a user based on travel parameters anticipated to be of interest to the user.

Referring to FIG. 15, a process 300 for presenting travel information to a user based on travel parameters anticipated to be of interest to the user is shown. At the web server 26 or at a third party web server, one or more parameters of a travel query of likely interest to a user are predicted (302) by evaluating information associated with the user.

In some embodiments, the travel parameters are predicted using historical information associated with previous queries submitted by the user. In other embodiments, the travel parameters are predicted by selecting default parameters that reflect general popularity. In further embodiments, the travel parameters are selected according to a geographic location of the user determined from location identification information such as an IP address. These and other processes for anticipating travel parameters of interest to users are described below in further detail.

Examples of predicted travel parameters include an origin location (e.g., an outbound city and/or outbound airport), a destination location (e.g., a destination city and/or destination airport), a departure date, and a return date. The set of parameters that must be anticipated depends in part on the methods used to present results. For example, if the cheapest price, a price matrix, such as that disclosed in U.S. Pat. No. 6,801,226 assigned to the assignee of the present invention, or pricing-solutions for a traditional basic round-trip query on specific dates are to be presented, the anticipated travel parameters may include an origin and destination location and outbound and return dates. If the presentation itemizes returned results 42 by a particular travel parameter of the query 12, for example displaying the cheapest price per outbound date in a calendar presentation, then that travel parameter (e.g., outbound date) may not be anticipated. In another example, if the prices of trips to or from different locations are presented to the user in a map or list format, the origin or destination may not be anticipated. Some presentations may group the returned results according to one or more particular travel parameters of the query 12 that are not anticipated. For example, a presentation may display the cheapest price(s) for any outbound and return date in the next month.

A travel query that includes the anticipated travel parameters is posed (304) to the caching system 11. At the caching system 11, the poller 36 accesses (306) the cache database 28 to provide a set of results 42 that satisfy the travel query. The poller 36 returns (308) the results 42 to the client 16 at which the results 42 are presented to the user using one or more methods, including those discussed above. In some embodiments, the results 42 are pricing solutions that are available for purchase at the time they are presented (308) to the user. The application returning the results 42 to the user optionally allows the user to edit the anticipated query if the returned results 42 are undesirable. If a new query 12 is received (310)

from the user, the caching system 10 searches (312) the results 42 stored in the cache database 28 for those results 42 that satisfy the travel parameter of the user's query 12 and returns (314) those results 42 to the user. If a new query 12 is not received (310) the caching system 11 assumes that the user is satisfied with the results 42 generated in response to the anticipated query parameters.

1. Methods for Anticipating Query Parameters

Various techniques are available for anticipating travel parameters of likely interest to a user. In some techniques, the travel parameters are selected based on information associated with a particular user while other techniques select travel parameters based on information associated with a collective group of users.

a. User Location Identification

In many applications, a user's identity or location is used to anticipate travel parameters for populating a travel query. Different distribution technologies allow for different methods of user or user location identification. For example, web browsers permit storage of user identifiers in cookies, with subsequent access by web servers.

Figure 16:
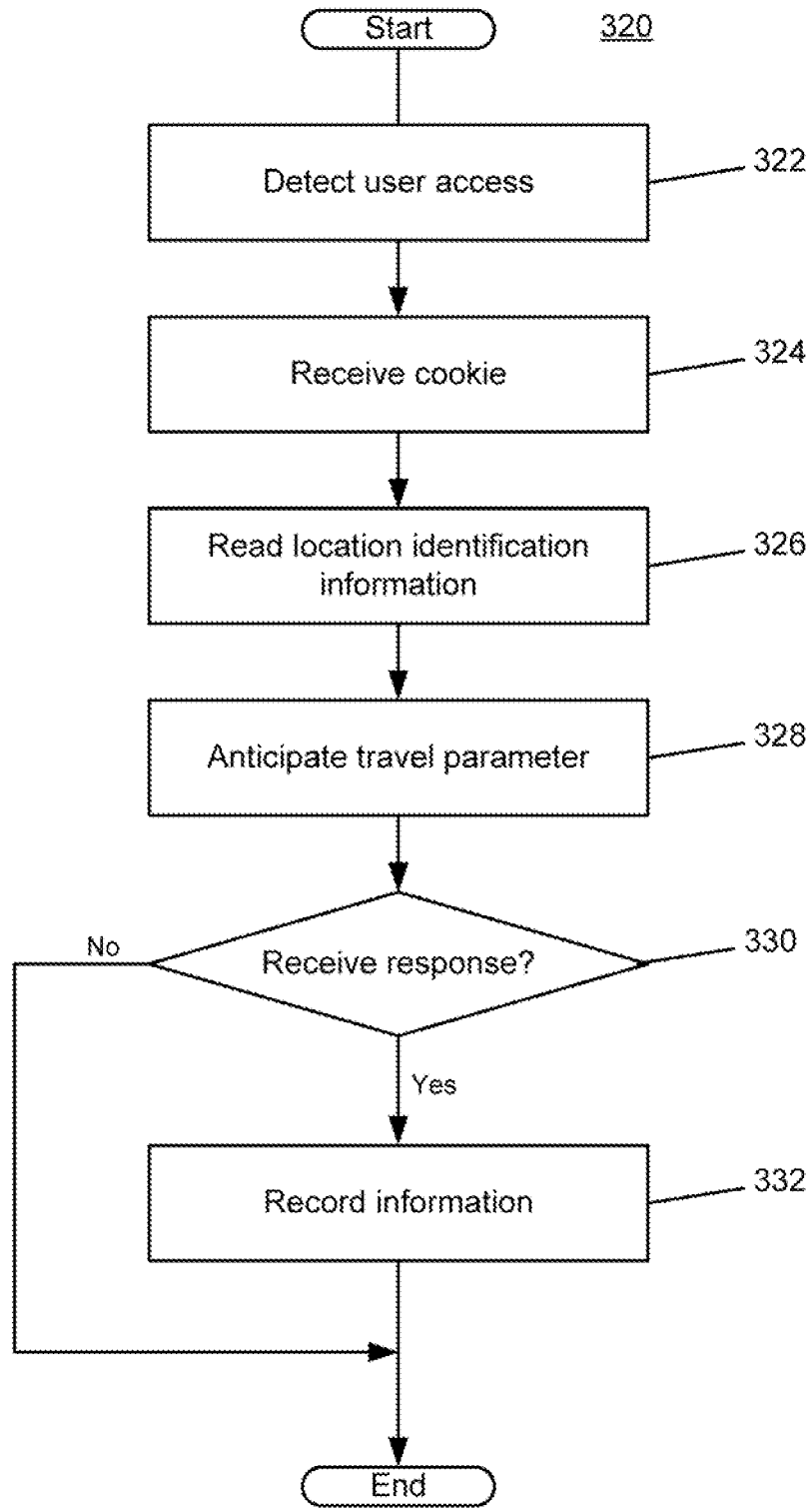
FIG. 16 is a flowchart of a process for anticipating a travel parameter based on location identification found in a cookie.

Referring to FIG. 16, a process 320 by which a travel application anticipates a travel parameter based on location identification information found in a user identifier, e.g., a cookie is shown. The process 320 detects (322) that a user at the client 16 has accessed a web site that runs the travel application. The browser 32 on the client system 16 (see FIG. 1) locates a cookie that is associated with the web site and stored in the client 16. The cookie is a small piece of data that was previously sent from the web site to the client 16 when the user first accessed the web site. The cookie includes information identifying the user and may additionally include travel preferences or travel parameters that had been previously indicated by the user.

The process 320 receives (324) the cookie from the user and reads (326) location identification information stored in the cookie. Using the location identification, the process 320 anticipates (328) an origin travel parameter including an airport located nearest to the user as determined from the location identification. If the process 320 receives (330) a response from the user, it records (332) new information pertaining to the response in the cookie. The response may be a request to book a trip that includes the anticipated travel parameter. The response may also be a travel query submitted by the user having a different origin parameter than the one anticipated (328) by the process 320. The new information may be used by the travel application to anticipate travel parameters during future visits to the web site by the user.

Figure 17:
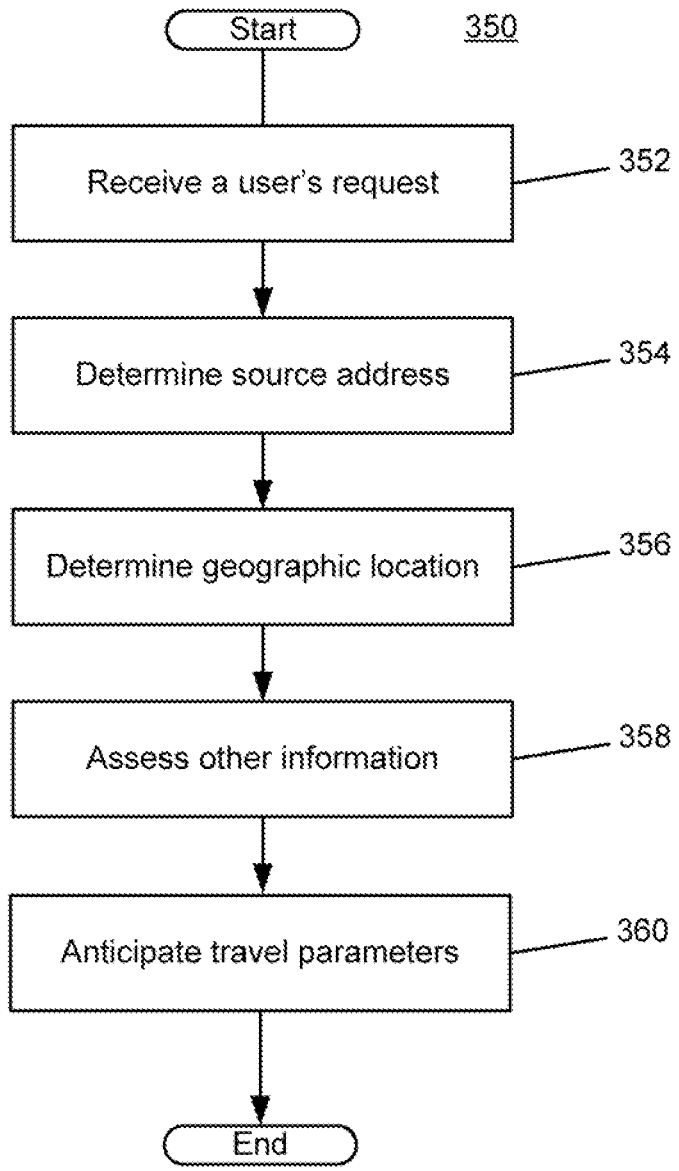
FIG. 17 is a flowchart of a process for anticipating a travel parameter based on identification information of origin of an electronic communication sent by the user.

Referring to FIG. 17, a process 350 anticipates a travel parameter based on identification information of origin of an electronic communication sent by the user. The process 350 receives (352) a request from a user at the client 16 to access the travel application. From the request, the process 350 determines (354) the source address of the client 16. For example, communication protocols based on TCP/IP and world-wide-web that the client 16 uses to request the travel application provides identification of the client 16 in the form of an IP address. The source address could also be based on caller ID information (e.g., a telephone number). The process 350 uses the source address to determine (356) a geographic location of the user. For example, the travel application may invoke databases that map an IP address range to one or more of a country, region and city to determine a geographic location that corresponds to the IP address.

From the source address, the process 350 assesses (358) other information associated with the user. For example, in addition to the geographic location of the user, the travel application may determine the company or organizational affiliation of the user, or the user's country of citizenship. The process 350 anticipates (360) travel parameters for a trip of interest to the user based on the location identification information and any other information associated with the user. For example, the travel application estimates origin airports that are located within or nearest to the geographic location corresponding to geographic location of the user as determined from the source address.

In some implementations in which a user calls a travel agent, a travel application running on the agent's computer uses caller ID information to identify the user and/or to make a probable guess as to the user's location or affiliation. The caller ID information is used by the travel application to populate the travel agent's display with prices and other information about trips the user commonly makes. If the user cannot be uniquely identified, the travel application uses the location identification information found in the caller ID information to display information about trips to popular vacation destinations from origin airports located nearest to the user as determined from the location identification information. Other technologies may permit other mechanisms for identifying user identity, affiliation or location, including global positioning systems (GPS) data or cell on mobile telephones and pre-stored computer location or identifier information on applications running on computers.

b. System Defaults

In some embodiments, the caching system 11 selects travel parameters that reflect general popularity, such as travel dates in the near future (e.g., 7 or 14 or 21 days from the present), travel dates corresponding to national or religious holidays, or popular origins and destinations (vacation spots).

Figure 18:
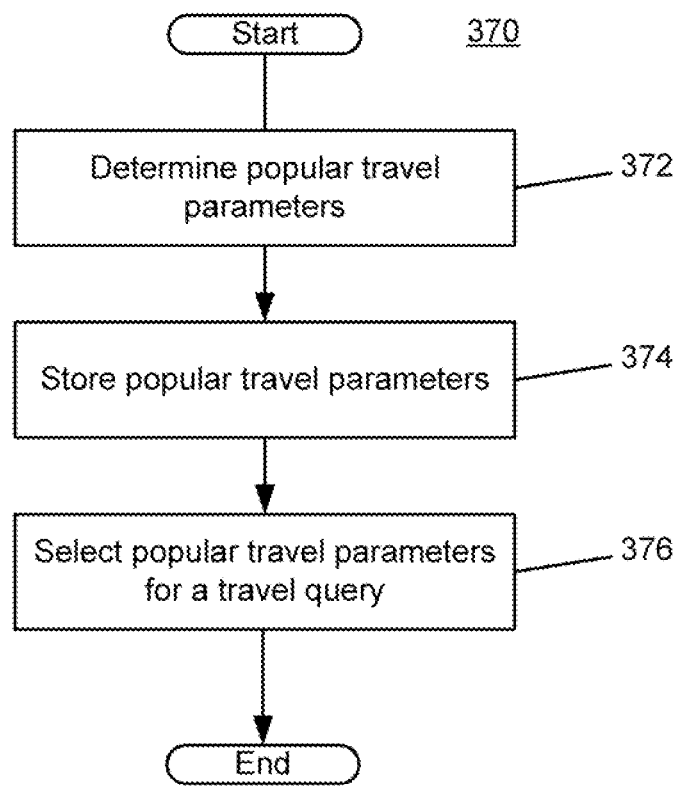
FIG. 18 is a flowchart of a process for anticipating travel parameters for a user based on popular travel parameters.

Referring to FIG. 18, a process 370 performed by a travel application anticipates travel parameters for a user based on popular travel parameters. The process 370 determines (372) popular travel parameters for different parameter types (e.g., origin, destination, travel dates, airports, etc.). For example, the popular travel parameters may include those travel parameters that are listed most frequently in the user preferences database 30 (FIG. 1) or those travel parameters that have been requested by users most frequently within a predetermined period of time (e.g., a destination requested most frequently in the last week). The process 370 stores (374) the popular travel parameters in a database and selects (376) one or more of the popular travel parameters to include in a travel query. When forming the query, the caching system 11 may select one or more of the travel parameters at random or according to a predefined selection scheme. For example, a selection scheme may instruct the caching system 11 to select a fixed set of travel parameters.

c. Prior Searches

In some embodiments, travel parameters for a particular user are anticipated based on the travel parameters stored in the preferences database 30. A user preferences database 30 stores identification information associated with users and prior queries posed by those users, including travel parameters used in those queries. For example, travel parameters for origin, destination, and dates of travel may be anticipated from the origin, destination, and dates of the most recent query posed by the user.

Figure 19:
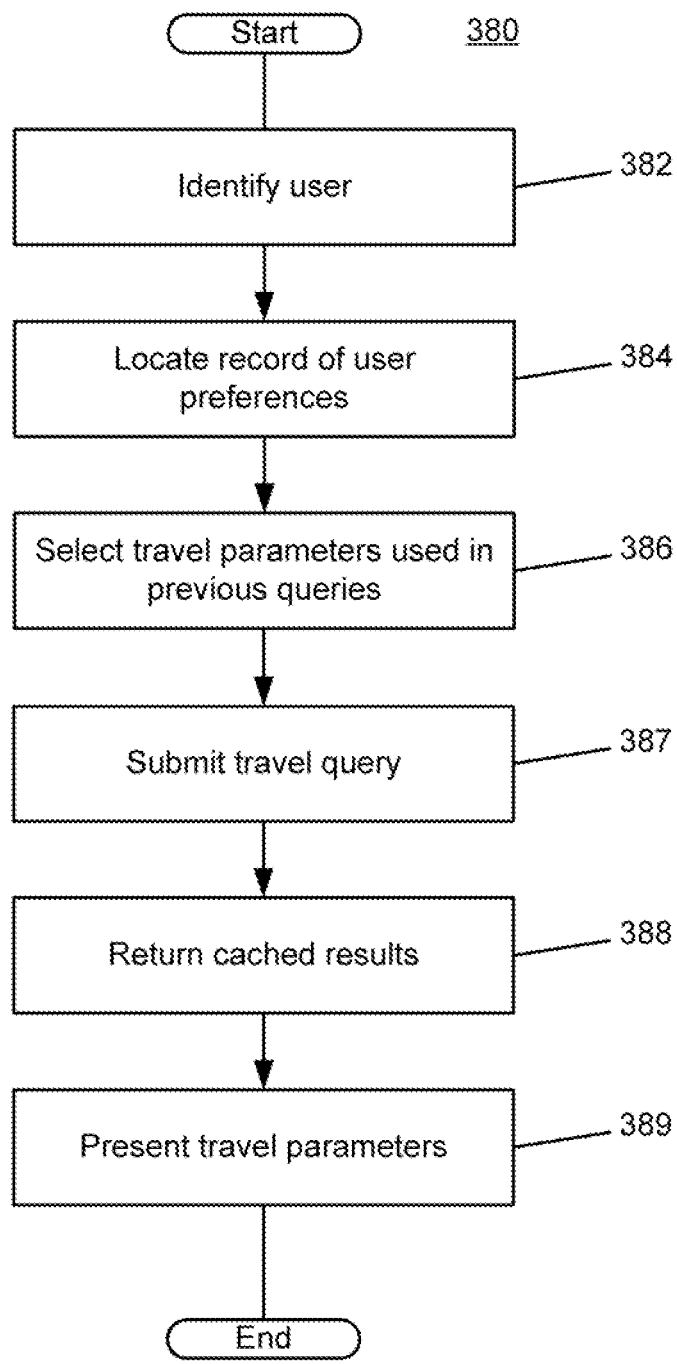
FIG. 19 is a flowchart of a process for anticipating travel parameters from information related to prior searches performed by the user.

Referring to FIG. 19, a travel application performs a process 380 for anticipating travel parameters from information related to prior searches performed by the user. This information may be stored in a historical database (not shown). When a user accesses the travel application, the process 380 identifies (382) the user. For example, the travel application may require the user to enter authentication information, such as a login name and/or password. From the authentication information, the process 380 uniquely identifies (382) the user. The process 380 locates (384) a record that stores the user's preferences in the preferences database 30 (FIG. 1). The process 380 selects (386) one or more of the travel parameters used in one or more previous queries stored in the record. The process 380, for example, may select the travel parameters for, e.g., the most recent query stored in the user's records. Alternatively, the process 380 may select travel parameters that the user requested most frequently in previous queries submitted by the user. The process 380 may also select most popular travel parameters to include in the travel query. For example, in a travel query, the process 380 may include (1) anticipated travel parameters for origin and destination selected from a list of, e.g., the most popular origins and destinations determined from queries of other users and (2) anticipated travel parameters for travel dates selected from the travel dates of the most recent query stored for the user in the preferences database 30. The process 380 submits (387) the travel query to the caching system 11 and returns (388) a set of cached results 42 that satisfy the travel query. Through the browser 32, the process 380 presents (389) to the user a list of travel parameters that serve as likely alternatives to the default selection included in the travel query. For example, the browser 32 may present the travel parameters as a pull-down menu of travel parameters that the user can select to include in a new query. The user may then select one or more of the alternatives in place or in addition to the default selection.

d. Result Properties

In some embodiments, travel parameters are anticipated based on properties of the cached results 42. For example, destination and/or travel date parameters for a query may include destinations and/or times for which the best available price is particularly low relative to other possibilities or historical prices for the same parameters. Other travel parameters that are included in the query may be anticipated from identification information associated with the user.

Figures 20, 21:
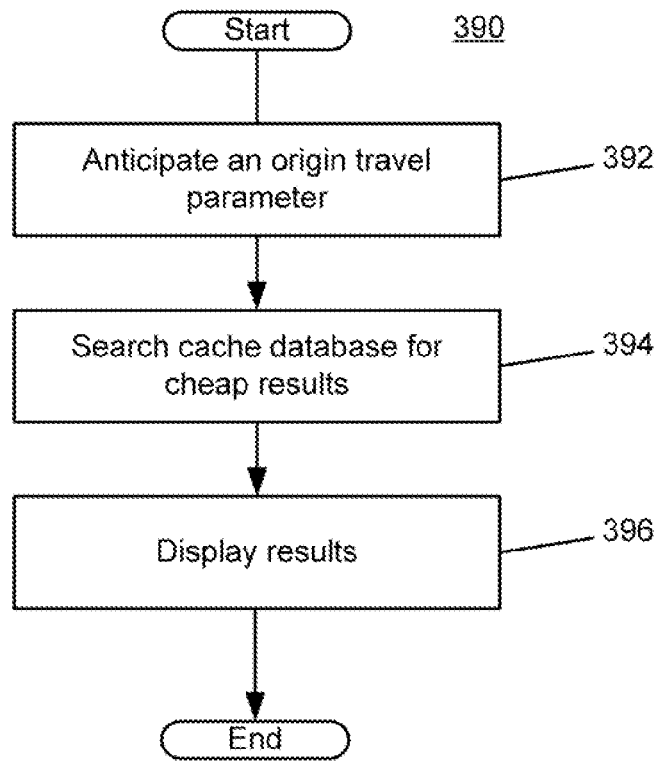
FIG. 20 is a flowchart of a process for anticipating travel parameters based on properties of the cached results stored in the cache database.
FIG. 21 is a diagram of a display for presenting travel information to a user.

Referring to FIG. 20, a process 390 performed by a travel application anticipates travel parameters based on properties of the cached results 42 stored in the cache database 28. The process 390 anticipates (392) an origin travel parameter for a user from location identification information associated with the user. For example, the process 390 may use the process 320 described in FIG. 16 to anticipate an origin travel parameter. The process 390 searches (394) the cache database 28 for results 42 that include the anticipated origin travel parameter and that are particularly cheap (e.g., marked down at least 25% from an average price). The process 390 displays (396) those results 42 to a user (e.g., a traveler or a travel agent serving the traveler). The results displayed to the user may be accompanied by information on historical prices.

In other implementations, the process 390 anticipates a travel parameter other than an origin travel parameter for the user in step 392. For example, the process 390 may anticipate a destination travel parameter from previous queries submitted by the user or from a list of most popular destinations stored in the user preferences database 30. In step 392, the process 390 may anticipate multiple travel parameters in addition to the origin travel parameter. The multiple travel parameters may be anticipated based on other factors such as user's historical advance purchase. Destinations may be defaults (e.g., vacation destinations, or vacation destinations popular and practical for given origin), those of interest to user (e.g., as entered by user in preference database), relate to results (e.g., those destinations for which particularly cheap solutions are available), or be calculated based on other known properties of an individual such as types of trips searched for or purchased in past and their price level.

In another implementation, instead of anticipating the origin travel parameter in step 392, the travel application may receive the origin travel parameter from the user or access an origin travel parameter that is preferred by the user from a record stored for the user in the preferences database 30.

Referring to FIG. 21, a display 400 of discount trips that could be presented to the user is shown. The display 400 depicts historical prices for the trips in parenthesis. Travel application for implementing the process 390 can be included in web home pages, including those constructed by web portals such as AOL®, Yahoo®, Google® and MSN®, or airline or travel agent pages, or desktop notification applications, or regular e-mail or RSS feeds, or as embedded parts of user-created web pages such as event, attraction or lodging web pages, or as advertisements embedded in other web pages, or as interactive advertisements embedded in other web pages.

e. Specification by User

The travel planning system 10 may populate a query with travel parameters based on travel preferences specified by users in the user preferences database 30.

Figures 22, 23:
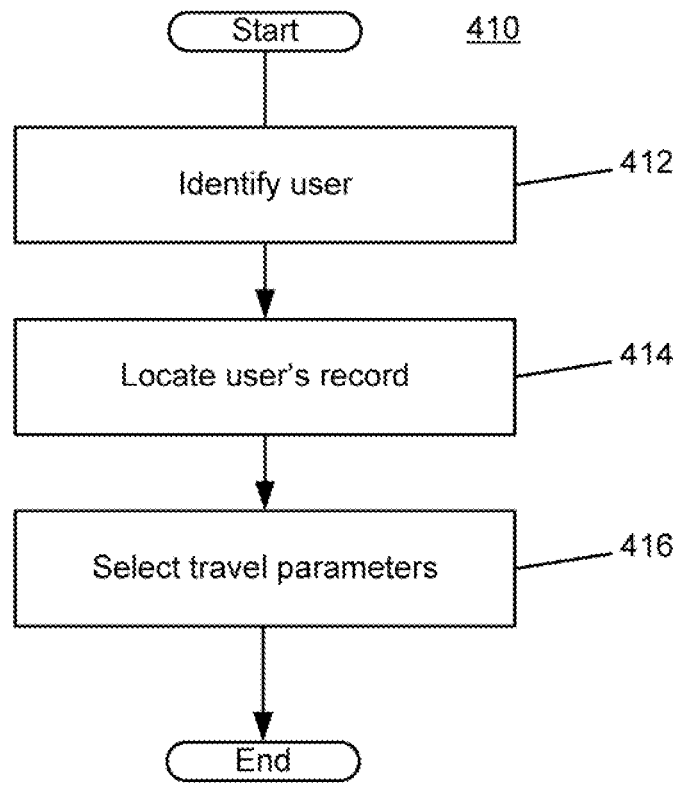
FIG. 22 is a flowchart of a process for anticipating travel parameters based on preferences specified by a user.
FIG. 23 is a diagram of a display for presenting travel information to a user.

Referring to FIG. 22, a process 410 performed by a travel application anticipates travel parameters based on preferences specified by a user. The user's preferences are stored in a record associated with the user in the user preferences database 30. When a user accesses the travel application, the process 410 identifies (412) the user. For example, the process 410 may require the user to enter authentication information, such as a login name and/or password. From the authentication information, the process 410 uniquely identifies (412) the user. After the user has been identified, the process 410 locates (414) a record that stores the user's preferences in the preferences database 30. The process 410 selects (416) one or more of the travel parameters from the user's record to include in a travel query.

In some embodiments, the process 410 is aware of one or more specific trips a user is interested in, including locations, dates, and price, and proactively informs when such a trip becomes available. For example, the process 410 may send the user an email or instant message that includes pricing and schedule information for one or more trips.

Referring to FIG. 23, a display 418 of travel information provided by the travel application to the user is shown. Travel applications for performing process 410 may be included in web home pages, including those constructed by web portals such as AOL®, Yahoo®, Google® and MSN®, or airline or travel agent pages, or desktop notification applications, or regular e-mail or RSS feeds. The display may include controls for accessing details. For example, the entries may be web links that redirect to an interface that presents details of one or more pricing-solutions matching the displayed summary, which may likewise be extracted from the cache database 28 or which may be recomputed by the TPS 12 using current data by posing a pricing query with appropriate parameters (e.g., the origins and destinations and dates of the summary).

Figure 24:
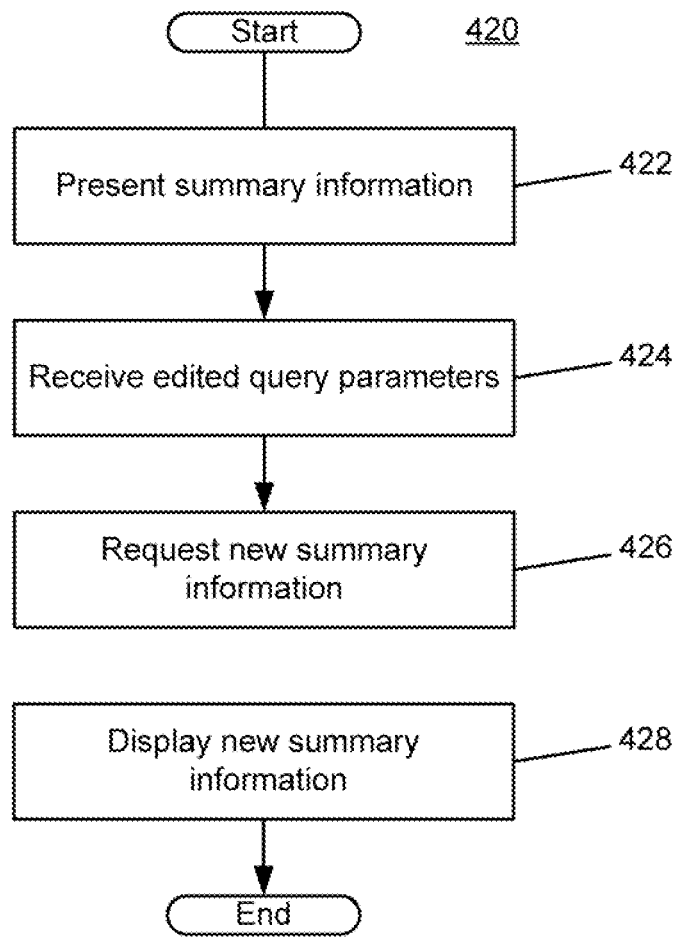
FIG. 24 is a flowchart of a process for presenting summaries of travel information to a user based on known origin and destinations of interest to the user.

Referring to FIG. 24, a process 420 performed by a travel application is aware of origin and destinations of interest to user, and presents (422) summaries for a range of dates, for example, as a calendar over outbound departure dates presenting the lowest price for that date. The process 420 includes a display having controls for altering the query parameters (e.g., origins, destinations, and length of stay). After receiving (424) edited query parameters from a user, the process 420 requests (426) new summary information associated with the edited query parameters from the cache database 28 and displays (428) the new summary information to the user. As with the previous example, optional controls such as web links can be used to cause more detailed information to be presented. Other controls that use filters to filter summary information based on, e.g., airline, number of stops, passenger types, and counts might also be used as disclosed in U.S. patent application Ser. No. 10/272,521, entitled "Flexible-Date Travel Queries" by Rodney Daughtrey et al. and assigned to the assignee of the present invention. Such a process 420 may be included in web home pages, including those constructed by web portals such as AOL®, Yahoo®, Google® and MSN®, or airline or travel agent pages, or desktop notification applications, or regular e-mail or RSS feeds, or as embedded parts of user-produced web pages such as event, attraction or lodging web pages.

Referring to FIG. 25, a process 430 performed by a travel application that uses entry forms similar to the entry forms used by conventional travel applications found on such websites as "Orbitz.com" and "Expedia.com" in which trip segment origins and destinations and travel dates are entered by the user. The process 430 anticipates (432) travel parameters of interest to a user from user preferences database 30 or from other sources and fills (434) in the entry form with travel parameters (e.g., airports, cities and dates). The application queries (436) the cache database 28 with the travel parameters and receives (438), from the database 24, results 42 that satisfy the anticipated query parameters prior to any data entry by the user. The process 430 displays (440) the results 42 to the user. The process 430 may display the results 42 to the user in a variety of presentations, including a summary matrix, such as that disclosed in U.S. Pat. No. 6,801,226 assigned to the assignee of the present invention, and a listing of pricing solutions.

Referring to FIG. 26, an example of a display 442 that presents prices for trips from Boston to Los Angeles on various carriers is shown. The results 42 displayed to the user may include alternative origin and destination airports, dates or combinations that may be available as "shortcuts" to explicit entry.

For the display 442 and displays shown in subsequent figures, entries surrounded by [ ] are pre-populated, but editable, query parameters; entries surrounded by < > are buttons for altering query parameters; and entries surrounded by ( ) are alternative airports (e.g., in display 442, BOS and PVD are presented as alternative origins and LAX, PAR, and MIA are presented as alternative destinations). Clicking on an alternative parameter causes the entry form to be filled with the alternative parameter and the application to display travel options associated with the alternative parameter. For example if the user clicks on PVD, the application presents prices for trips from PVD to LAX that originate on January 22 and return on January 27.

If the results 42 in the cache database 28 do not include pricing-solutions but only prices, anticipatory display may include summary information, such as in the form of a matrix, but not listing of pricing solutions (since the cache in this example only includes prices). The application may be included in airline and travel agent web sites, CRS (computer reservation system)/GDS (global distribution system) interfaces for travel agents, or embedded in web sites for events, attractions or lodging.

f. Defaults Provided by Application Instance

In some cases, a travel planning application populates queries with travel parameters (or equivalently, some form of identification of the application instances that can be used to retrieve parameters from a database) that are hard-wired to the instance of the application that is accessed by a user. Examples of an application instance include URLs (i.e., text-based addresses that identify specific resources on the Internet, such as web pages) or short computer programs intended to be embedded in web pages or desktop environments, that contain identifiers or query parameters.

Figure 27:
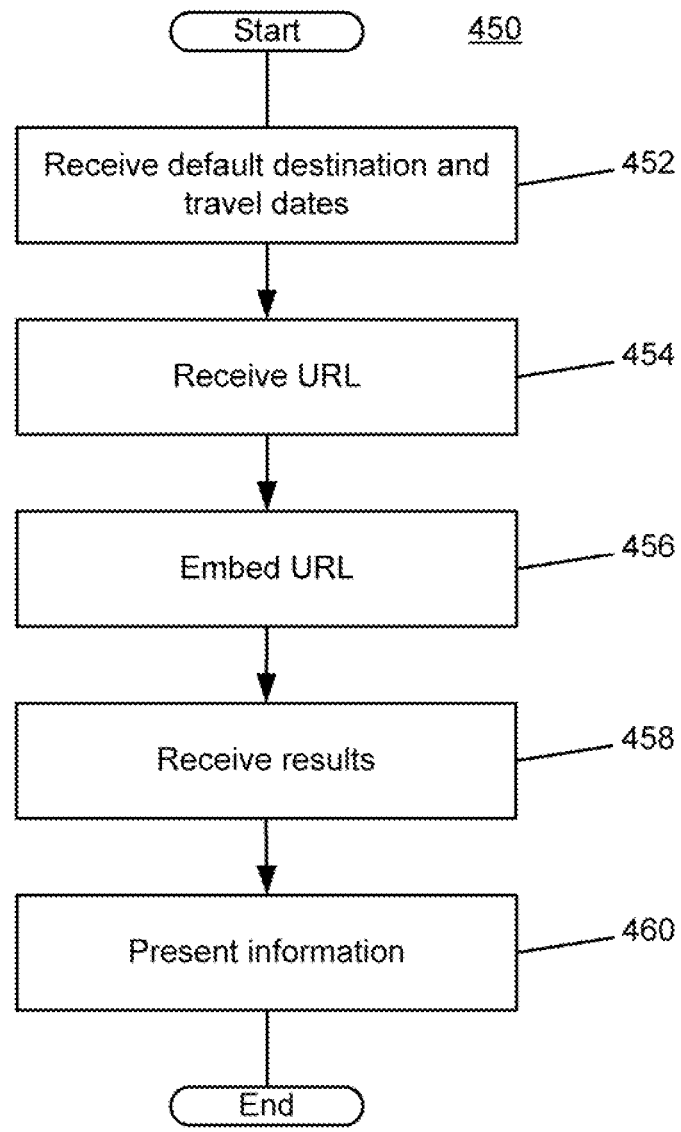
FIG. 27 is a flowchart of a process for replicating a travel planning application with parameters.

Referring to FIG. 27, a web travel planning application process 450 in which the travel planning application is replicated with parameters provided by an organizer of an event is shown. A web travel planning service offers a web interface in which Internet users may produce custom instances of travel planning applications particularized for certain query parameters. The web travel planning application process 450 receives (452) a default destination and travel dates for an event such as a widely attended convention from a user (e.g., a person or party affiliated with the event). The web travel planning application process 450 receives (454) a URL from the web travel planning service that points to a caching system 11 of a travel planning system 10 and that also includes the destination and travel dates as URL parameters. The user instructs the web travel planning application process 450 to embed (456) the URL in a link on a web page affiliated with the event (e.g., a convention home page). When attendees access the web page and click on the embedded link, the caching system 11 generates a web page of cached results 42 that satisfy the destination and travel dates included in the URL. The caching system 11 sends these results 42 to the web travel planning application process 450. After receiving (458) the results 42, the web travel planning application process 450 presents (460) information particular to the origin airport of the attendee by using the attendee's IP address or identification information found in a cookie.

As a variation, rather than returning a URL containing the query parameters, the web travel planning application may generate a set of computer instructions to be embedded in the event home page to cause the price information to be automatically displayed to an attendee accessing the event home page without the attendee clicking on a link. These instructions may take the form, for example, of Java or JavaScript instructions that contain query parameters or identification information (for example, a unique identifier for the custom application instance, in this case unique to the convention). The computer instructions cause the attendee's web browser to send a request for prices and other trip information of relevance (e.g., advertisements). The request includes the query parameters. The request is processed by the cache system 11 returning cached results 42 satisfying the query parameters. The cached results 42 are subsequently displayed on the home page. In some implementations, the home page also displays controls for sorting and filtering the results and controls for changing the query parameters. Anticipatory presentation of cached results 42 based on identification information associated with the attendee is used either in a context where the attendee has the capability of altering the display by specifying a different query, or one in which the display is static.

Referring to FIG. 28, an example of an interface 462 presented to an attendee from a conference home page is shown. The dates and destination are particular and are preset to match the dates and destination of the conference. The origin is anticipated from location identification information of a user visiting the conference home page using mechanisms described above. The origin may also be edited by the user. The conference home page may provide controls for sorting and filtering travel options presented to the user. The appearance of the interface application may also be customized by the party hosting the conference home page, for example including title or utilizing look-and-feel parameters provided by the party in a web cascading style sheet (CSS). The interface application may be implemented using a source code utilizing HTML, XML, XHTML, MSHTML, JavaScript, or any other appropriate programming language.

The interface 462 shown in FIG. 28 and other similar interfaces are suitable, for example, for event, organization or attraction web pages, or as advertisements embedded in other web pages, or as interactive advertisements embedded in other web pages, and especially as created using a travel planning service that generates such particularized instances using a public interface.

Referring to FIG. 29, an example of an interface 470 affiliated with lodging or other services having time-varying availability or price is shown. The interface 470 presents travel information from the cached database 28 combined with other computed or cached source of price or availability information for the lodging service. The interface 470 presents a combined travel/lodging options for each date or date combination. The combined travel/lodging options include the best travel price with the price of lodging over the duration of stay.

The interface 470 and other similar interfaces are also suitable for event, organization or attraction web pages, or as advertisements embedded in other web pages, or as interactive advertisements embedded in other web pages. Such interfaces may be produced by a travel planning service from a publicly available interface.

The integration of the price or availability information for the lodging service may be done by the travel application using a table or database provided by the lodging service provider to the travel application. For example, for a display implemented using computer program embedded in a web page (such as Java or JavaScript), a price and availability table may be provided to the computer program in a data region of the web page. Alternatively, the lodging service provider may send a table or a database of price and availability information to a middleware application used to integrate cached results 42 stored in the cache database 28 with service price and availability information and generate a combined result table for display. Or various other implementations may be used.

2. Promotional

Parameters may be based on promotions or advertisements, for example choosing destinations and/or times relating to products that a supplier or agent desires to promote. In the above applications, advertisements or promotions may be presented in addition to the cached travel results 42. Such advertisements or promotions may be for travel options (e.g., by highlighting one or more solutions or placing in a prominent position) or for other goods or services (e.g., advertisements for hotels associated with a flight option display). These and other examples of presenting advertisements and promotions using the caching system 11 are discussed in further detail below.

D. Notification and Subscription Service

For some travel applications it is desirable to distribute all or a portion of the cached results 42 (see FIG. 1) of the cache database 28 as changes to the cached results 42 occur. If timestamps are associated with the results 42, the caching system 11 detects changes by comparing new results 42 to corresponding results 42 having timestamps that immediately precede the timestamps of the new results 42. Users may purchase subscriptions to services that notify the users of changes to results 42 in the cache database 28. Various types of subscriptions and notification services are described below in further detail.

1. Notification of Market Price Changes

As an example, a traveler or travel agent may desire to be notified immediately whenever the price for travel in a particular market (e.g. city pair) for particular dates falls below a certain price, so that they may purchase a ticket before the price changes or seat availability is exhausted. Such a use is particularly appropriate for agents or airlines using business models in which the traveler pays the agent or airline a fixed price for any pricing-solution satisfying certain basic location and time requirements, and the agent or airline has substantial freedom in choosing the pricing-solution to satisfy the requirement and the purchase time and may particularly benefit from finding a low priced pricing-solution satisfying the requirements.

Figure 30:
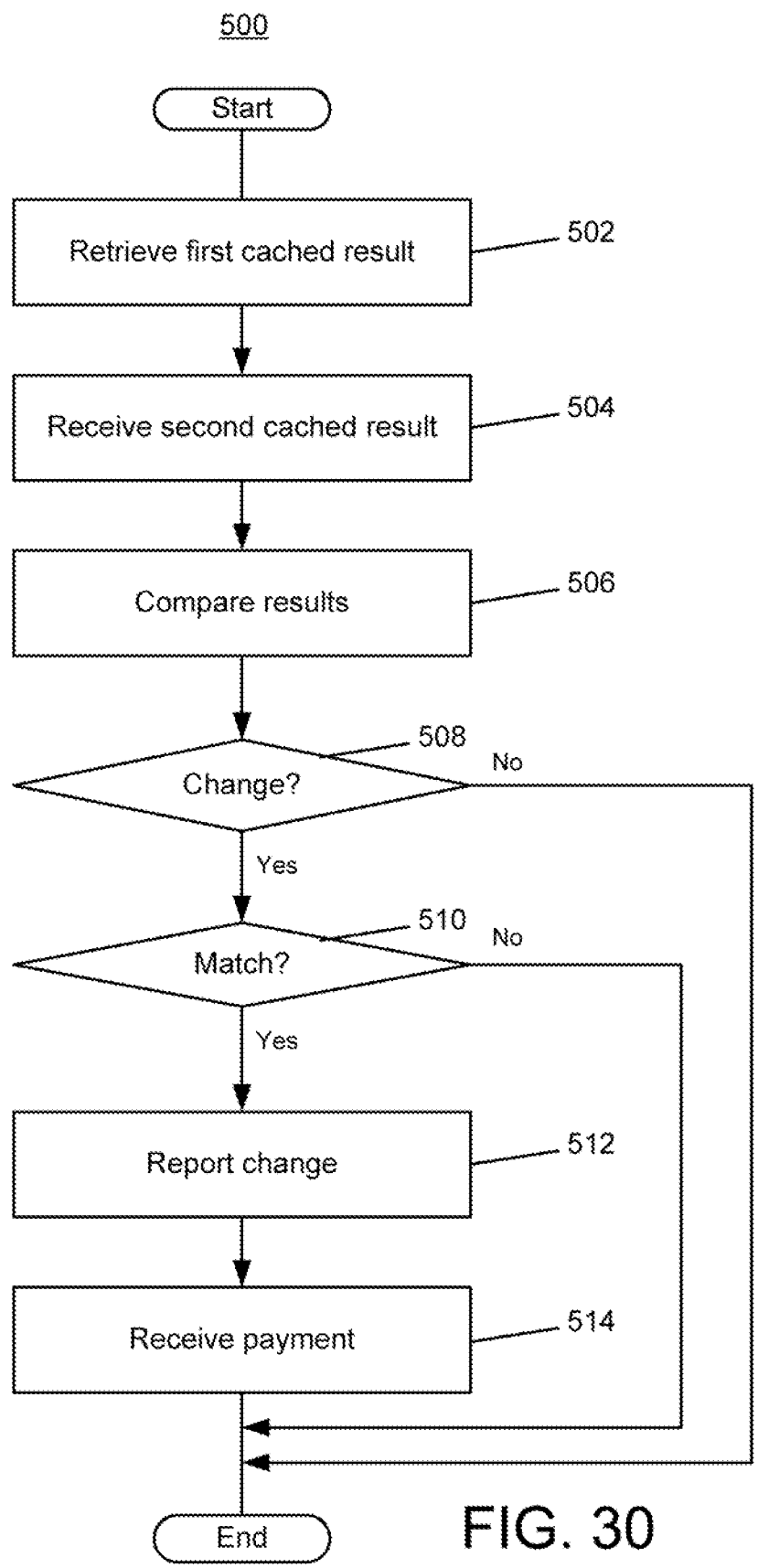
FIG. 30 is a flowchart of a process for presenting travel information to a user based on detecting a change in one or more cached travel options.

Referring to FIG. 30, a process 500 presents travel information to a user based on detecting a change in one or more of the travel options 42 stored in the cache database 28. The process 500 retrieves (502) a first cached result 42 from the cache database 28 in response to submitting a travel query to a travel planning system at a first time. At a later time, the process 500 receives (504) a second cached result 42 obtained in response to submitting the travel query to the TPS 12. For example, the timestamp of the first cached result 42 may immediately precede the timestamp of the second cached result 42. The process 500 compares (506) the first, retrieved cached result 42 to the second, retrieved cached result and determines (508) whether the results 42 are different. If a change is detected (508), the process 500 determines (510) whether a parameter of the second cached result 42 matches criteria previously specified by the user. For example, the process 500 may determine that the price of the second cached result matches is below a threshold specified by the user. If a match is determined (510), the process 500 reports (512) the change to a user in a report that includes travel parameters of the second cached result 42. The report may also include travel parameters of the first cached result 42 and the difference (e.g., in price) between the first and second results 42.

In exchange for providing the report, the party that owns and operates the caching system 11, receives (514) a payment from the user. In some embodiments, a single payment is received from the user in return for continuously notifying the user of changes to cached travel options over a predetermined period of time (i.e., a subscription to the notification service is purchased by the user). In other embodiments, payment is received from the user in response to the user purchasing one of the travel options, with the payment related to the price of the second result. In further embodiments, payment is received from the user in response to the user purchasing one of the travel options, with the payment related to the price of the second result plus a portion of the difference in price between the first and second travel options.

2. Notification of a Competitor's Price Changes

Another example of application of a travel planning system that provides answers very rapidly with very low marginal cost is to permit travel providers to be informed of competitors' price changes so that they can react in a timely manner to such pricing changes.

Figure 31:
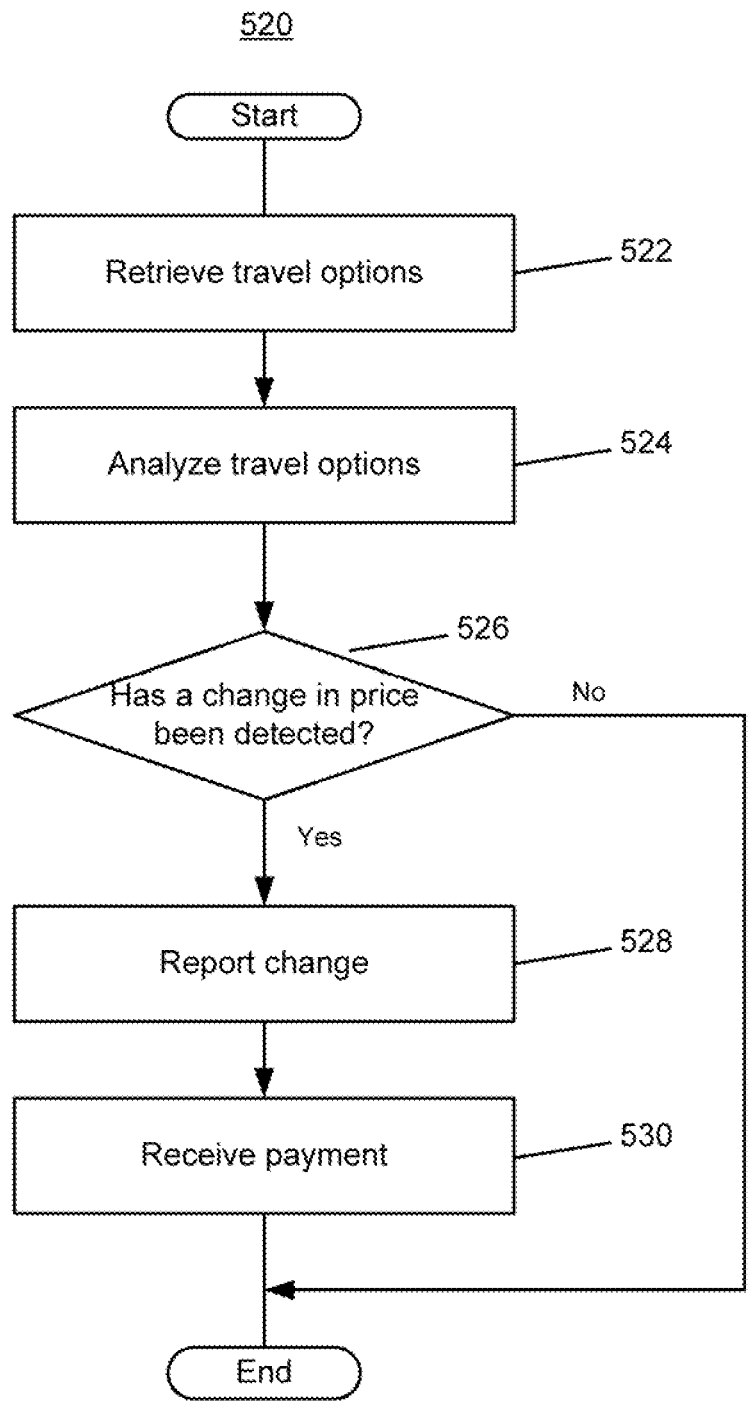
FIG. 31 is a flowchart of a process for presenting travel information to an enterprise based on a change in price of a flight operated by a competitor of the enterprise.

Referring to FIG. 31, a process 520 presents travel information to an enterprise that reflects the change in price of a flight operated by a competitor of that enterprise. The process 520 retrieves (522) cached travel options 42 for travel planning from the cache database 28 and analyzes (524) the cached travel options 42 to detect (526) a change in price of a flight operated by the competitor. For example the process 520 may detect if the price of the flight, for a given set of travel related parameters, has increased or decreased by a predetermined amount. Furthermore, the process 520 may determine that the price of the flight has changed by a predetermined amount relative to a price of a corresponding flight offered by the enterprise. If a change is detected (526) the process 520 reports (528) the change to the enterprise. For example, the process 520 reports (528) the change by sending a report to the enterprise that displays the flight and its current price. The report may also include the previous price of the flight, and the difference between the previous price and the current price. Additionally, the report may include the difference between the current price of the flight offered by the competitor and a similar flight offered by the enterprise. In exchange for providing the report, the party that owns and operates the process 520 receives (530) a payment from the user. In some embodiments, payment from the enterprise is received in return for continuously notifying the enterprise of changes to prices of flights maintained by other enterprises over a predetermined period of time (i.e., in the form of a subscription).

3. Streaming Prices

As a third example, travel providers may wish to display travel information stored in the cache database 28 in a streaming form, (e.g., akin to a stock ticker). The travel information may be displayed in streaming form, for example, on a kiosk or monitor in an airport or the window of a computer desktop application.

Figure 32:
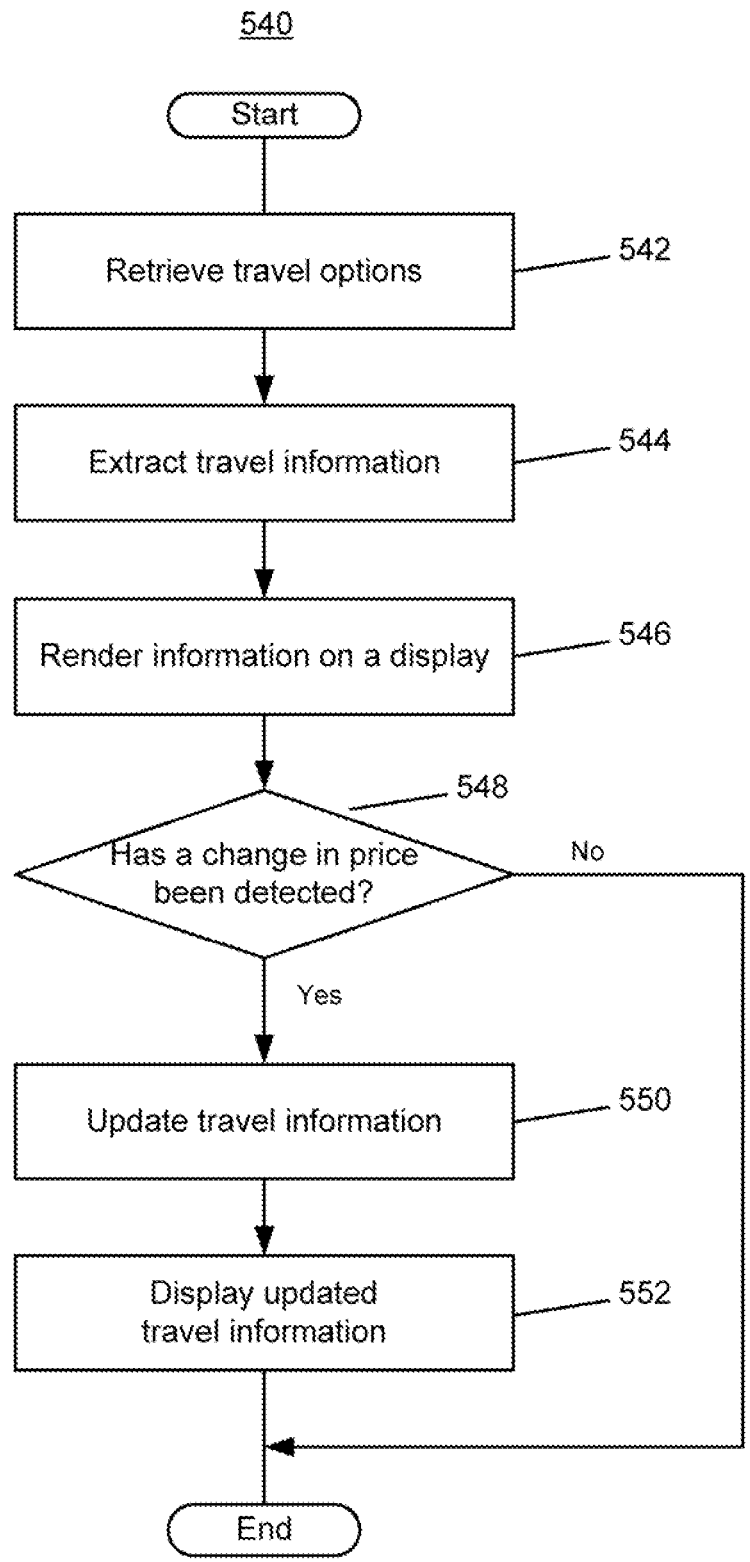
FIG. 32 is a flowchart of a process for presenting travel information in streaming form.

Referring to FIG. 32, a process 540 presents travel information to a user in streaming form based on the results 42 stored in the cache database 28. The process 540 retrieves (542) cached travel options 42 from a cache database 28 corresponding to a trip of interest to a user. From the retrieved travel options 42, the process 540 extracts (544) travel information to be displayed to a user. For example, the information includes the price of the travel options. The process 540 renders (546) the information on a display.

In some embodiments, the information is rendered as a moving ticker across the display. As a moving ticker, the process constructs the ticker by including certain information, e.g., the origin and destination and a price. The process 540 determines (548) if there is a change in a price of the flight and updates (550) the information associated with the flight and displays (552) the updated information.

In some embodiments, the process 540 regularly polls the cache database 28 for prices of the flight; and presents the prices on the display. In other embodiments, the updating (550) is performed only after the change is detected. Updating information rendered on the display only after a change is detected, rather than regularly polling the cache database 28, is more computationally efficiently and requires fewer communication resources. The travel information may be displayed in real-time or near real-time.

4. Subscription

Users may purchase a subscription that grants unlimited access to one or more of the foregoing notification services over a period of time (e.g., a month, or a year) rather than paying a separate fee for each time they use one of the services. The terms of a subscription may be customized for different users and generally include: one or more notification services to be provided, criteria to be applied to the notification service(s), a specified period of time over which access to the service(s) are granted or a number of times the service(s) may be used, and a purchase price.

Figure 33:
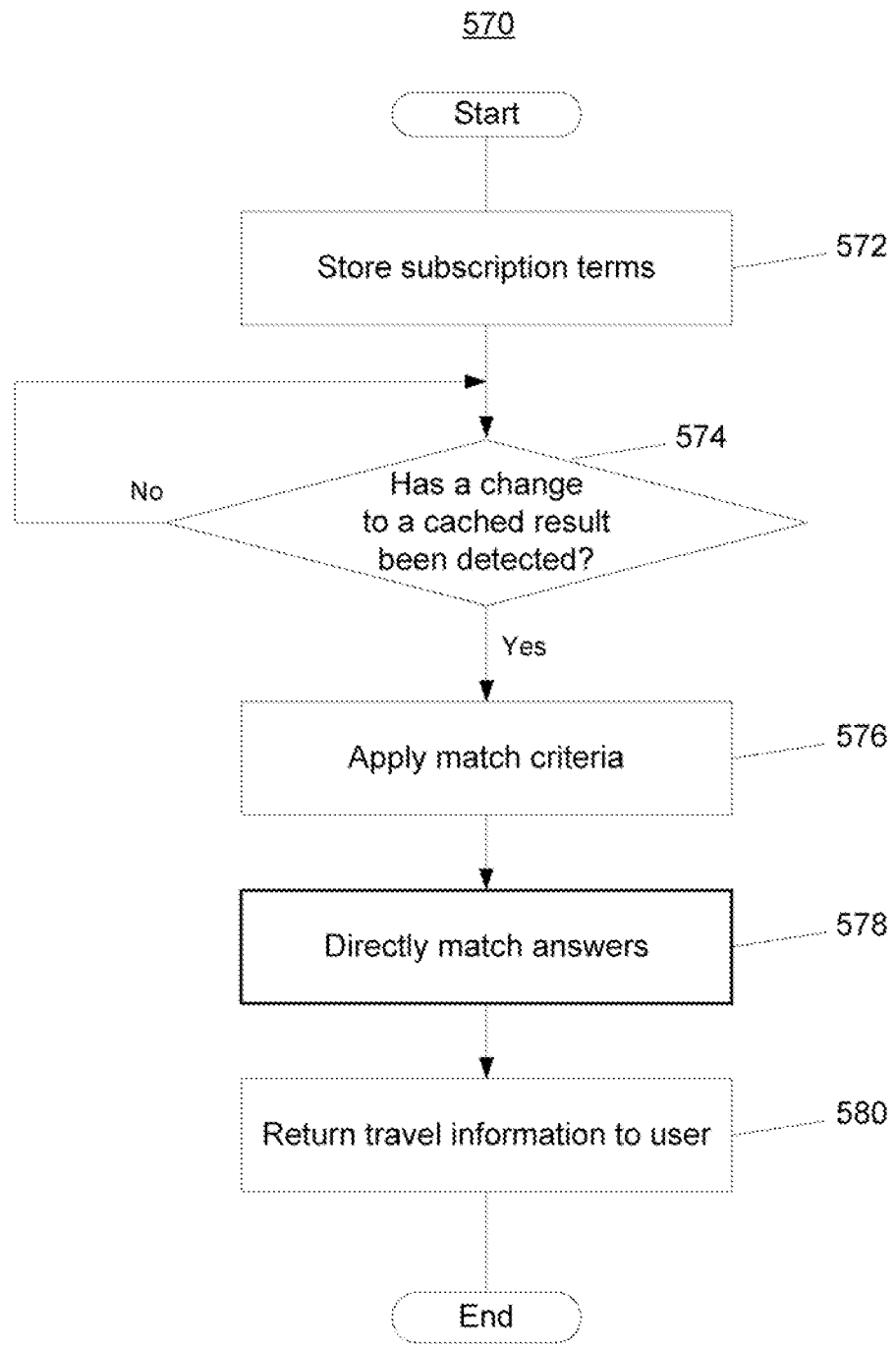
FIG. 33 is a flowchart of a process for notifying a user of changes to travel information.

Referring to FIG. 33, a process 570 notifies a user of changes to travel information who has subscribed to one or more notification services. After a user purchases a subscription, the terms of the subscription including the notification services to be provided and the criteria to be applied in each notification service (referred to as "match criteria") are stored (572) in a subscription database 31 (FIG. 1). Match criteria include for example, changes to prices for round-trip queries with particular market and date combinations, or on certain carriers, or only when the price for any solution that matches a particular set of complicated traveler-defined criteria drops below some specified threshold. Match criteria can be expressed in terms of the keys used in the entries of the summary tables stored in the cache database 28. Examples of summary tables are shown above in Tables 1-8. The match criteria specify a change that is to be detected in one or more entries, such as a reduction in the best price. Over the period set forth in the subscription, the process 570 determines (574) whether the results 42 stored in the cache database 28 have undergone any changes. Upon detecting (574) a change, the process 570 applies (576) the match criteria specified in the subscription to the results 42 stored in the cache database 28. In particular, when a change is detected (574) in a summary table entry, such as a reduction in the best price, the key features of that summary entry (such as origin, destination, outbound and return date) are applied (576) to the subscription database to find subscriptions with notification criteria that match the change. In the case where subscription match criteria can not be readily expressed in terms of the key features used to define summary table entries, the process 570 directly matches (578) answers 24 returned by the TPS 12 against the match criteria. Travel information corresponding to the summary table entries that fit the match criteria are returned (580) to the user. The travel information may be in the form of a pricing solution or summary information.

To improve computational efficiency, subscriptions are organized into data structures appropriate for fast match checking. For example when processing pricing-solutions for a particular market and date pair, a set of subscriptions that match the market and dates are determined. Subsequently, the pricing-solutions are tested against the remainder of the match requirements specified by the set of subscriptions.

Figure 34:
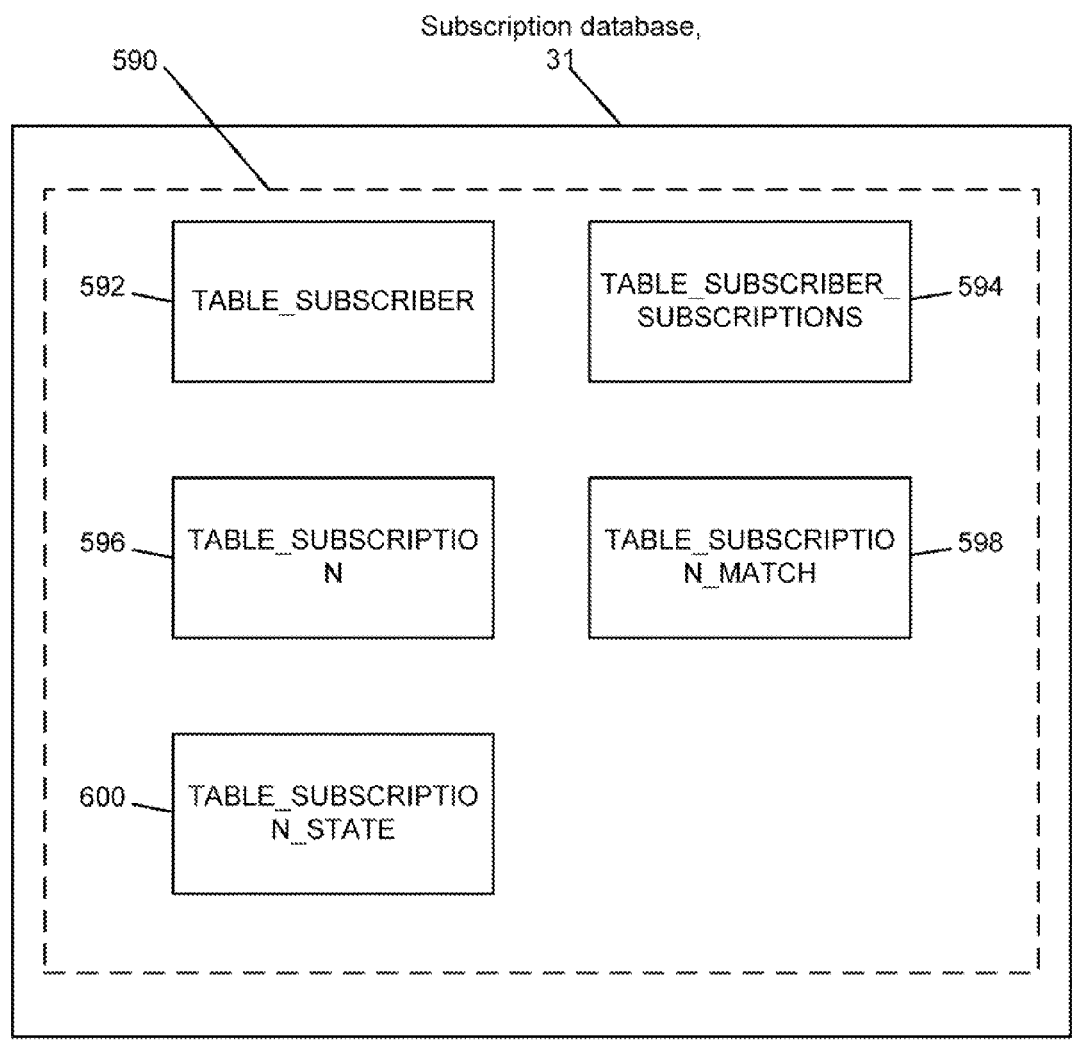
FIG. 34 is block diagram of the subscription database

Referring to FIG. 34, a conceptual structure of the subscription database 31 includes multiple data structures 590: a TABLE_SUBSCRIBER data structure 592, a TABLE_SUBSCRIBER_SUBSCRIPTIONS data structure 594, a TABLE_SUBSCRIPTION data structure 596, a TABLE_SUBSCRIPTION_MATCH data structure 598, and a TABLE_SUBSCRIPTION_STATE data structure 600. In the implementation shown in FIG. 34, the data structures 590 are in the form of tables and are sometimes referred to as "tables 590". In addition to tables, the data structures 590 could be represented as tree structures, array structures, and other types of data structures. Each of the data structures 590 are described in further detail below in connection with Tables 9-13.

The TABLE_SUBSCRIBER data structure 592 shown in Table 9 holds information about a subscriber including information for transmitting data to subscriber.

TABLE 9

| TABLE_SUBSCRIBER | |
|---|---|
| subscriber-id | (unique key) |
| subscriber-contact-info | (e.g., IP address & port; email address) |
| amount-due | (price; for billing) |

The TABLE_SUBSCRIBER_SUBSCRIPTIONS data structure 594 shown in Table 10 provides a mapping between a subscriber and one or more subscriptions purchased by the subscriber.

TABLE 10

| TABLE_SUBSCRIBER_SUBSCRIPTIONS | |
| --- | --- |
| subscriber-id | <key> |
| subscription-id | (key) |

The TABLE_SUBSCRIPTION data structure 596 shown in Table 11 holds basic subscription information, including information about the level of aggregation of information (e.g., should changes be itemized by carrier, date, or market, or alternatively, aggregated across various travel parameters). The TABLE_SUBSCRIPTION data structure 596 also includes the travel information to be sent to a subscriber (e.g., current best-price for a single adult, or a detailed pricing-solution including flight and fare information).

TABLE 11

| TABLE_SUBSCRIPTION | |
| --- | --- |
| subscriber-id | <unique key> |
| itemize-by-carrier? | (boolean) |
| itemize-by-market? | (boolean) |
| max-price | |
| price-resolution | (amount; only notify on change greater than this amt) |
| send-best-price? | (boolean) |
| send-exemplary-pricing-solution? | (boolean) |
| quality-of-service | (quality of service indicator) |
| bid | (optional price for first notification) |

The TABLE_SUBSCRIPTION_MATCH data structure 598 holds "match criteria" information that characterize the parameters of pricing-solutions that are of interest to the subscriber. These parameters may include one or more of an origin, destination, dates, price, and so forth. These parameters may also include features formed by aggregated travel parameters (e.g., month, country, etc.).

TABLE 12

| TABLE_SUBSCRIPTION_MATCH | |
| --- | --- |
| subscription-id | (key) |
| subscription-match-id | <unique key> |
| carrier | |
| origin-location | |
| destin-location | |
| earliest-out-date | |
| latest-out-date | |
| earliest-ret-date | |
| latest-ret-date | |
| min-length-of-stay | |
| max-length-of-stay | |

The TABLE_SUBSCRIPTION_STATE data structure 600 holds information about the travel information that was sent most recently to a subscriber.

TABLE 13

| TABLE_SUBSCRIPTION_STATE | |
| --- | --- |
| subscription-id | (key) |
| carrier | |
| origin | |
| destin | |
| out-date | |
| ret-date | |
| previous-price | |
| transmission-time | |

Figure 35A:
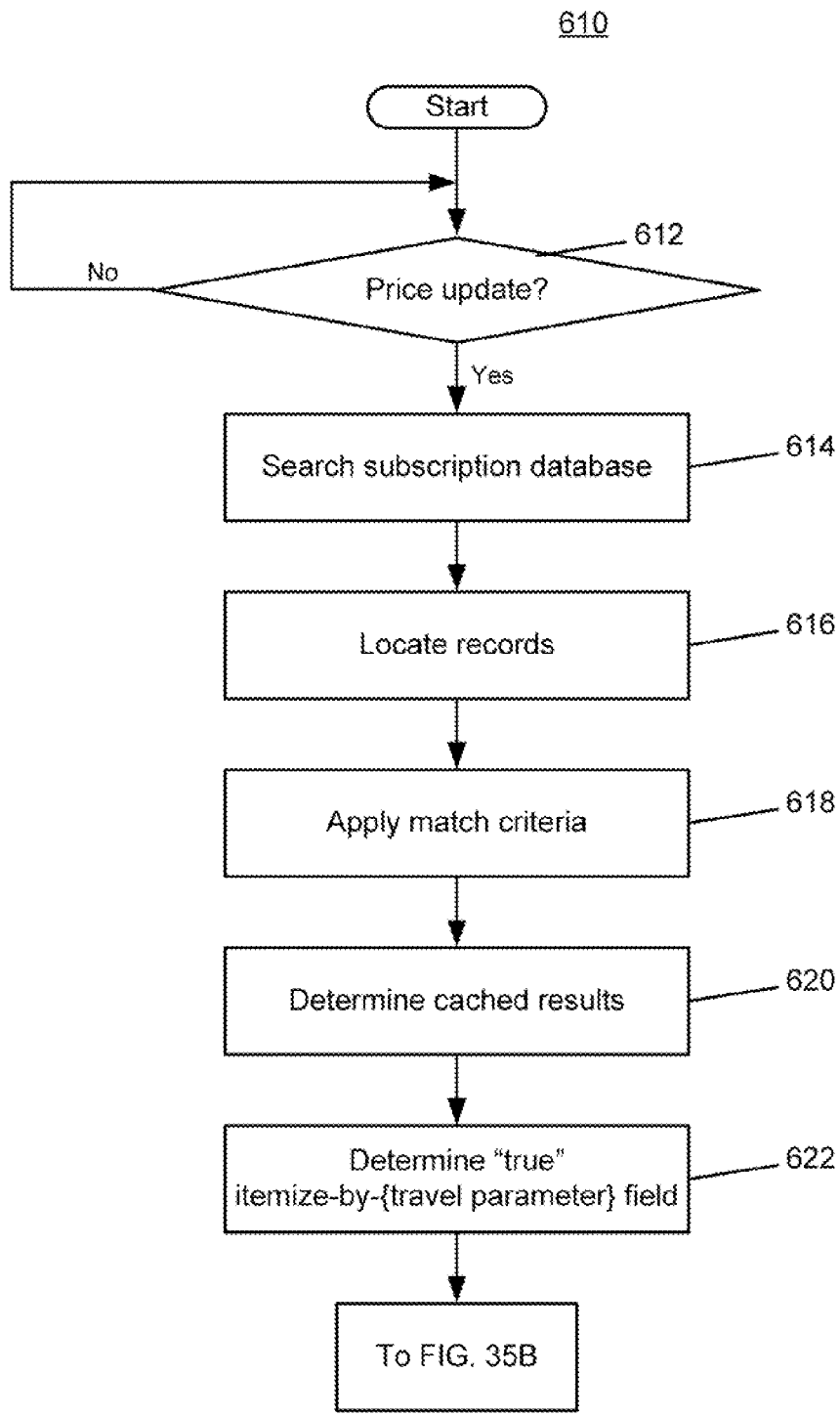
FIGS. 35A-B are flowcharts of a process for reporting changes to the best available price of a travel option.
Figure 35B:
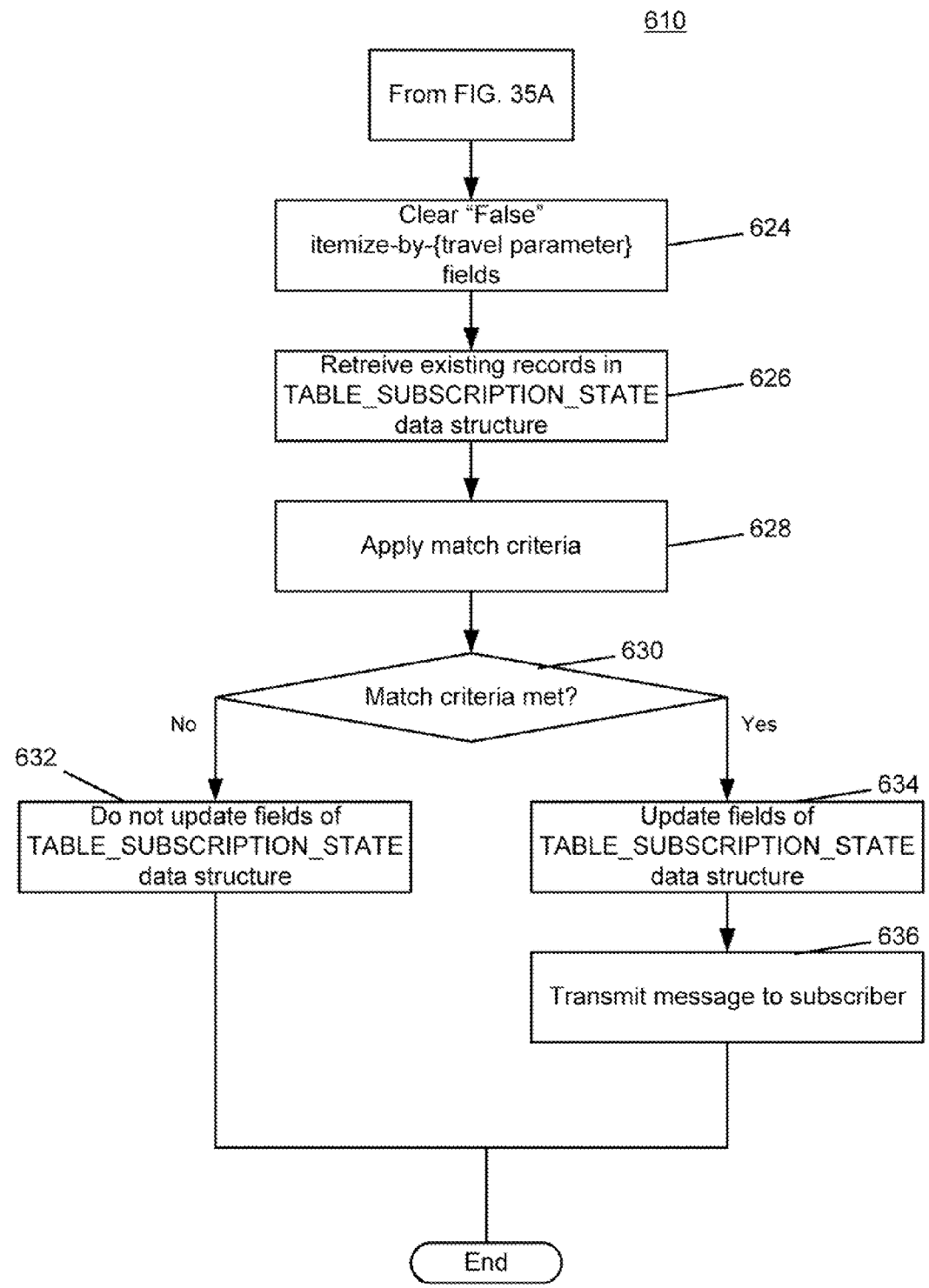

Referring to FIGS. 35A-35B, a process 610 is shown for reporting changes to the best available price of a travel option to a subscriber using the data structures 592, 594, 596, 598, and 600. The process 610 determines (612) whether the poller 36 has updated the price of a cached result 42 having the travel parameters of the TABLE_SUBSCRIPTION_MATCH data structure 598 (Table 12). In some embodiments, the process 610 determines whether the TABLE_SUBSCRIPTION_MATCH data structure 598 includes a feature formed from aggregated parameters. When a change in the price is determined (612), the process 610 searches (614) the subscription database 31 for records in the TABLE_SUBSCRIPTION_MATCH data structure 598 (Table 12) that match the travel parameters. From the matching TABLE_SUBSCRIPTION_MATCH records, the process 610 locates (616) the records in the TABLE_SUBSCRIPTION data structure 596 (Table 11) having a subscription-id that matches the subscription-id of the matching TABLE_SUBSCRIPTION_MATCH records. The process 610 applies (618) the match criteria listed in the TABLE_SUBSCRIPTION data structure 596 to the appropriate travel parameters of the cached results 42 (which may include fields of a summary table) and determines (620) the cached results having travel parameters that meet the match criteria. The process 610 determines (622) which of the "itemize-by-{travel parameter}?" fields of the TABLE_SUBSCRIPTION data structure 596 are true and clears (624) those that are false. The process 610 uses the "itemize-by" travel parameter to retrieve (626) any existing records in the TABLE_SUBSCRIPTION_STATE data structure 600 (Table 13) indicating previous transmission for carrier/date/markets. The process 610 applies (628) the match criteria within the max-price and price-resolution fields of the TABLE_SUBSCRIPTION data structure 596 (table 11) to the cached result 42 and determines (630) whether the price change meets the match criteria. If not, the fields of the TABLE_SUBSCRIPTION_STATE data structure 600 are not updated (632) and thus remain unchanged. If so, the caching system 11 updates (634) the fields of the TABLE_SUBSCRIPTION_STATE data structure 600 with the travel parameters of the matching cached result 42 and transmits (636) a message to the subscriber that includes the best price or best pricing solution of the cached result 42. The process 610 contacts the subscriber using the contact information stored in the TABLE_SUBSCRIBER data structure 594 (Table 9). In those embodiments in which billing is based on a number of transmissions, the caching system increments the price of the "amount due" field of the TABLE_SUBSCRIBER data structure 594 after every transmission. The process 610 can be applied to other query parameters such as cabin-class or maximum-stop restrictions.

In some implementations, travel applications may need to receive a block transmission of the state of a subscription, for example in the case where a travel application is re-started and loses its state. In general, block transmissions divide data into multiple blocks and treat each block as a record. Each record has a count field, data, and an end-of-record marker. The data is sent one block at a time. If the transmission fails, it can be resumed starting at the last record sent.

The block transmission of the state of a subscription can be supported by re-sending the TABLE_SUBSCRIPTION_STATE records for the subscription, or alternatively by clearing all TABLE_SUBSCRIPTION_STATE records for the subscription and re-processing all summarization tables in the result database to re-generate TABLE_SUBSCRIPTION_STATE records and notification messages for the subscription.

a. Service Quality

It may be desirable to provide different qualities of service to different subscribers or for different subscriptions, for example, to permit differential pricing. A method for degrading quality of service is to impose a selective delay between the detection of a change and the transmission of the associated notification message. This can be implemented by simply storing a "quality of service" indicator in the TABLE_SUBSCRIBER data structure 592 (Table 9) or TABLE_SUBSCRIPTION data structure 596 shown in Table 11 and referencing this indicator prior to transmitting (636) messages to the subscriber.

Some travel providers (e.g., airline carriers) may want to prevent all or certain subscribers from receiving change information relating to their products, or to impose quality of service limitations such as time delays between changes and notifications. To accommodate these travel providers, in some implementations, the subscription database 31 includes separate data structures (e.g., tables) that relate a subscriber or a subscription to properties of pricing-solutions or summary tables that include the travel provider as a parameter. The caching system 11 filters travel information associated with those pricing-solutions or summary tables from the change messages transmitted to the subscriber and/or alters the quality of service of change messages that include travel information associated with those pricing-solutions or summary tables.

E. Early Detection of Unusual Behavior

Travel providers and TPSes (e.g., TPS 12) are often concerned with the possibility that data entry errors, computer programming errors, or other mistakes may result in unexpected and unwanted prices from being offered or other aberrant behavior such as failure to generate pricing-solutions for reasonable queries or unusually long query response times. If such behavior occurs, it is desirable to detect it as quickly as possible, preferably before users have a chance to detect or act on the behavior.

A method for detecting problems is to regularly probe the TPS 12 by posing queries and checking for unusual behavior, using thresholds, heuristics, or tables of historical behavior or expected behavior to evaluate the responses. If problems are detected, providers or the TPS 12 are notified. The TPS 12 may be temporarily disabled or particular queries or database entries within the TPS 12 may be disabled.

The queries 22 sent by the caching system 11 to the TPS 12 to generate answers 24 can also be used to detect unusual behavior of the TPS 12. The use of the queries 22 is particularly advantageous because the queries 22 are comprehensive and may be posed before users have access to the answers.

Figure 36:
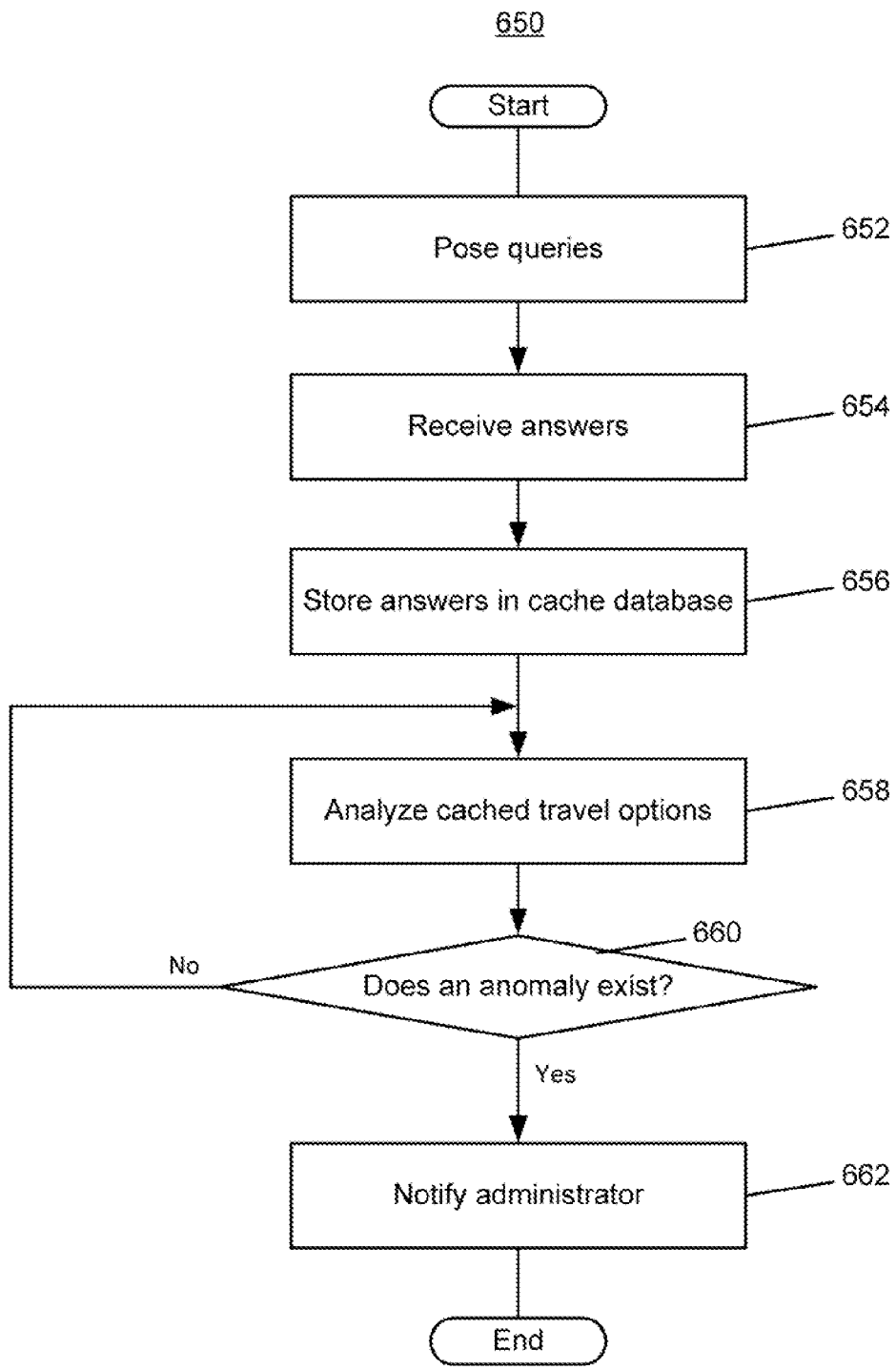
FIG. 36 is a flowchart of a process for detecting errors and unusual behavior in a travel planning system.

Referring to FIG. 36, a process 650 detects errors and unusual behavior in a travel planning system (e.g., TPS 12). The process 650 poses (652) queries 22 to the TPS 12. The travel queries are posed (652) at different times and include a variety of different combinations of travel parameters. The process 650 receives (654) answers 24 to the queries 22 from the TPS 12 and stores (656) the answers 24 in the cache database 28 as cached travel options 42. Tables of historical price and performance behavior may be populated from such queries. The process 650 analyzes (658) the cached travel options 42 for anomalies. For example, a heuristic for notification of aberrant behavior may be that the price a specific airline offers in a market should not ever be below the minimum of $100 and/or the average minimum price over the preceding month of travel in the market with the same length of advance purchase and destination layover. For such a heuristic, the process 650 maintains historical price information by market and date of the results 42 stored in the cache database 28. The process 650 analyzes the cached travel options 42 until process 650 determines (660) that an anomaly exists. If the process 650 detects (660) an anomaly in a cached travel options, it notifies (662) an administrator of the TPS 12 that a problem may exist. The service provider or operator of the TPS being monitored may subscribe to a service for detecting unusual behavior using process 650 on a regular basis over a predetermined time (e.g., every day for a month).

F. Maintenance of Historical Price Data

Although maintaining historical prices requires additional resources, it can enable the offering of additional services, such as price forecasting, revenue management and provide documentation for potential litigation or regulatory matters. One benefit has already been described as the process 390 illustrated in FIG. 20 and display 400 in FIG. 21. In the first instance it provides a ready reference. In the second instance it provides a comparative basis for tabulated charts. The technology utilized in these instances is to provide timestamps with the data and store it in such a way that it can be compactly stored yet readily retrieved.

In another embodiment, the historical price records of particular travel plans made at different times may be taken together and combined using an algorithm to plot or otherwise describe a trend over multiple time periods. The points on the curve may be fitted using standard statistical means to extrapolate to future time periods. In a similar fashion trends can be computed for business factors such as revenue (price less expenses) over time and if there is a significant pattern, then extrapolations can be made so corrective actions can be taken earlier than otherwise possible.

The historical price records may also be used to provide a clear and complete record of a carrier's price offerings over a given period of time (e.g., a year or several years). Such a record can provide useful information during legal inquiries or proceedings. For example, charges of price fixing can be very damaging to a company even though untrue especially in a tightly regulated industry such as the airline travel business. If a company had access to historical pricing information it could help provide a strong defense against such false charges.

G. Advertisement

Travel agents and travel providers desire to often promote their products using various forms of advertisement. Advertisement copies are often determined well in advance of viewing, such as generally the case with print, television, and radio advertisements. Dynamically priced products such as air travel prices or availability of the products presented in such static advertisements may be stale or inapplicable by the time those advertisements reach an audience. On the other hand, the Internet, electronic billboards, mobile telephones, networked video game consoles, subscriber-specific dynamic television advertisements and other technologies offer the possibility of more rapid electronic dissemination of information and better targeted advertisements that do not present stale (and thus misleading) data.

Traditional TPSes often do not support such dynamic advertising, especially for air travel, because of the latency and cost involved in calculating pricing-solutions.

Some airlines and travel agents periodically pose queries for a small set of markets and particular dates, and use resulting prices of computed pricing solutions to populate lists of promotions (e.g., listing on a carrier's web site special promotional fares available the next weekend). However, such promotions are often not well-targeted at the web user, in large part because the airline or agent cannot afford the expense of posing the variety of queries necessary to target a diverse set of travelers. For example, some carriers and travel agents tailor the listing based on the traveler's known origin airport, but not preferred travel dates. Furthermore, the pricing-solutions on the listing typically include only special promotional fares to limit the computational expense of calculating the promoted prices. In addition, the pricing solutions are not continually kept up to date with changing seat availability. Rather, the pricing solutions are refreshed once per day or once per fare load.

It is preferable to base advertised prices and travel options on correct, current pricing-solutions that have been checked for seat availability, and for advertisements or promotions to be specialized to preferred travel times, locations of the viewer and other criteria.

1. Polled Advertisement

A provider may promote products or services through polled advertisements that are generated instantly based on cached results and user information. For example, just prior to showing a television advertisement in Seattle, a television network or cable system sends a request to an airline for current advertisements appropriate for users in Seattle and the airline responds with appropriate travel options 42 retrieved from the cache database 28.

2. Pushed Advertisement

An airline/agent may actively "push out" advertisements for their products or services to a target audience. For example, an advertisement in the form of computer instructions may be sent to the client 16 over the Internet. The instructions cause the client 16 to send user info to the airline/agent. The airline/agent tailors the advertisement according to the user info and transmits the advertisement back to the client 16, which subsequently displays the advertisement to the user.

When tailoring the advertisement to the user, the provider may use the information provided by the client 16 to lookup additional information associated with the user stored in one or more databases (e.g., the user preferences database 30 of FIG. 1). Examples of additional user information include: a history of searches and ticket purchases, frequent flyer information, and demographic and financial info.

3. Advertisement Database

A carrier or agent may use the results 42 stored in the cache database 28 to populate an advertisement database for advertisement and promotions (e.g., generating lists of pricing solutions for different kinds of people, such as those in different locations). The advertisement database may periodically receive updated results 42 retrieved from the cache database 28. Alternatively, the advertisement database may receive updated results 42 only on demand.

Figure 37A:
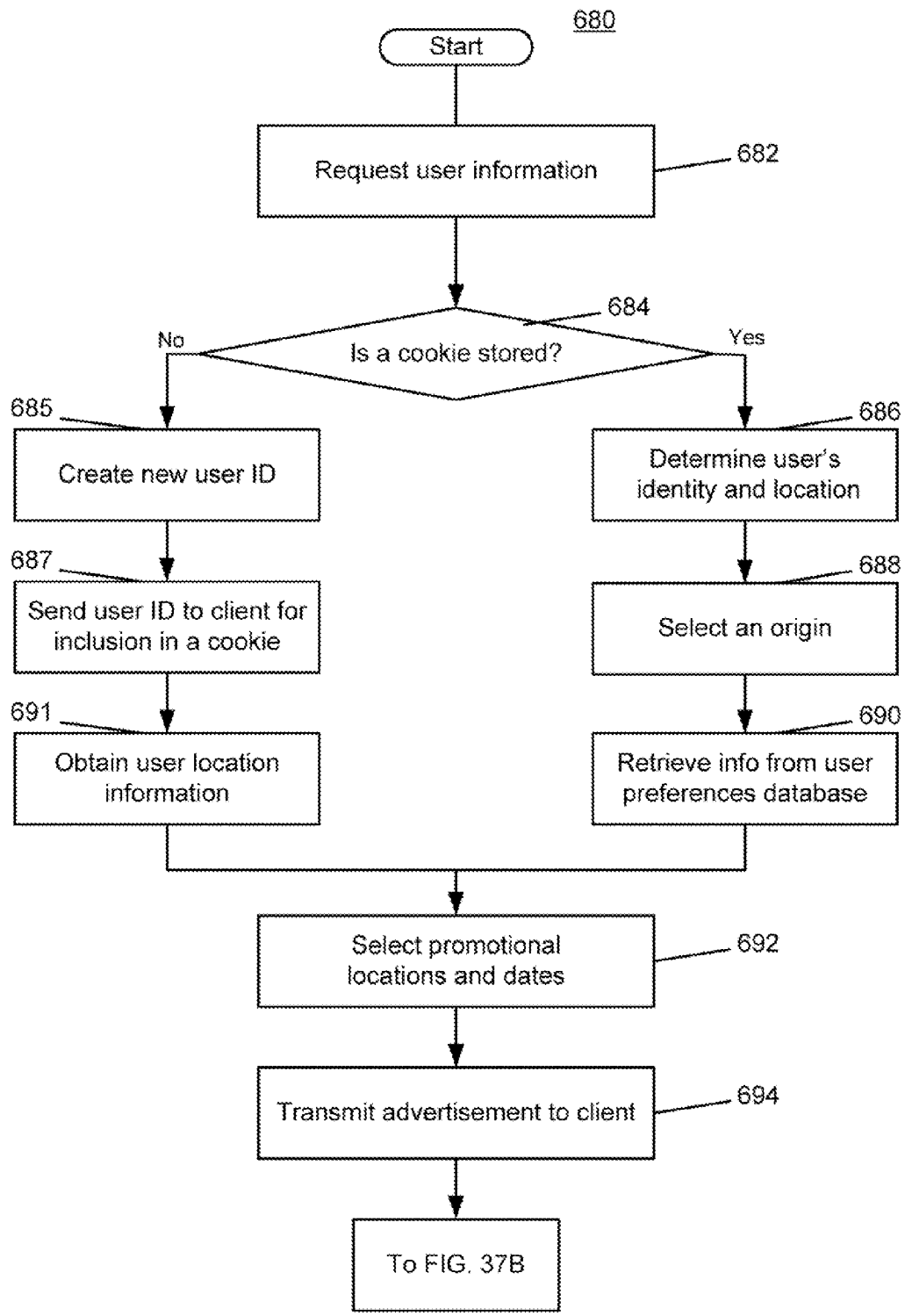
FIGS. 37A-B are flowcharts of a process for advertising a service or product to a user.
Figure 37B:
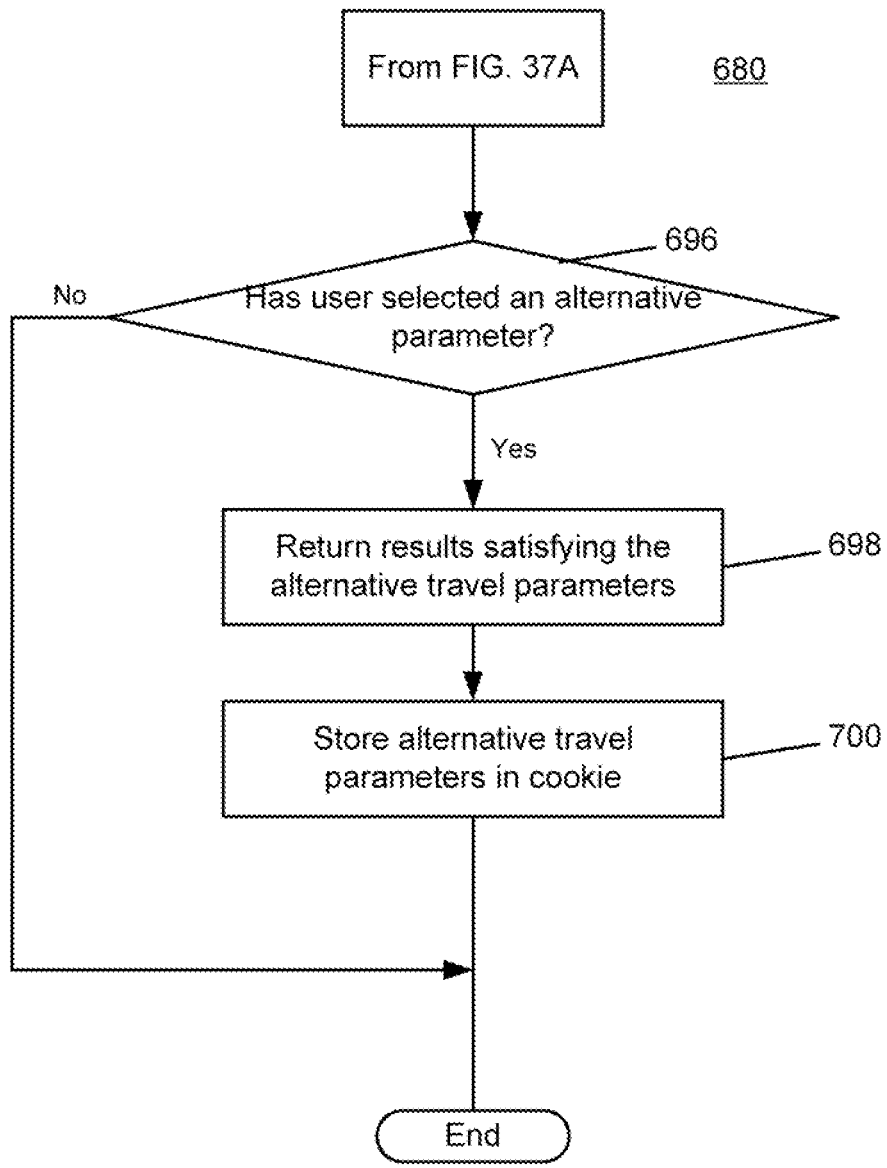

Referring to FIG. 37, a process 680 by which a travel provider advertises a service or product to a user at the client 16 is described. The airline/agent may pay for computer instructions (e.g., Java script) embedded in a web page operated by or affiliated with the provider) to be embedded in other web pages, either arranging for direct inclusion or paying an ad network such as Google to include the computer instructions. In some embodiments, an ad network allows ad bids to be keyed off markets, dates. The travel provider uses a subscription table to keep such ads updated with up-to-the-minute price and availability information as well as bid prices (e.g., based on measures of profit, competitive situation, emptiness of flights).

When the user accesses the web page, process 680, e.g., an advertisement server owned and/or operated by the travel provider requests (682) information associated with the user. Such information may be information stored in a cookie or the IP address of the client 16. The process 680 determines (684) whether a cookie is stored in the client 16. If the process 680 determines (684) that no cookie is stored in the client 16, the process 680 produces (685) a new user ID and returns (687) the user ID to the client 16 for inclusion in a cookie. The process 680 determines (691) the location of the user from the user's IP address or by using other techniques.

If a cookie is determined to be stored in the client 16, the advertisement server determines (686) the identity of the user and the location of the user. The process 680 selects (688) an origin airport located nearest to the location of the user. Using identity of the user, the process 680 retrieves (690) additional information associated with the user from the user preferences database 30. Using the location information and any additional user information obtained from the user preferences database 30, the process 680 selects (692) promotional locations and dates from a promotional database storing pricing solutions received from the cache database 28. The process 680 returns (694) to the client 16 an advertisement including prices for specific markets and dates. The message includes fields in which the user may enter alternative travel parameters (e.g., alternative origins, destinations, and travel dates). The message may also add in other dates or location specific prices such as hotel costs. Additionally, the message may enable the user to manipulate personal defaults stored in the user preference database 30 such as entering or changing favorite trips, dates, express preferences, and other travel preferences.

The process 680 determines (696) whether the user has selected any alternative travel parameters. If one or more alternative travel parameters are received (696) from the user, the process 680 returns (698) results 42 that satisfy the alternative travel parameters. The process 680 stores (700) the alternative travel parameters in the cookie with an annotation that they had been provided by the user. When presenting subsequent advertisements to the user, the process 680 may base the advertisements on the alternative travel parameters.

H. Revenue Management

One may use pricing-graphs or pricing-solution tables to evaluate consumer choice functions and make predictions for future planning and pricing decisions.

In another embodiment one may calculate bid prices for advertisements and determine how much we want to bid in a market or for a date, or to promote a flight. One can use the result database to dynamically respond. One might also determine how much to bid on certain search terms In some embodiments, users or providers or others (e.g., municipalities or state tourism boards) may pay or rank or vote to ensure that queries specific to their business, services, or products are used to preemptively fill the cache database 28 (e.g., to ensure some minor airport is included in some of the results 42). In some embodiments, the selection of travel parameters to include in TPS queries 22 are be based on tables of popular markets and dates as determined by statistics based on prior queries, prior ticket sales, airport size, and so forth. In other embodiments, the TPS queries 22 are based in part on subscription services or info stored in the user preference database 30, such as what markets users want to display on home page.

III. Examples

The following example illustrates the reduction in computational costs provided by the travel planning system 10 for answering users' travel queries. Consider a web site for a single airline of medium-large size having a network spanning over 100 cities and serving approximately 10,000 markets. If it is desired to pre-compute answers for all the carrier's markets over all outbound and return dates within 100 days of the present, then there are approximately 5000 date pairs, and 50,000,000 possible "basic queries" of a city pair and outbound and return date pair. If a conventional TPS such as TPS 12 requires 5 CPU-seconds to answer each basic query, then populating the entire database once requires approximately 250,000,000 CPU-seconds. To maintain a 250 second (4 minute) bound on result staleness (age), approximately 1,000,000 CPUs would be required. Though maintaining this many CPUs may be currently possible at the present time, in most cases, it would not be economically practical.

If less-comprehensive coverage is required, such as merely the most popular 1,000 markets for the carrier and 100 outbound dates combined with only 10 different return dates for each outbound, and a 2500 second staleness bound, the number of CPUs drops to 2000, which is a more manageable number.

TPSes such as those described in U.S. Pat. No. 6,275,808 by Carl G. de Marcken and assigned to the assignee of the present invention and incorporated herein by reference can save work by evaluating many days of travel window as part of one query, because much of the computational cost of fare and rule retrieval and rule evaluation is shared across the itineraries and travel dates under consideration. Such a TPS can in many cases answer a single query between two airports with 100-day outbound and return time windows in 100 seconds or less. With such performance, the number of queries to populate the database is reduced to one per market (10,000) and the total computational effort to 1,000,000 CPU-seconds. To maintain a 250 second staleness threshold requires only 4000 CPUs. Similar savings can be had by processing multiple origins and destinations as part of one query, because many flights and markets and fare-component and priceable-units are shared between solutions for the multiple airports.

The components of the travel planning system 10 can be implemented, at least in part, in digital electronic circuitry, analog electronic circuitry, or in computer hardware, firmware, software, or in combinations of them. The components of the travel planning system 10 can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the travel planning system 10 can be performed by one or more programmable processors executing a computer program to perform functions of the invention by operating on input data and generating an output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one r more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, all of above examples could make use of frequent flyer miles rather than dollars. The results returned to a user who belongs to a frequent flyer program may indicate a number of frequent flyer miles that a user may count towards a purchase of a ticket. Accordingly, other embodiments are within the scope of the following claims.

What is claimed is:

1. A computer implemented method comprising:
receiving by at least one computer, a code when a user accesses a web page hosted by an entity, the code identifying the user and including parameters derived from predetermined travel parameters specified by the user in a travel query;
in response to the user accessing the web page, populating, by the at least one computer, a new travel query with parameters derived from the predetermined travel parameters, the parameters including a departure date corresponding to a start of an event to be hosted by the entity, a return date corresponding to an end date of the event, a destination airport having flights with fares published by airlines, said destination airport being nearest to a geographic location of the event, and a variable parameter based on identification information associated with the user, the variable parameter comprising an origin airport corresponding to an airport that is, at least one of, within or nearest to a geographic location of the user;
identifying, by the at least one computer, a set of travel options that satisfy the new travel query, the travel options comprising sets of flights and sets of fares usable with the flights for travel between an origin and a destination; and
sending, by the at least one computer, to the user, the set of travel options that satisfy the new travel query.

2. The method of claim 1, further comprising enabling the user to edit the predetermined travel parameters and the variable parameter with new travel parameters.

3. The method of claim 2, further comprising:
searching a cache storing travel options with the new travel query; and
returning a subset of travel options from the cached travel options with the subset of travel options satisfying at least the new travel query.

4. The method of claim 1, wherein the travel query is not solicited by the user.

5. A computer implemented method comprising:
including in a web page, a code comprising predetermined travel parameters specified by an entity that controls the web page;
detecting by at least one computer that a user has accessed the web page;
in response to the user accessing the web page, populating, by the at least one computer, a travel query with the predetermined travel parameters that include a departure date corresponding to a start of an event to be hosted by the entity, a return date corresponding to an end date of the event, a destination airport having flights with fares published by airlines, said destination airport being nearest to a geographic location of the event, and a variable parameter based on identification information associated with the user, the variable parameter comprising an origin airport corresponding to an airport that is, at least one of, within or nearest to a geographic location of the user, with the travel query not solicited by the user;
identifying, by the at least one computer, a set of travel options that satisfy the query, the travel options comprising sets of flights and sets of fares usable with the flights for travel between an origin and a destination; and
sending, by the at least one computer, to the user, the travel options satisfying the travel query.

6. The method of claim 5, wherein the identification information comprises location identification information sufficient to determine the geographic location of the user.

7. The method of claim 6, wherein the location identification information comprises an internet protocol (IP) address.

8. The method of claim 5, wherein the travel query is populated with a variable parameter including one of an outbound city, a destination city, an outbound airport, and a destination airport.

9. The method of claim 5, wherein sending the travel options comprises sending an advertisement comprising the travel options, wherein the advertisement is affiliated with an enterprise paying the entity associated with the web page for permitting the inclusion of the code.

10. The method of claim 5, wherein the predetermined travel parameters comprise a destination airport corresponding to an airport nearest to a lodging establishment.

11. A system for presenting travel information to a user, the system comprising:
a processor configured to:
include in a web page, a code comprising predetermined travel parameters specified by an entity that controls the web page;
detect that a user has accessed the web page;
in response to the user accessing the web page, populate a travel query with the predetermined travel parameters that include a departure date corresponding to a start of an event to be hosted by the entity, a return date corresponding to an end date of the event, and a destination airport having flights with fares published by airlines, said destination airport being nearest to a geographic location of the event and a variable parameter based on identification information associated with the user, the variable parameter comprising an origin airport corresponding to an airport that is, at least one of, within or nearest to a geographic location of the user, with the travel query not solicited by the user;
identify a set of travel options that satisfy the query, the travel options comprising sets of flights and sets of fares usable with the flights for travel between an origin and a destination; and
send, to the user, the travel options satisfying the travel query.

12. The system of claim 11, wherein the identification information comprises location identification information sufficient to determine the geographic location of the user.

13. The system of claim 12, wherein the location identification information comprises an internet protocol (IP) address.

14. The system of claim 11, wherein the travel query is populated with a variable parameter including one of an outbound city, a destination city, an outbound airport, and a destination airport.

15. The system of claim 11, wherein the processor is further configured to display an advertisement comprising the travel options, the advertisement affiliated with an enterprise paying the entity associated with the web page for permitting inclusion of the code.

16. The system of claim 11, wherein the predetermined travel parameters comprise a destination airport corresponding to an airport nearest to a lodging establishment.

17. A non-transitory computer program product for presenting travel information to a user, the computer program product being tangibly stored on machine readable media, comprising instructions operable to cause one or more processors to:
produce, a code when a user accesses a web page hosted by an entity, the code sufficient to identify the user and including parameters derived from predetermined travel parameters specified by the user in a travel query;
detect that the user has accessed the web page;
in response to the user accessing the web page, populate a different travel query with parameters derived from the predetermined travel parameters, the parameters including a departure date corresponding to a start of an event to be hosted by the entity, a return date corresponding to an end date of the event, a destination airport having flights with fares published by airlines, said destination airport being nearest to a geographic location of the event, and a variable parameter based on identification information associated with the user, the variable parameter comprising an origin airport corresponding to an airport that is, at least one of, within or nearest to a geographic location of the user;
send the travel query to a cache that stores travel options;
receive a set of travel options that satisfy the query, the travel options comprising sets of flights and sets of fares usable with the flights for travel between an origin and a destination; and
send, to the user, the set of travel options that satisfy the travel query.

18. The product of claim 17, further comprising instructions to enable the user to edit the predetermined travel parameters and the variable parameter with new travel parameters.

19. The product of claim 18, further comprising instructions to:
search a cache storing cached travel options for travel planning with the different travel query; and
return a subset of travel options from the cached travel options with a subset of travel options satisfying at least the different travel query.

20. The product of claim 17, wherein the travel query is not solicited by the user.

21. A non-transitory computer program product for presenting travel information to a user, the computer program product being tangibly stored on machine readable media, comprising instructions operable to cause one or more processors to:

include in a web page, a code comprising predetermined travel parameters specified by an entity that controls the web page;

detect that the user has accessed the web page;

in response to the user accessing the web page, populate a travel query with the predetermined travel parameters that include a departure date corresponding to a start of an event to be hosted by the entity, a return date corresponding to an end date of the event, a destination airport having flights with fares published by airlines, said destination airport being nearest to a geographic location of the event, and a variable parameter based on identification information associated with the user, the variable parameter comprising an origin airport corresponding to an airport that, is at least one of, within or nearest to a geographic location of the user, with the travel query not solicited by the user;

send the travel query to a cache that stores cached travel options;

identify a set of travel options that satisfy the query, the travel options comprising sets of flights and sets of fares usable with the flights for travel between an origin and a destination; and send, to the user, the travel options satisfying the travel query.

22. The product of claim 21, wherein the identification information comprises location identification information sufficient to determine the geographic location of the user.

23. The product of claim 22, wherein the location identification information comprises an internet protocol (IP) address.

24. The product of claim 21, wherein the travel query is populated with a variable parameter including one of an outbound city, a destination city, an outbound airport, and a destination airport.

25. The product of claim 21, wherein the processor is further configured to display an advertisement comprising the travel options, the advertisement affiliated with an enterprise paying the entity associated with the web page for permitting inclusion of the code.

26. The product of claim 21, wherein the predetermined travel parameters comprise a destination airport corresponding to an airport nearest to a lodging establishment.

* * * * *

UNITED STATES PATENT AND TRADEMARK OFFICE
CERTIFICATE OF CORRECTION

PATENT NO. : 8,781,864 B2
APPLICATION NO. : 12/773390
DATED : July 15, 2014
INVENTOR(S) : Carl De Marcken Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 322 days.

Signed and Sealed this
Twenty-fifth Day of August, 2015

Michelle K. Lee
*Director of the United States Patent and Trademark Office*